United States Patent
Morinaga et al.

(10) Patent No.: US 11,899,389 B2
(45) Date of Patent: Feb. 13, 2024

(54) SHEET PROCESSING APPARATUS, LAMINATOR, IMAGE FORMING APPARATUS, AND IMAGE FORMING SYSTEM

(71) Applicants: Takuya Morinaga, Tokyo (JP); Takahiro Matsuda, Kanagawa (JP)

(72) Inventors: Takuya Morinaga, Tokyo (JP); Takahiro Matsuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 490 days.

(21) Appl. No.: 17/218,727

(22) Filed: Mar. 31, 2021

(65) Prior Publication Data

US 2021/0325808 A1  Oct. 21, 2021

(30) Foreign Application Priority Data

Apr. 17, 2020 (JP) .............................. 2020-073867
Jul. 15, 2020 (JP) .............................. 2020-121256
Jul. 20, 2020 (JP) .............................. 2020-123850

(51) Int. Cl.
*G03G 15/00* (2006.01)

(52) U.S. Cl.
CPC ..... *G03G 15/6511* (2013.01); *G03G 15/5029* (2013.01)

(58) Field of Classification Search
None
See application file for complete search history.

(56) References Cited

U.S. PATENT DOCUMENTS

| | | | |
|---|---|---|---|
| 5,217,561 A * | 6/1993 | Ueda | B32B 38/0036 219/508 |
| 6,893,521 B2 * | 5/2005 | Sasaki | B32B 37/185 156/367 |
| 7,946,326 B2 * | 5/2011 | Lee | B65H 5/305 156/367 |
| 11,053,090 B1 * | 7/2021 | Noviello | H04N 1/00039 |
| 2004/0033095 A1 * | 2/2004 | Saffari | G07F 17/3202 400/120.01 |
| 2005/0079968 A1 * | 4/2005 | Trovinger | B65H 45/142 493/356 |
| 2005/0173063 A1 * | 8/2005 | Hiramoto | B32B 38/004 156/324 |
| 2011/0248440 A1 * | 10/2011 | Sugiyama | G03G 15/6552 271/272 |
| 2016/0257100 A1 * | 9/2016 | Tachibana | B32B 37/0053 |
| 2016/0360053 A1 | 12/2016 | Suzuki et al. | |
| 2017/0021603 A1 * | 1/2017 | Kikuchi | B32B 37/182 |

(Continued)

FOREIGN PATENT DOCUMENTS

| | | |
|---|---|---|
| JP | 9-150456 | 6/1997 |
| JP | 9-164593 | 6/1997 |
| JP | 2006-160429 | 6/2006 |

*Primary Examiner* — Francisco W Tschen
*Assistant Examiner* — Abhishek A Patwardhan
(74) *Attorney, Agent, or Firm* — Harness, Dickey & Pierce, P.L.C.

(57) ABSTRACT

A sheet processing apparatus includes circuitry configured to acquire a size of a two-ply sheet, in which two sheets are bonded together at one end, and a size of an insertion sheet; and control a sheet processing operation based on the size of the two-ply sheet and the size of the insertion sheet. The sheet processing operation includes inserting the insertion sheet in the two-ply sheet.

18 Claims, 47 Drawing Sheets

(56) References Cited

U.S. PATENT DOCUMENTS

| | | |
|---|---|---|
| 2017/0174465 A1 | 6/2017 | Morinaga et al. |
| 2017/0217239 A1 | 8/2017 | Suzuki et al. |
| 2017/0305706 A1* | 10/2017 | Takahashi .............. B65H 31/26 |
| 2018/0259895 A1* | 9/2018 | Shibasaki .............. B65H 31/38 |
| 2019/0276263 A1 | 9/2019 | Hidaka et al. |
| 2019/0284008 A1 | 9/2019 | Sakano et al. |
| 2019/0284009 A1 | 9/2019 | Suzuki et al. |
| 2019/0284010 A1 | 9/2019 | Asami et al. |
| 2019/0284011 A1 | 9/2019 | Furuhashi et al. |
| 2019/0284012 A1 | 9/2019 | Yoneyama et al. |
| 2019/0367317 A1 | 12/2019 | Haraguchi et al. |
| 2020/0140222 A1 | 5/2020 | Takahashi et al. |
| 2020/0239265 A1 | 7/2020 | Suzuki et al. |
| 2020/0247107 A1 | 8/2020 | Morinaga et al. |
| 2020/0247636 A1 | 8/2020 | Furuhashi et al. |
| 2020/0338877 A1* | 10/2020 | Takahashi ............. B32B 43/006 |
| 2020/0341414 A1 | 10/2020 | Watanabe et al. |
| 2020/0385231 A1 | 12/2020 | Kunieda et al. |
| 2020/0407187 A1* | 12/2020 | Hidaka .................. B65H 45/14 |
| 2021/0289090 A1* | 9/2021 | Monma .............. H04N 1/00602 |
| 2021/0294249 A1* | 9/2021 | Takahashi ............ B65H 39/043 |
| 2021/0325808 A1* | 10/2021 | Morinaga .......... G03G 15/5029 |

\* cited by examiner

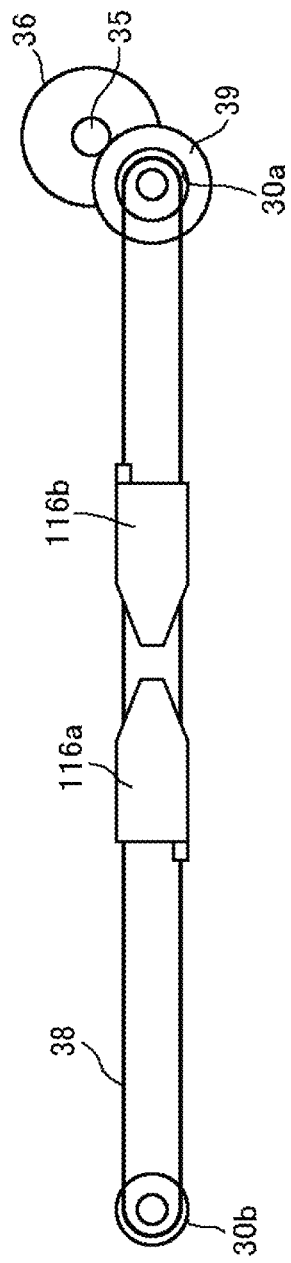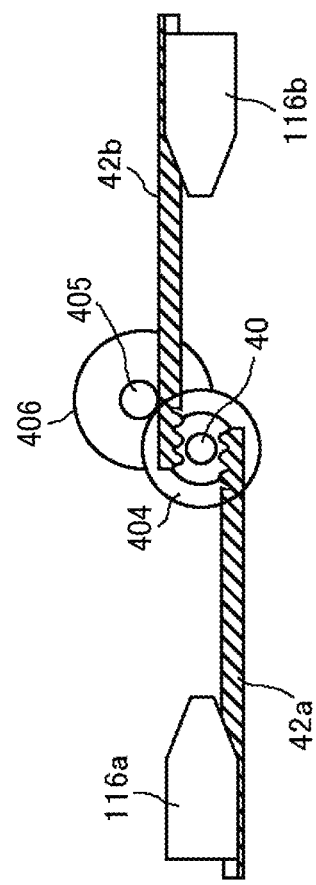

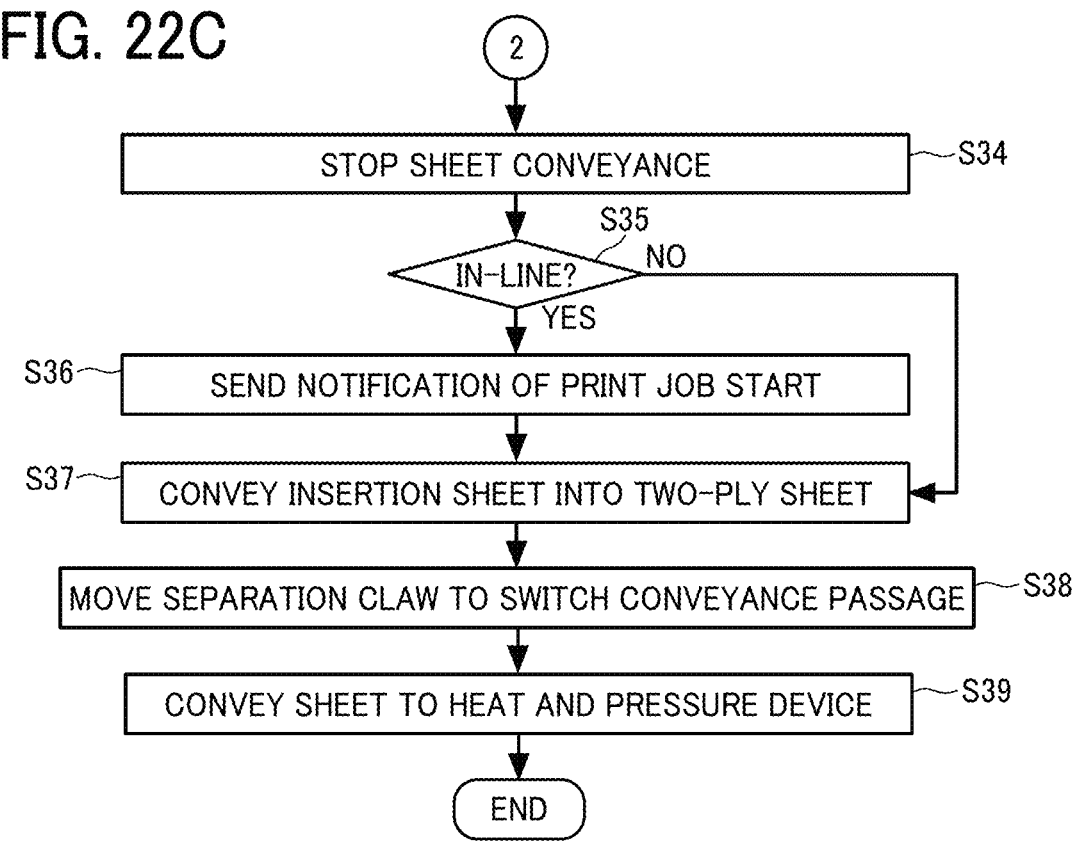
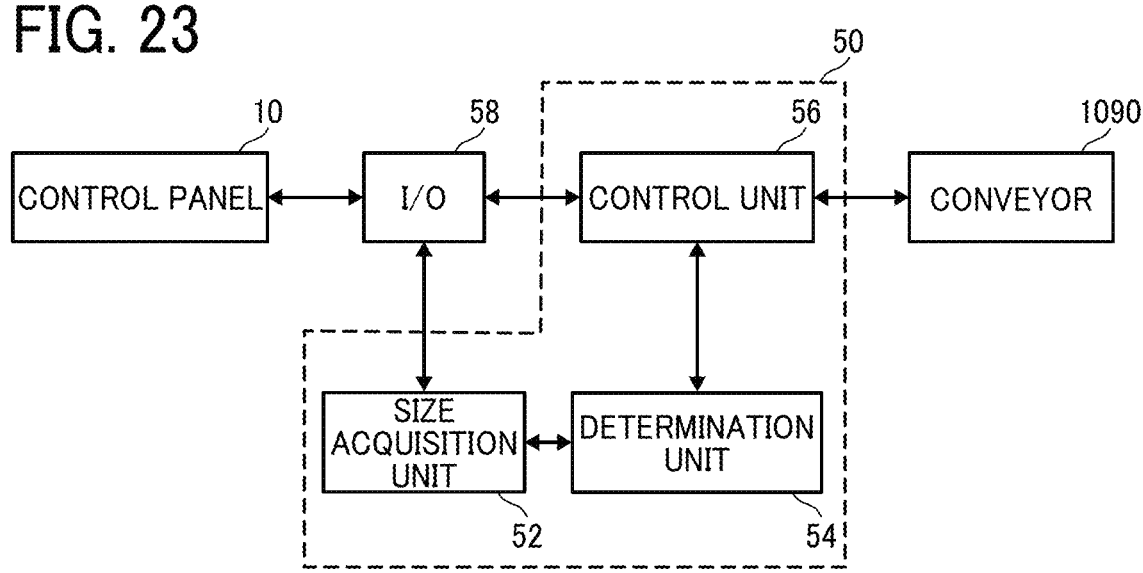

|  |  | LAMINATION FILM SIZE | | | |
|---|---|---|---|---|---|
|  |  | A5-SEF | A4-SEF | A4-LEF | A3-SEF |
| INSERTION SHEET SIZE | A5-SEF | MATCH | PENDING | PENDING | PENDING |
|  | A5-LEF | NO | PENDING | PENDING | PENDING |
|  | A4-SEF | NO | MATCH | NO | PENDING |
|  | A4-LEF | NO | NO | MATCH | PENDING |
|  | A3-SEF | NO | NO | NO | MATCH |

FIG. 30
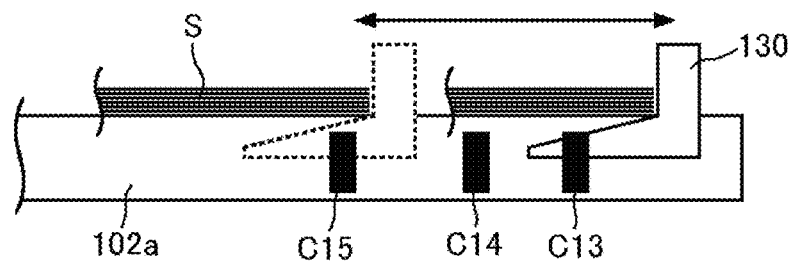
FIG. 31
|  |  | LENGTH SENSOR | | |
| --- | --- | --- | --- | --- |
|  |  | C10 | C11 | C12 |
| WIDTH SENSOR | C13 | A5-SEF | A4-SEF | A3-SEF |
|  | C14 | A5-SEF | A4-SEF | A3-SEF |
|  | C15 | A4-LEF | A4-SEF | A3-SEF |
FIG. 32
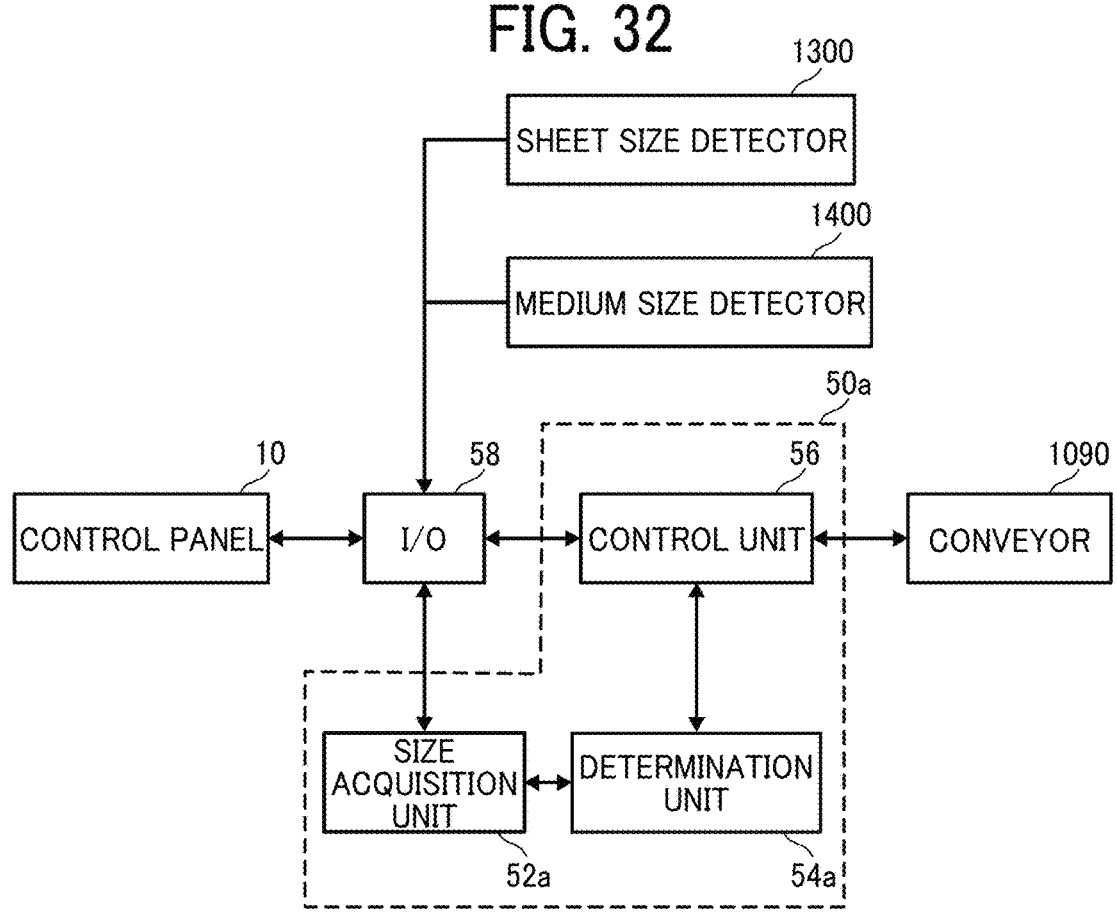

|  |  | LAMINATION FILM SIZE | | | |
|---|---|---|---|---|---|
|  |  | A5-SEF | A4-SEF | A4-LEF | A3-SEF |
| INSERTION SHEET SIZE | A5-SEF | 1 | 1 | 1 | 2 |
|  | A5-LEF | NO | 2 | 1 | 2 |
|  | A4-SEF | NO | 1 | NO | 1 |
|  | A4-LEF | NO | NO | 1 | 2 |
|  | A3-SEF | NO | NO | NO | 1 |

FIG. 36A

LAMINATION SETTINGS

■ LAMINATION FILM SIZE   ■ INSERTION SHEET SIZE

FOR A3 SIZE   A3 PORTRAIT

■ INSERTION SHEET NUMBER

1

EXECUTE LAMINATION

FIG. 36B

LAMINATION SETTINGS

■ LAMINATION FILM SIZE   ■ INSERTION SHEET SIZE

FOR A3 SIZE   A4 LANDSCAPE

■ INSERTION SHEET NUMBER

2

EXECUTE LAMINATION

FIG. 46

LAMINATION SETTING-1

SELECT LAMINATION FILM SIZE

[ FOR A3 ]  [ FOR A4 ]  [ FOR A5 ]

[ OK ]  [ BACK ]

FIG. 47

LAMINATION SETTING-2

SELECT ORIENTATION OF LAMINATION FILM

LONG SIDE IS CONNECTED    SHORT SIDE IS CONNECTED

[ OK ]  [ BACK ]

FIG. 48

LAMINATION SETTING-3

SELECT SIZE OF INSERTION SHEET

[ A3 ]  [ A4 ]  [ A5 ]

[ IRREGULAR SIZE ]

[ OK ]  [ BACK ]

FIG. 55A
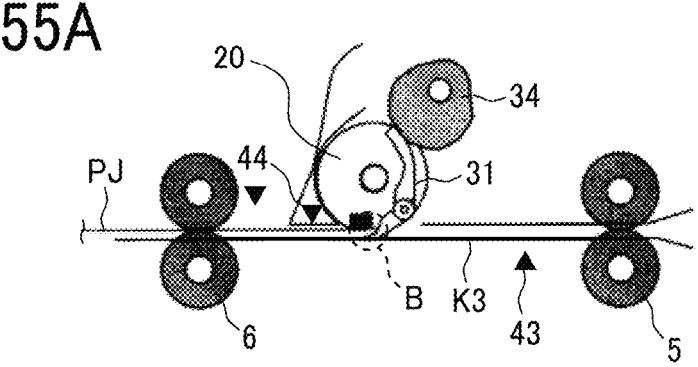
FIG. 55B
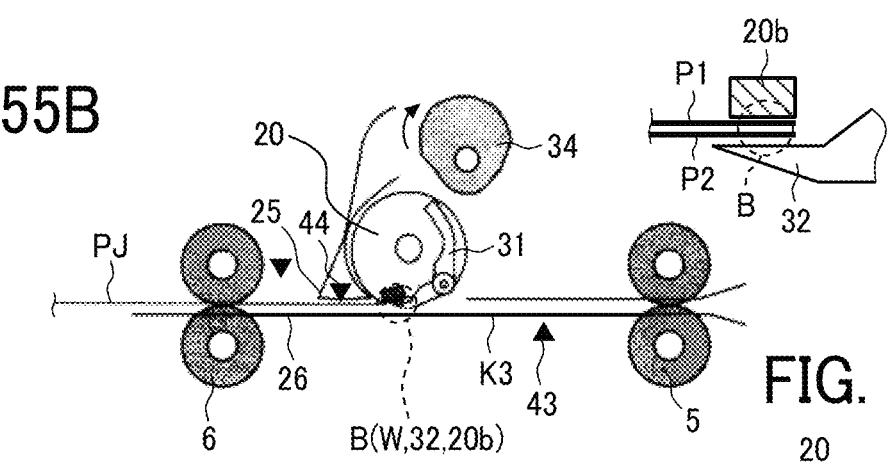
FIG. 55B′
FIG. 55C
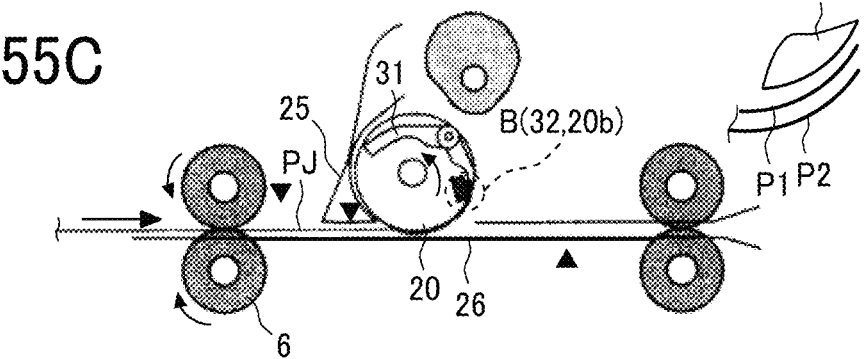
FIG. 55C′
FIG. 55D
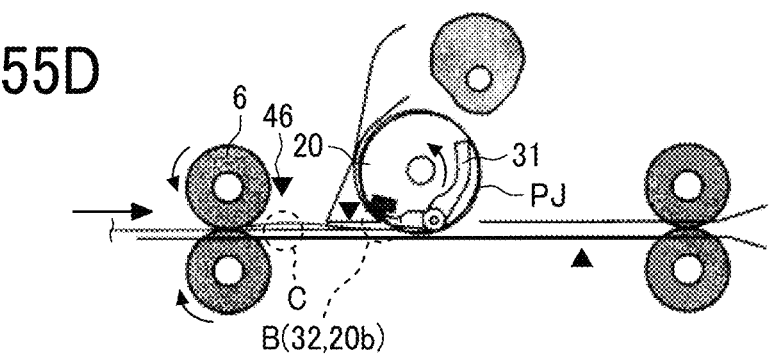

|  |  | LAMINATION FILM SIZE | | | |
|---|---|---|---|---|---|
|  |  | A5-SEF | A4-SEF | A4-LEF | A3-SEF |
| INSERTION SHEET SIZE | A5-SEF | MATCH | PENDING | PENDING | PENDING |
|  | A5-LEF | NO | PENDING | PENDING | PENDING |
|  | A4-SEF | NO | MATCH | NO | PENDING |
|  | A4-LEF | NO | NO | MATCH | PENDING |
|  | A3-SEF | NO | NO | NO | MATCH |

SHEET PROCESSING APPARATUS, LAMINATOR, IMAGE FORMING APPARATUS, AND IMAGE FORMING SYSTEM

CROSS-REFERENCE TO RELATED APPLICATIONS

This patent application is based on and claims priority pursuant to 35 U.S.C. § 119(a) to Japanese Patent Application Nos. 2020-073867, filed on Apr. 17, 2020, 2020-121256, filed on Jul. 15, 2020, and 2020-123850, filed on Jul. 20, 2020, in the Japan Patent Office, the entire disclosure of which is incorporated by reference herein.

BACKGROUND

Technical Field

This disclosure relates to a sheet processing apparatus, a laminator, an image forming apparatus, and an image forming system.

Related Art

There is known a lamination technique of inserting an insertion sheet (paper, photo, etc.) between a two-ply lamination sheet or lamination film (e.g., a lamination pouch or lamination folder) and applying heat and pressure to the two-ply lamination sheet to bond the two-ply lamination sheet. The two-ply sheet is made of two sheets (plies) bonded (sealed) on one side as if one sheet is folded.

For example, a laminator separates sheets (plies) of two-ply lamination film bonded at a front end, with a separation and release member, and then inserts a paper sheet therein.

SUMMARY

An embodiment of the present disclosure provides a sheet processing apparatus configured to insert an insertion sheet in a two-ply sheet in which two sheets are bonded together at one end. The sheet processing apparatus includes circuitry configured to acquire a size of the two-ply sheet and a size of the insertion sheet; and control a sheet processing operation performed by the sheet processing apparatus based on the size of the two-ply sheet and the size of the insertion sheet.

Another embodiment of the present disclosure provides a sheet processing apparatus configured to insert an insertion sheet in a two-ply sheet in which two sheets are bonded together at one end. The sheet processing apparatus includes a display and operation device, including a user interface, configured to display information and receive an operation input by a user, and circuitry. The circuitry is configured to display, on the display and operation device, a setting screen for the user to set a size and an orientation of the two-ply sheet, a size and an orientation of the insertion sheet, and a number of insertion sheets to be inserted in the two-ply sheet; and control a sheet processing operation by the sheet processing apparatus according to an instruction from the display and operation device.

Yet another embodiment of the present disclosure provides a sheet processing apparatus configured to insert an insertion sheet in a two-ply sheet in which two sheets are bonded together at one end. The sheet processing apparatus includes a display and operation device configured to display information and receive an operation input and circuitry configured to acquire a size of the two-ply sheet and a size of the insertion sheet input on the display and operation device. The circuitry is configured to determine an appearance of the two-ply sheet in which the insertion sheet is sandwiched based on the size of the two-ply sheet and the size of the insertion sheet, and control a sheet processing operation by the sheet processing apparatus based on a determination result of the appearance of the two-ply sheet.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 14A and 14B are schematic views illustrating examples of a drive configuration of the separation claw illustrated in FIG. 13;

FIG. 23 is a block diagram illustrating a control configuration of the sheet processing apparatus illustrated in FIGS. 1 to 12A;

FIG. 30 is a schematic view of a pair of sheet guides and width sensors to detect the width size of the lamination sheet on the sheet tray illustrated in FIG. 29A;

FIG. 31 is an example of a table used for determining a sheet size;

FIG. 32 is a block diagram illustrating a controller of the sheet processing apparatus according to the second embodiment;

FIGS. 36A and 36B are examples of a setting screen for insertion sheet number displayed on the control panel according to the third embodiment;

FIG. 46 is a first lamination setting screen displayed on the control panel according to the fourth embodiment;

FIG. 47 is a second lamination setting screen displayed on the control panel according to the fourth embodiment;

FIG. 48 is a third lamination setting screen displayed on the control panel according to the fourth embodiment;

FIG. 55A illustrates a state of the laminator subsequent to the state illustrated in FIG. 54D;

FIG. 55B illustrates gripping of the two-ply sheet by the gripper of the laminator illustrated in FIG. 51;

Figure 51:
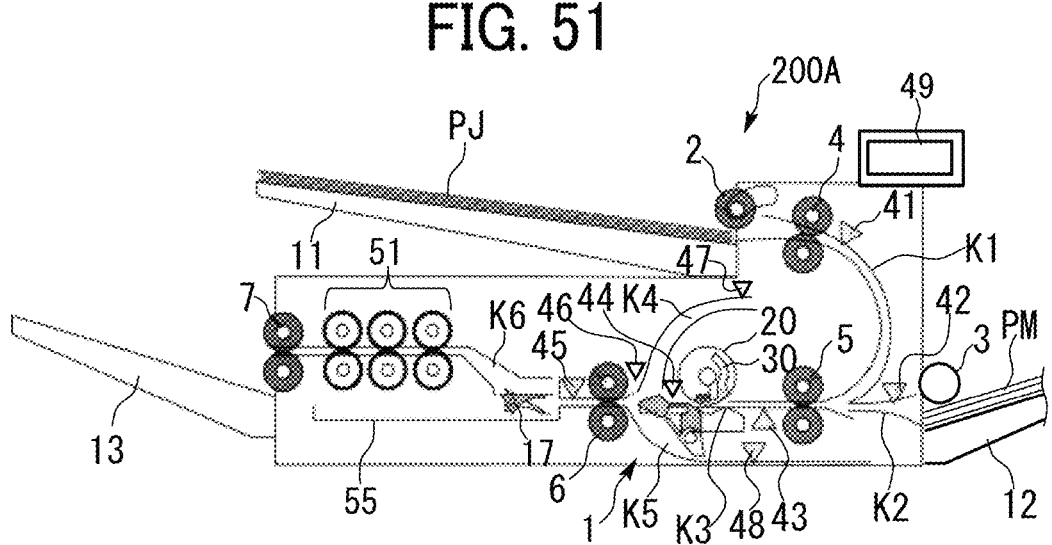
FIG. 51 is a schematic view illustrating a general arrangement of a laminator according to a fifth embodiment.
Figure 56A:
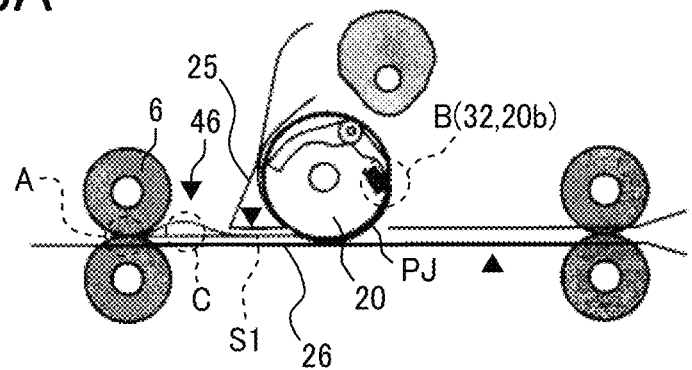
Figure 56B:
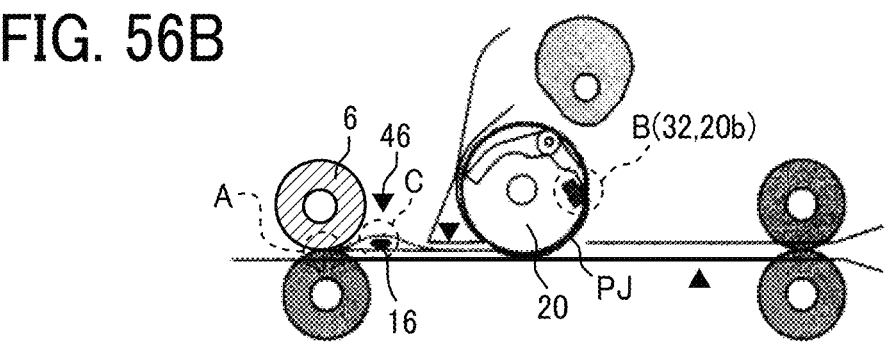
Figure 56C:
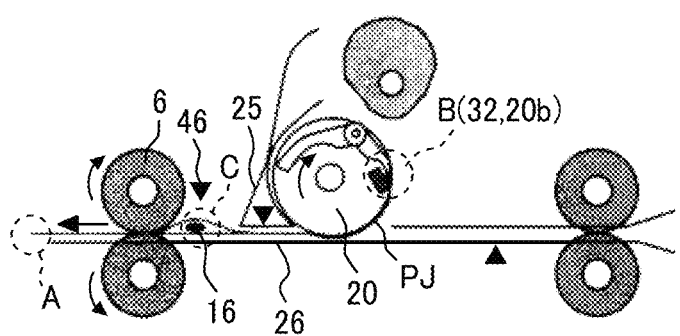
Figure 57A:
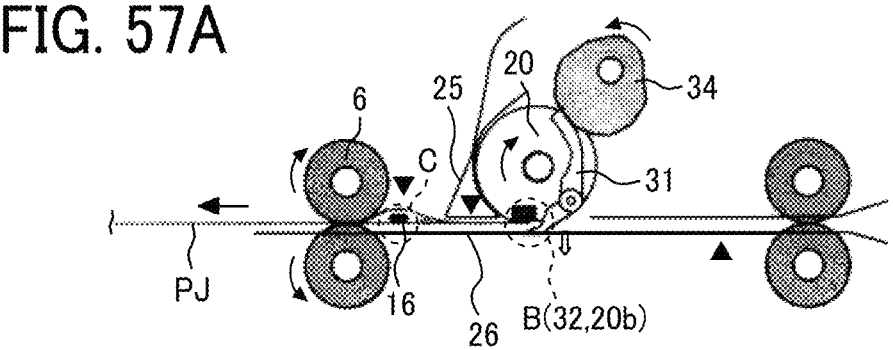
Figure 57B:
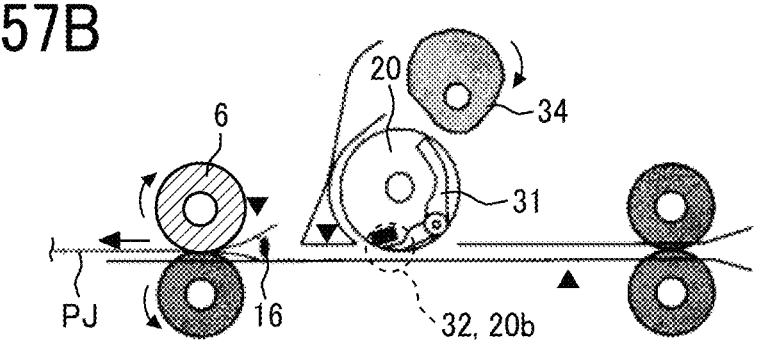
Figure 57C:
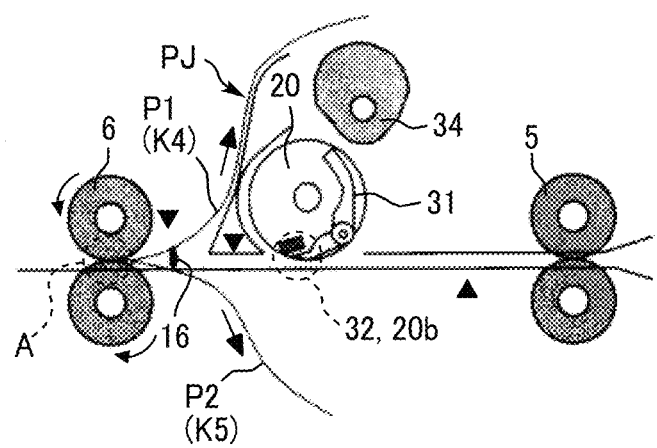
Figure 58A:
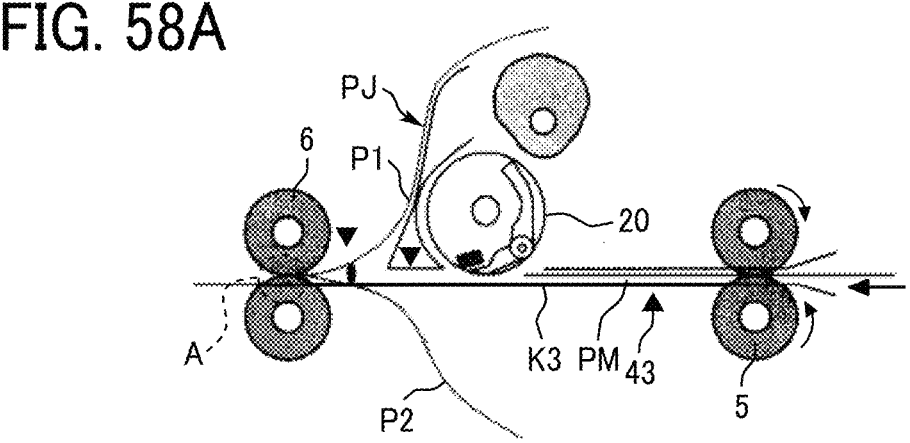
Figure 58B:
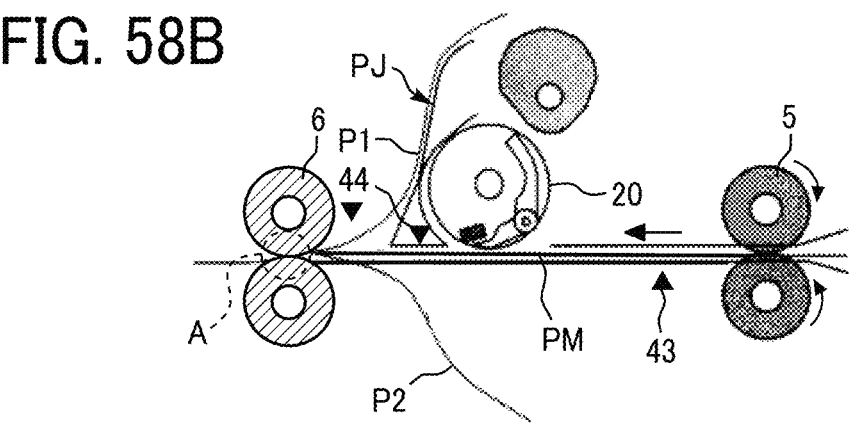
Figure 58C:
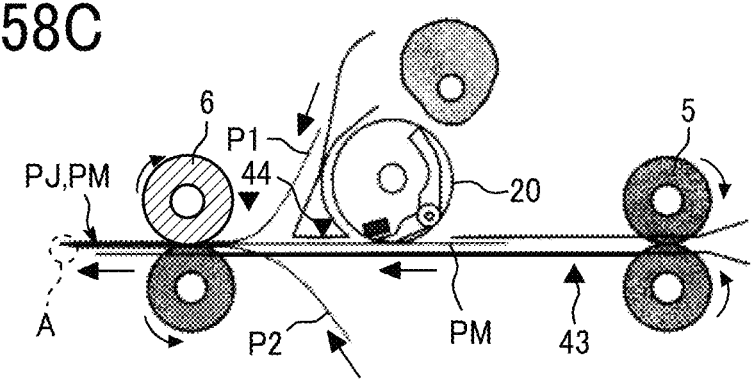
Figure 59A:
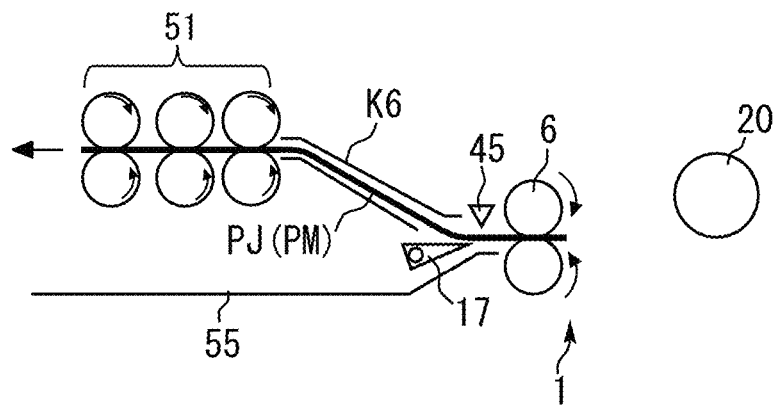
Figure 59B:
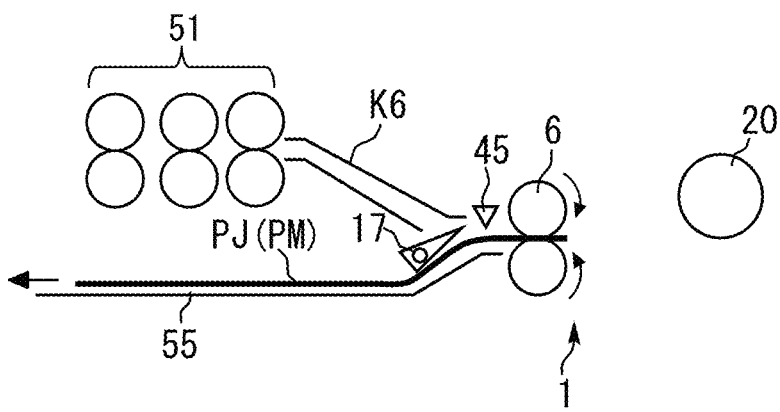
Figure 60:
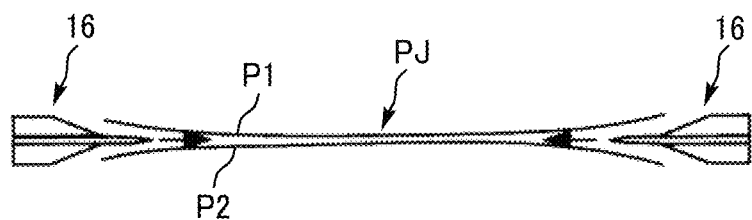
Figure 62A:
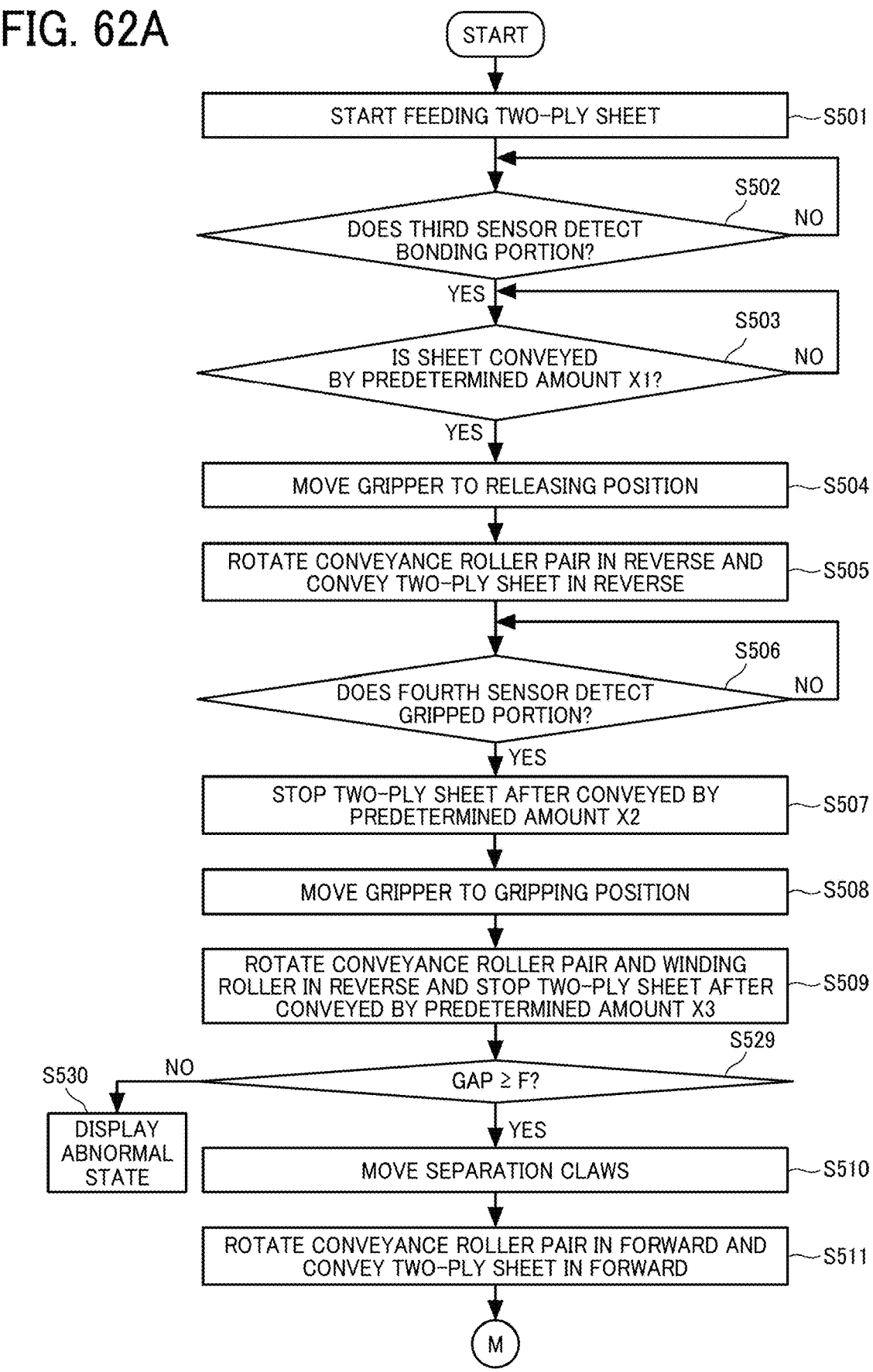
Figure 62B:
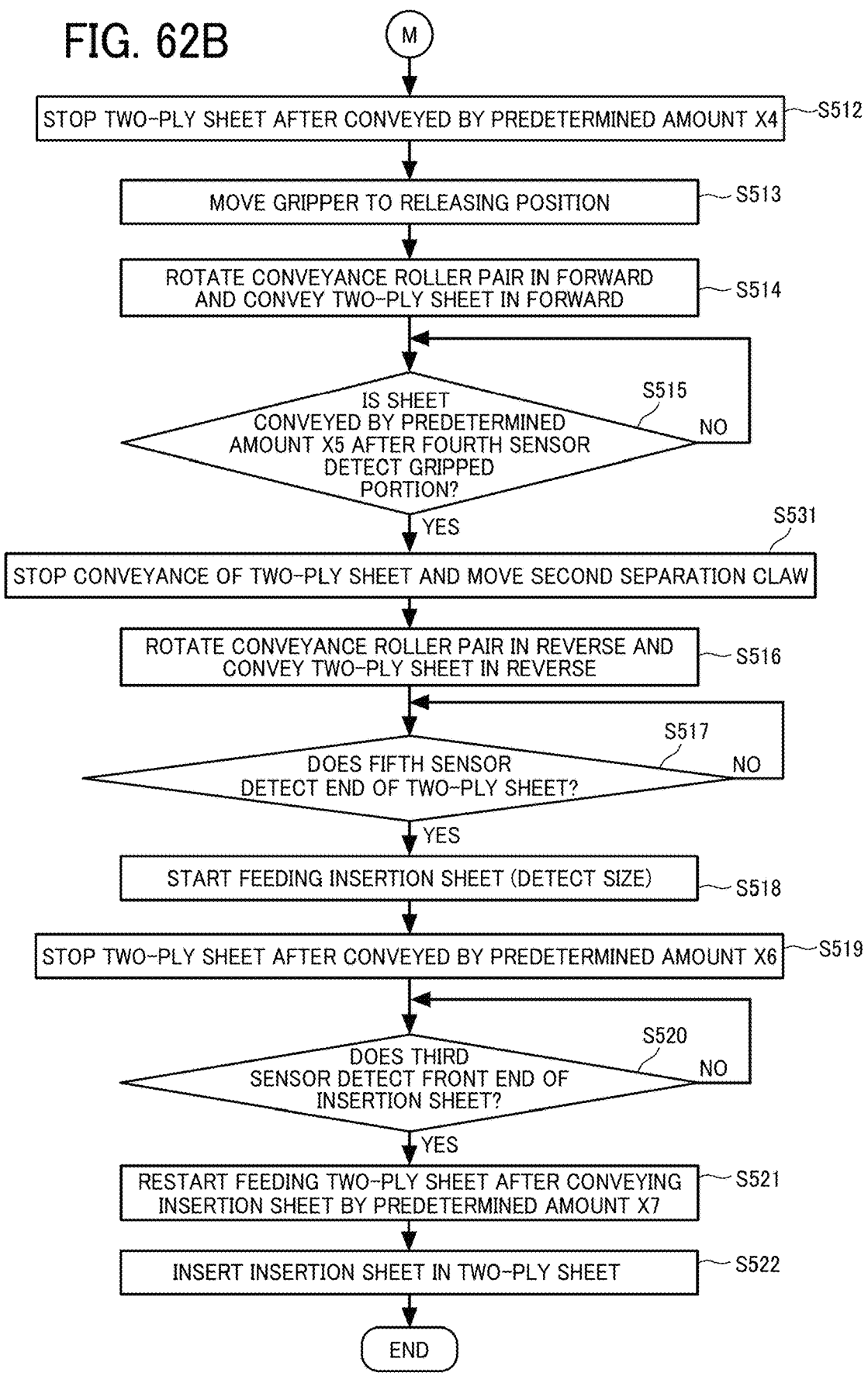
Figure 63:
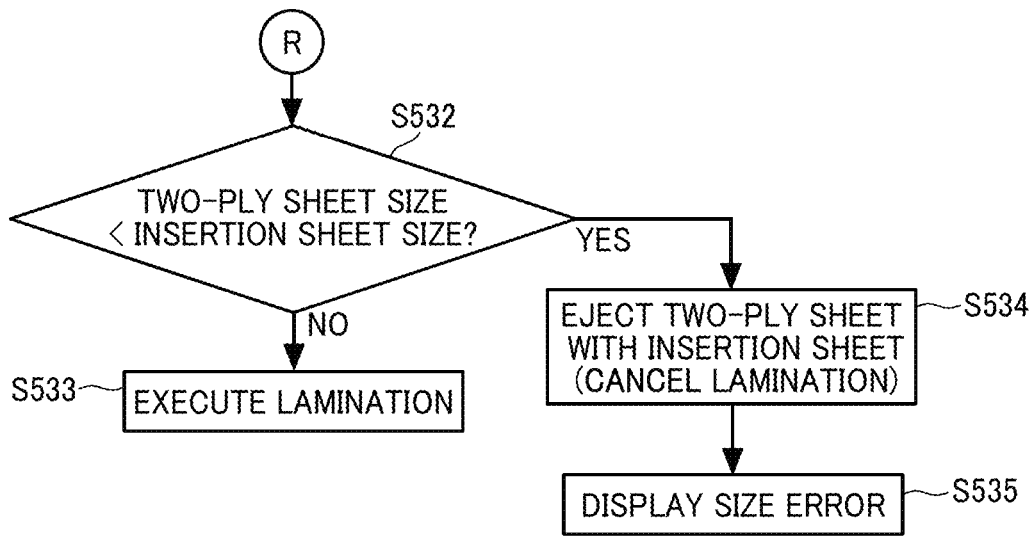
Figure 64:
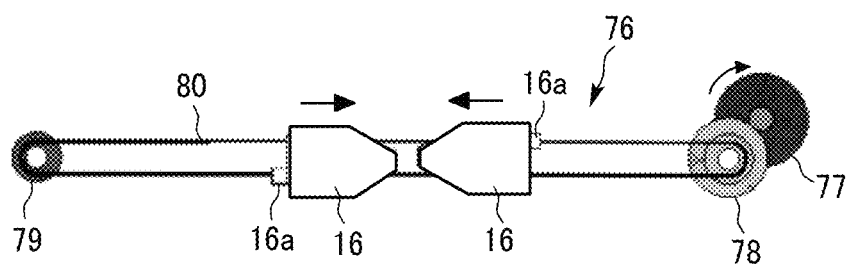
Figure 65:
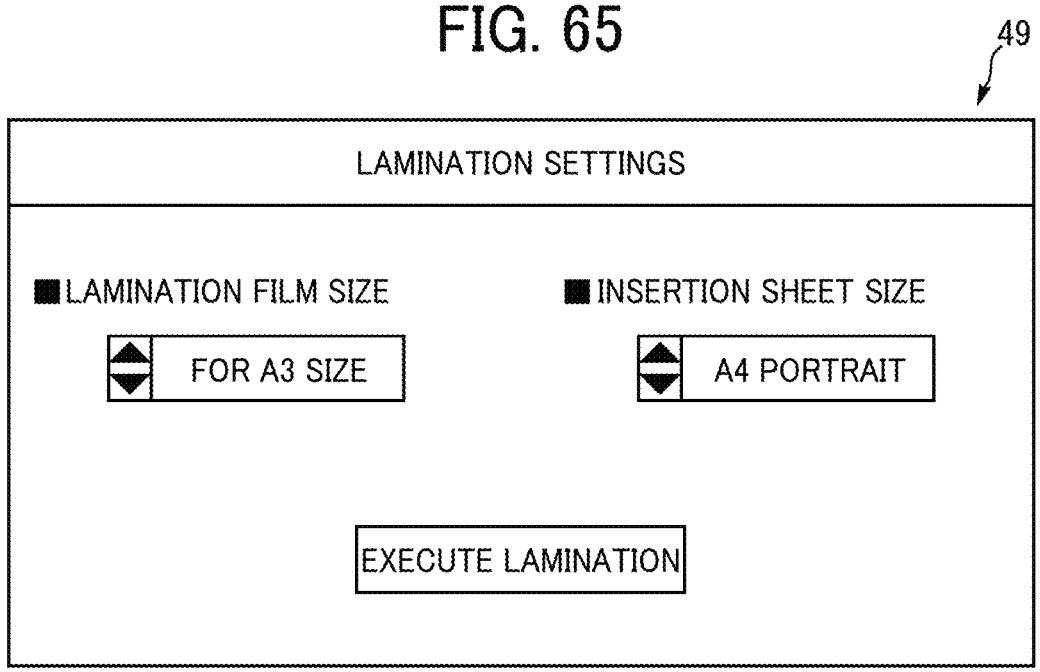
Figure 66:
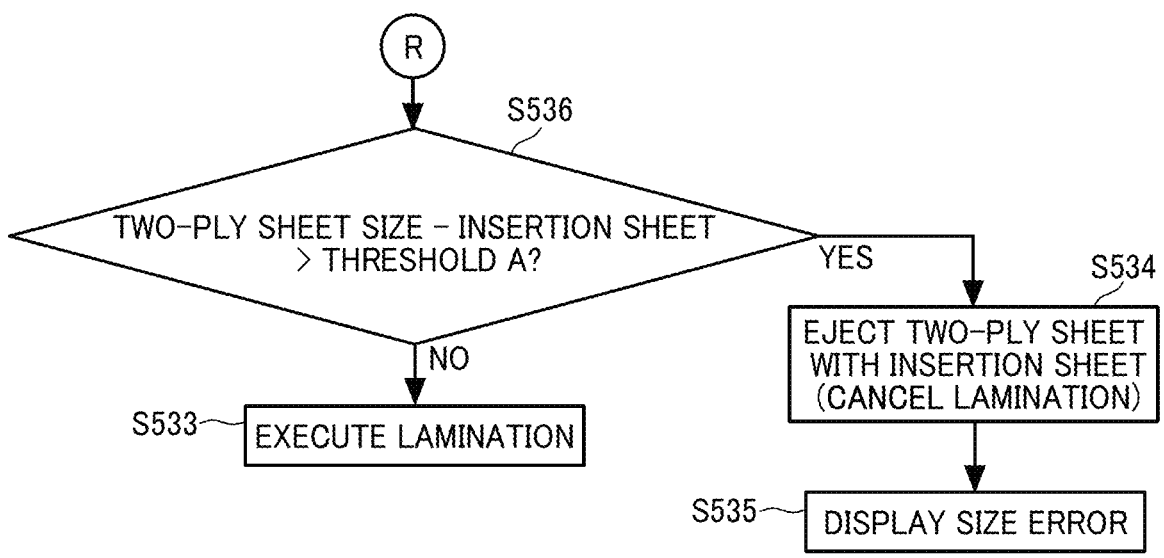
Figures 67, 68:
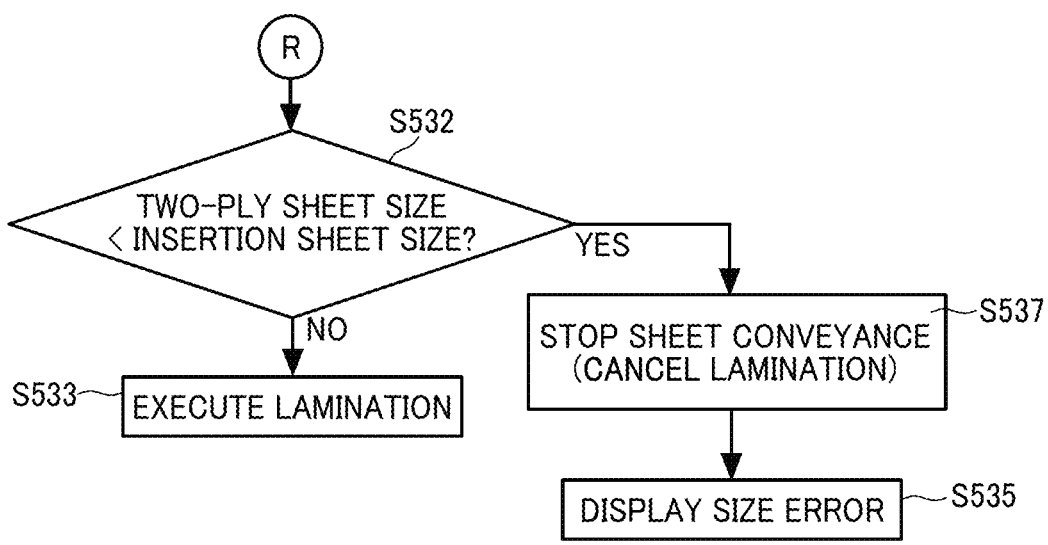
Figure 69:
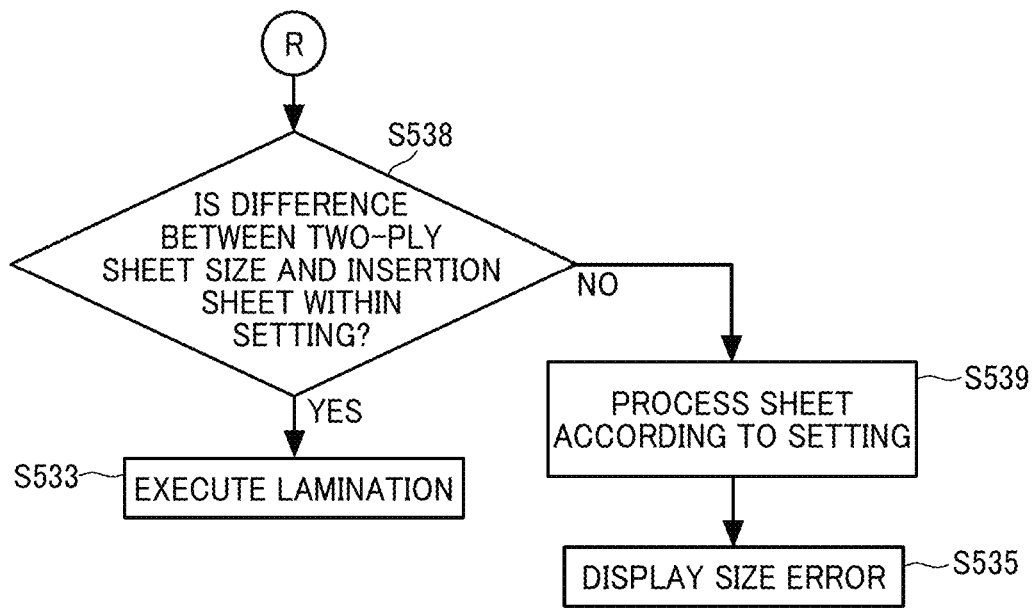
Figure 70:
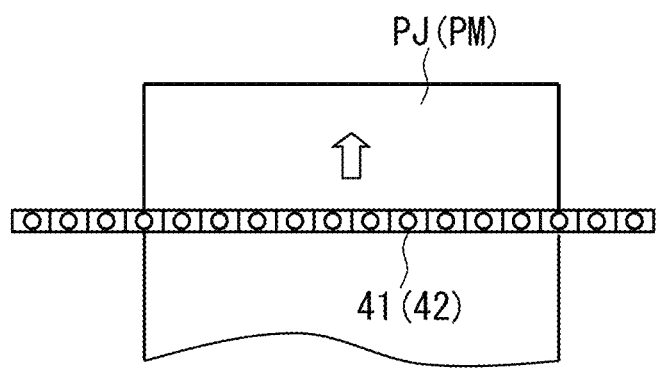
Figure 71:
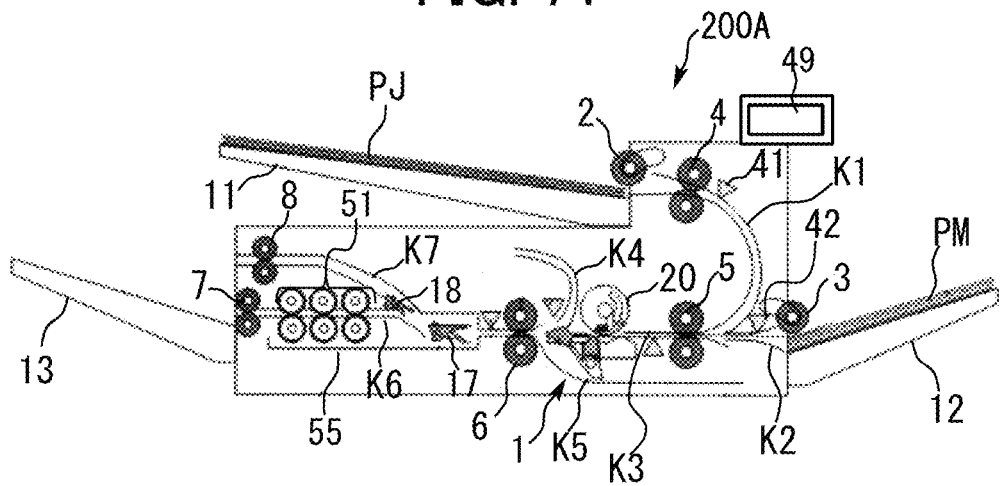
Figure 72A:
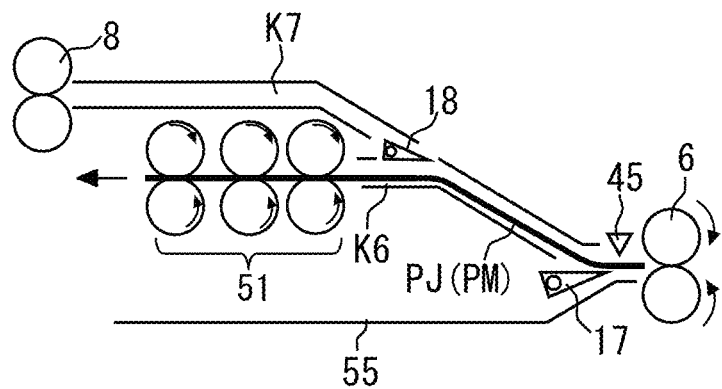
Figure 72B:
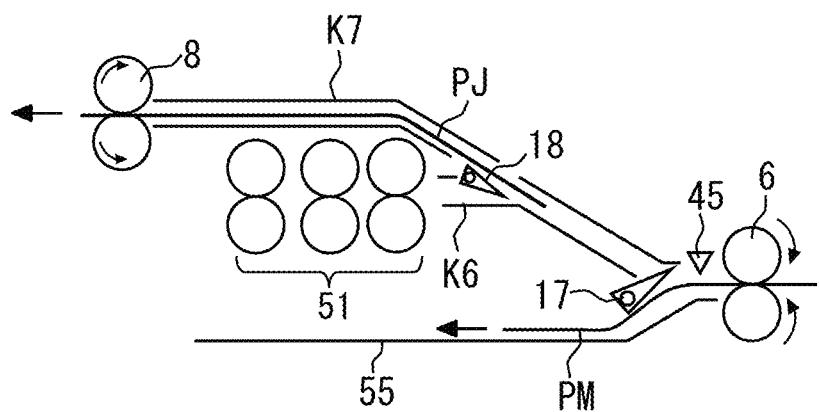
Figure 73:
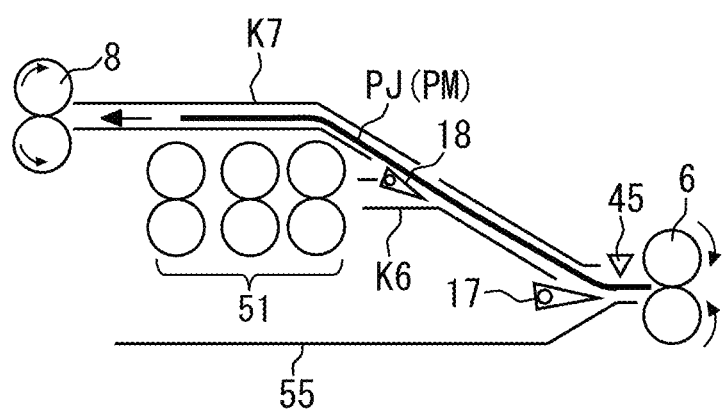
Figure 74:
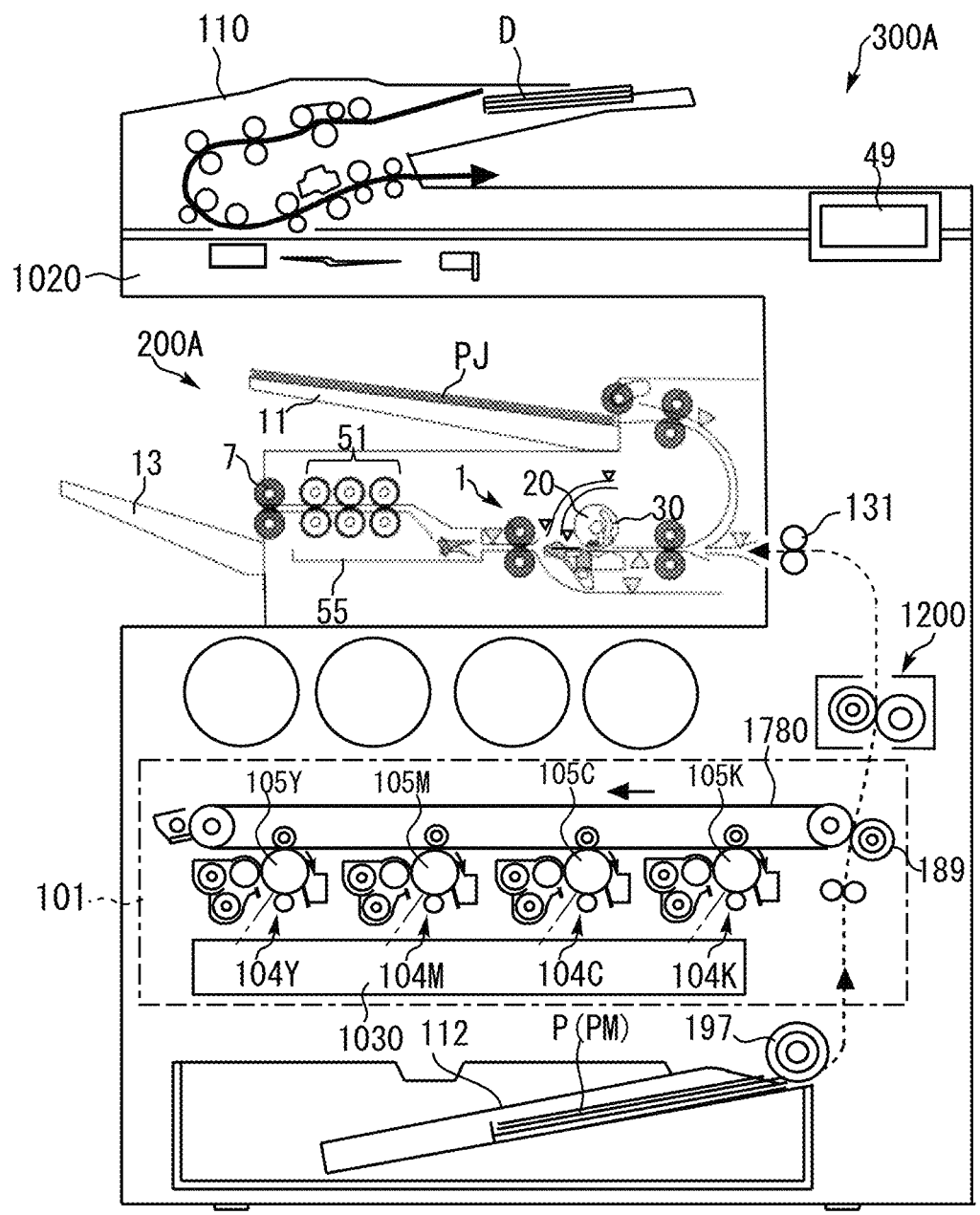
Figure 75:
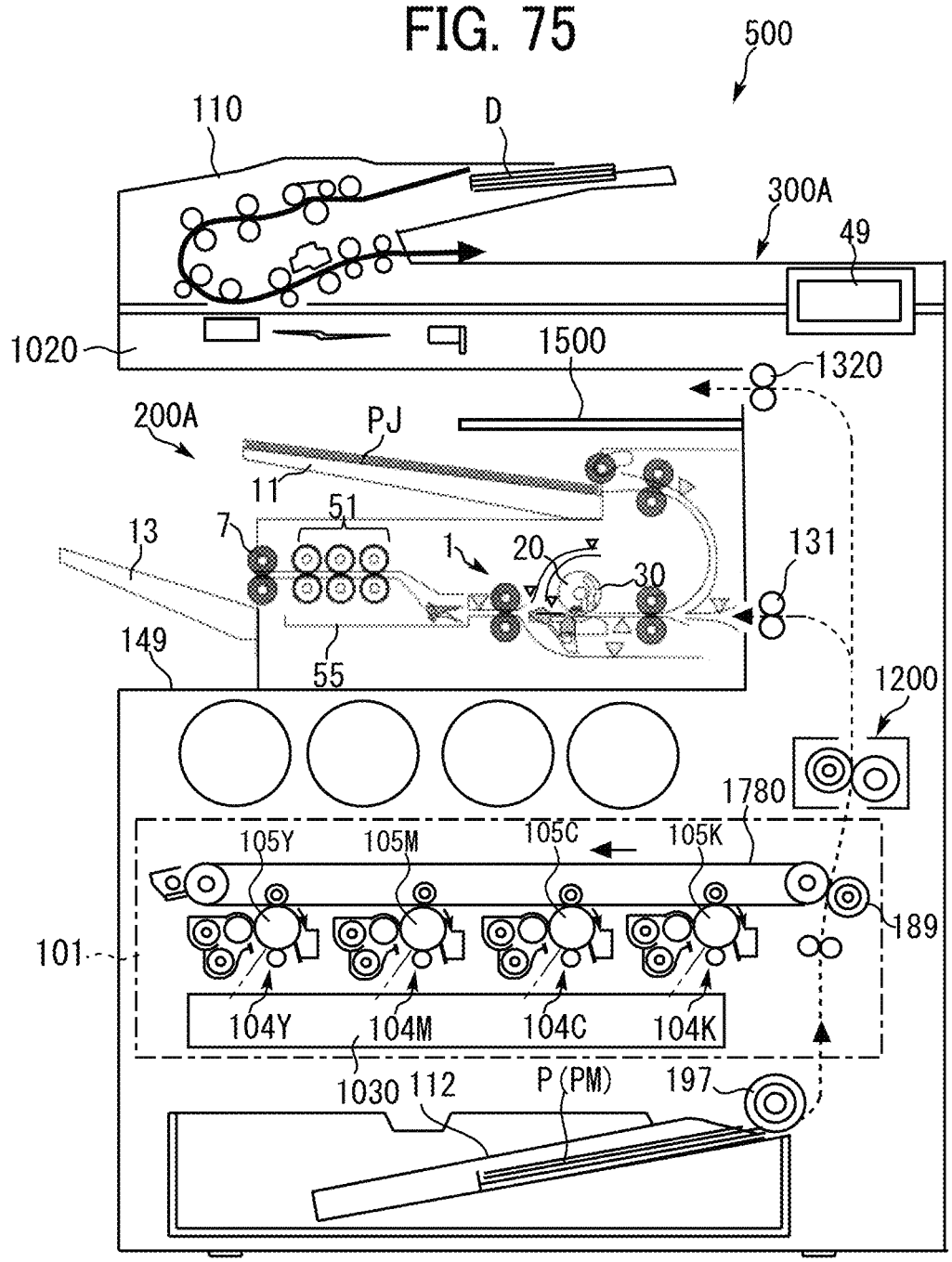

55B' is an enlarged view of the two-ply sheet in FIG. 55B;

FIG. 55C illustrates winding, around the winding roller, of the two-ply sheet gripped by the gripper, subsequent to the state illustrated in FIG. 55B;

FIG. 55C' is an enlarged view of the two-ply sheet in FIG. 55C;

FIG. 55D illustrates creatin of a gap in the two-ply sheet subsequent to the state illustrated in FIG. 55C;

FIGS. 56A to 56C are schematic views illustrating operations of the laminator illustrated in FIG. 51, subsequent to the state illustrated in FIG. 55D;

FIGS. 57A to 57C are schematic views illustrating operations of the laminator illustrated in FIG. 51, subsequent to the state illustrated in FIG. 56C;

FIGS. 58A to 58C are schematic views illustrating operations of the laminator illustrated in FIG. 51, subsequent to the state illustrated in FIG. 57C;

FIG. 59A is a diagram illustrating a normal operation of the laminator following the state illustrated in FIG. 58C;

FIG. 59B is a diagram illustrating an operation of the laminator at the occurrence of sheet size mismatch, subsequent to the state illustrated in FIG. 58C;

FIG. 60 is a schematic view illustrating separation claws of the laminator illustrated in FIG. 51, inserted into a two-ply sheet in a width direction of the two-ply sheet;

FIGS. 61A to 61E are perspective views illustrating operation of the separation claws illustrated in FIG. 60;

FIG. 62 (62A and 62B) is a flowchart illustrating control of operation of the laminator illustrated in FIG. 51;

FIG. 63 is a flowchart illustrating control of operation of the laminator, subsequent to the operation illustrated in FIG. 62;

FIG. 64 is a schematic view illustrating a configuration of a drive device for the separation claws illustrated in FIG. 60;

FIG. 65 is a diagram illustrating an example of a display screen on the control panel of the laminator illustrated in FIG. 51;

FIG. 66 is a flowchart illustrating control operation performed by the laminator according to a first modification of the fifth embodiment;

FIG. 67 is a table illustrating the relationship between the size difference between the two-ply sheet and the insertion sheet and feasibility of the laminating process;

FIG. 68 is a flowchart illustrating control operation performed by the laminator according to a second modification of the fifth embodiment;

FIG. 69 is a flowchart illustrating control operation performed by the laminator according to a third modification of the fifth embodiment;

FIG. 70 is a diagram illustrating a sheet size sensor according to a fourth modification of the fifth embodiment;

FIG. 71 is a schematic view illustrating a laminator according to a fifth modification of the fifth embodiment;

FIG. 72A is a diagram illustrating a normal operation performed by the laminator in FIG. 71;

FIG. 72B is a diagram illustrating an operation at the occurrence of sheet size mismatch in the laminator in FIG. 71;

FIG. 73 is a diagram illustrating an operation of the laminator illustrated in FIG. 71 at the occurrence of sheet size mismatch;

FIG. 74 is a schematic view illustrating an image forming apparatus according to a sixth modification of the fifth embodiment; and FIG. 75 is a schematic view illustrating an image forming system according to a seventh modification of the fifth embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

In the case of lamination film made of two film sheets bonded or connected on one side, inconveniences may occur depending on the combination of the size of lamination film and the size of a sheet (hereinafter "insertion sheet") covered with the lamination film.

For example, when the size of the lamination film is smaller than the size of the insertion sheet, the insertion sheet is not within the laminating range, and accordingly proper lamination is not available. Further, when the size of the insertion sheet is too small with respect to the size of the lamination film, the margin becomes large and the lamination film is wasted.

Therefore, the embodiment described below concerns a sheet processing apparatus that acquires the size of a two-ply sheet (lamination film) and the size of a sheet medium (insertion sheet) and controls the sheet processing in accordance with the size relationship thereof.

Figure 1:
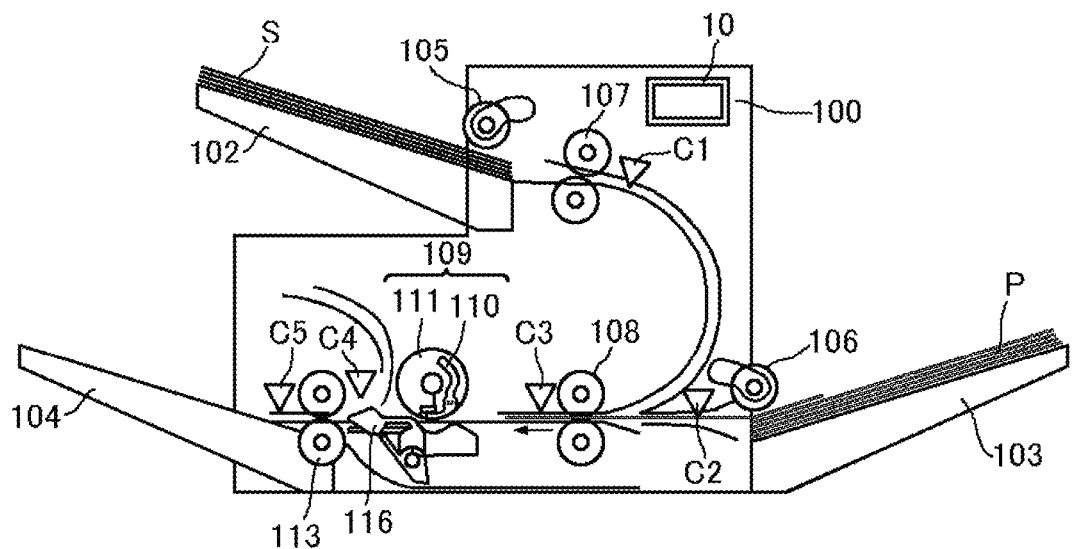
FIG. 1 is a schematic view illustrating a general arrangement of a sheet processing apparatus according to one embodiment of the present disclosure.

FIG. 1 is a schematic view illustrating a general arrangement of a sheet processing apparatus according to one embodiment of the present disclosure. A sheet processing apparatus 100 according to the present embodiment is to separate two sheets (plies) of a two-ply sheet (hereinafter referred to as a lamination sheet S) and to insert and sandwich an insertion sheet P between the separated sheets of the two-ply sheet.

The lamination sheet S is a two-ply sheet constructed of two overlapping sheets (plies) and bonded (or joined) at one portion (or on one side). For example, there is a two-ply sheet in which a first side is a transparent sheet such as a transparent polyester sheet and the opposite side is a transparent or opaque sheet and bonded to the other sheet on one side thereof. The two-ply sheet also includes a lamination film.

The insertion sheet P is an example of a sheet medium that is inserted into the two-ply sheet. The insertion sheet P is an example of a sheet medium that is inserted in the two-ply sheet and can be plain paper, thick paper, postcards, envelopes, thin paper, coated paper (art paper, etc.), tracing paper, overhead projector (OHP) transparencies, and the like.

As illustrated in FIG. 1, a sheet processing apparatus 100 includes a sheet tray 102 that is a two-ply sheet tray on which the lamination sheets S are placed, a pickup roller 105 that feeds the lamination sheet S from the sheet tray 102, and a conveyance roller pair 107. The sheet processing apparatus 100 further includes a sheet feeding tray 103 that is an insertion sheet tray on which the insertion sheet P is placed, and a pickup roller 106 that feeds the insertion sheet P from the sheet feeding tray 103.

A sheet sensor C1 to detect the position of the lamination sheet S being conveyed is disposed downstream from the conveyance roller pair 107 in a conveyance direction of the lamination sheet S. A sheet sensor C2 to detect the position of the insertion sheet P being conveyed is disposed downstream from the pickup roller 106 in a conveyance direction of the insertion sheet P.

Downstream from the conveyance roller pair 107 and the pickup roller 106 in the conveyance direction, the sheet processing apparatus 100 further includes an entrance roller pair 108 (a first conveyor), a winding roller 109 as a rotator, an exit roller pair 113 (a second conveyor), and an output tray 104. The sheet processing apparatus 100 further includes a pair of separation claws 116a and 116B (see FIGS. 14A and 14B, also collectively referred to as "separation claws 116") between the winding roller 109 and the exit roller pair 113. The separation claws 116 are movable in the width direction of the lamination sheet S.

A sheet sensor C3 to detect the position of the lamination sheet S and the insertion sheet P being conveyed is disposed downstream from the entrance roller pair 108 in the conveyance direction. An abnormality detector C4 to detect the state of the lamination sheet S is disposed downstream from the winding roller 109 in the conveyance direction. A sheet sensor C5 to detect the position of the lamination sheet S being conveyed is disposed downstream from the exit roller pair 113 in the conveyance direction.

The pickup roller 105, the conveyance roller pair 107, the entrance roller pair 108, and the winding roller 109 are examples of a first feeder to feed a two-ply sheet. The pickup roller 106, the entrance roller pair 108 and the winding roller 109 are examples of a second feeder.

On the exterior of the sheet processing apparatus 100, a control panel 10 is provided as a display and operation device that displays information on the sheet processing apparatus 100 and receives operation input. Further, the control panel 10 also serves as a notification device to output a perceptual signal to a user. As an alternative, a notification device other than the control panel 10 may be separately provided in the sheet processing apparatus 100.

The sheet processing apparatus 100 according to the present embodiment stores the lamination sheet S and the insertion sheet P on separate trays. The sheet processing apparatus 100 opens the lamination sheet S and inserts the insertion sheet P therein while conveying the lamination sheet S. Then, the exit roller pair 113 ejects and stacks the lamination sheet S, in which the insertion sheet P is inserted, onto the output tray 104.

Figure 2:
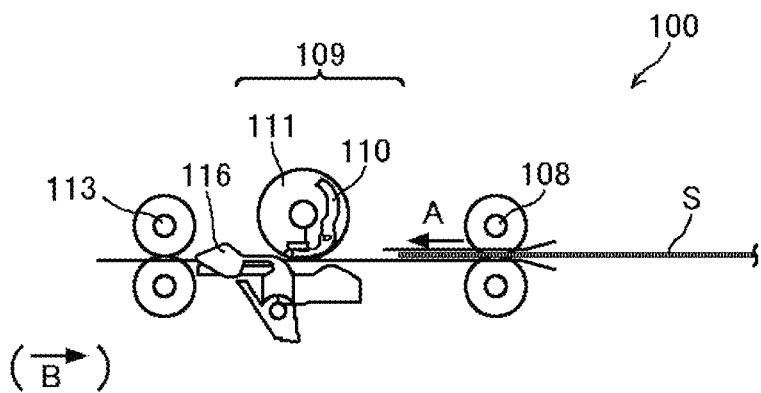
FIG. 2 is a view illustrating a main part of the sheet processing apparatus illustrated in FIG. 1, conveying a lamination sheet toward a winding roller.

FIG. 2 is a view of a main part of the sheet processing apparatus 100 illustrated in FIG. 1. As illustrated in FIG. 2, each of the entrance roller pair 108 and the exit roller pair 113 is, for example, two rollers paired with each other and driven by a driver (a motor or the like). The entrance roller pair 108 rotates in one direction, whereas the exit roller pair 113 rotates in forward and reverse directions, thereby nipping and conveying the lamination sheet S and the insertion sheet P.

The entrance roller pair 108 conveys the lamination sheet S and the insertion sheet P toward the exit roller pair 113. The conveyance direction indicated by arrow A is also referred to as a forward conveyance direction or direction A (a second direction).

By contrast, the exit roller pair 113 can switch the direction of rotation between the forward direction and the reverse direction. The exit roller pair 113 can convey the nipped lamination sheet S in the forward conveyance direction toward the output tray 104 (see FIG. 1) and the reverse direction in which the lamination sheet S is drawn back toward the winding roller 109. The conveyance direction toward the winding roller 109 (the direction indicated by arrow B and reverse to the forward conveyance direction) is referred to as the reverse conveyance direction or direction B (a first direction toward a rotator).

Between the entrance roller pair 108 and the exit roller pair 113, the sheet processing apparatus 100 further includes the winding roller 109 that is the rotator and the separation claw 116. Driven by a driver (motor or the like), the winding roller 109 rotates in the forward and reverse directions, and the direction of rotation can be switched between the forward direction and the reverse direction (clockwise and counterclockwise).

The winding roller 109 includes a roller 111 and a movable sheet gripper 110 disposed on the roller 111 to grip the lamination sheet S. The movable sheet gripper 110 grips an end of the lamination sheet S together with the roller 111. The sheet gripper 110 may be integral with the outer circumference of the roller 111, or may be a separate component.

With reference to FIGS. 1 to 12B, a description is given of a series of processes of the sheet processing apparatus 100, that is, operations from separation of the lamination sheet S to insertion of the insertion sheet P. In FIGS. 3 to 12B, elements identical to those illustrated in FIG. 1 or 2 are given identical reference numerals, and the descriptions thereof are omitted.

In FIG. 1, the lamination sheets S are stacked on the sheet tray 102 such that the bonded side is on the downstream side in the direction of feeding (conveyance direction) of the pickup roller 105. In the sheet processing apparatus 100, the pickup roller 105 picks up the lamination sheet S from the sheet tray 102, and the conveyance roller pair 107 conveys the lamination sheet S toward the entrance roller pair 108.

Next, as illustrated in FIG. 2, the lamination sheet S is conveyed by the entrance roller pair 108 toward the winding roller 109. The sheet processing apparatus 100 conveys the lamination sheet S with the bonded end (the bonded end is one of four sides) on the downstream side in the forward conveyance direction indicated by arrow A (direction A).

Figure 3:
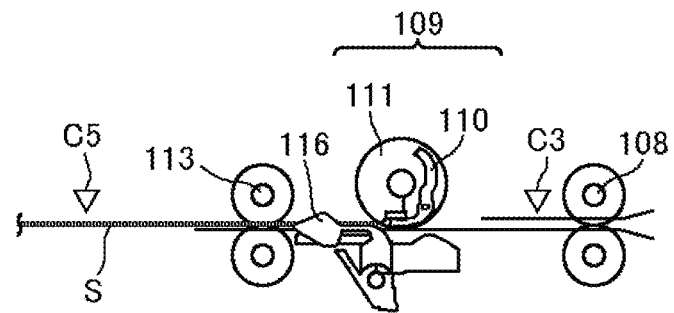
FIG. 3 is a view illustrating the main part of the sheet processing apparatus suspending sheet conveyance, subsequent to the state in FIG. 2.

Subsequently, as illustrated in FIG. 3, the sheet processing apparatus 100 suspends conveyance of the lamination sheet S after the rear end of the lamination sheet S in the forward conveyance direction passes the winding roller 109. Such an action is performed when the lamination sheet S is conveyed a given amount from the sheet sensor C3, triggered by detection of the end of the lamination sheet S by the sheet sensor C3.

Figure 4:
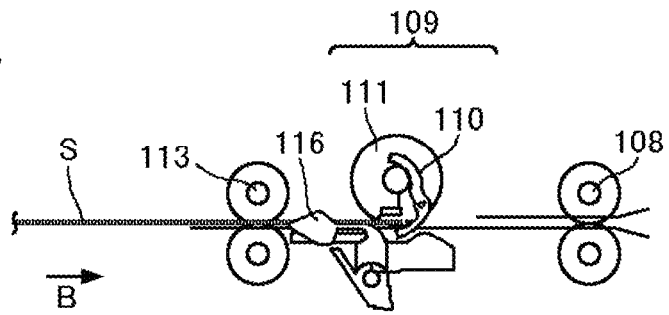
FIG. 4 is a view illustrating the main part of the sheet processing apparatus conveying the lamination sheet, subsequent to the state in FIG. 3.

Next, as illustrated in FIG. 4, the sheet processing apparatus 100 opens the sheet gripper 110, reverses the rotation direction of the exit roller pair 113, and conveys the lamination sheet S in the reverse conveyance direction (direction B) toward the opened sheet gripper 110.

Figure 5:
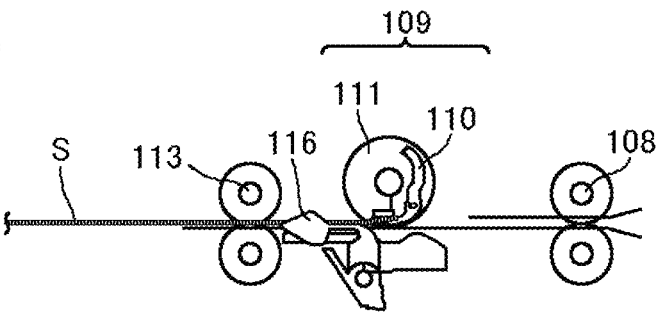
FIG. 5 is a view illustrating the main part of the sheet processing apparatus in a state subsequent to the state in FIG. 4.

Subsequently, as illustrated in FIG. 5, the sheet processing apparatus 100 suspends conveyance of the lamination sheet S when the end of the lamination sheet S is inserted in the sheet gripper 110 and closes the sheet gripper 110 to grip the end of the lamination sheet S. In addition, such an action is performed as the lamination sheet S is conveyed as a designated amount.

Figure 6:
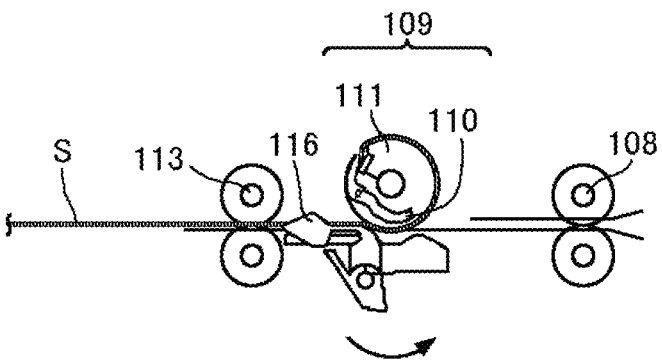
FIG. 6 is a view illustrating the main part of the sheet processing apparatus in which the winding roller rotates in reverse to wind the lamination sheet around the winding roller, subsequent to the state in FIG. 5.

Then, as illustrated in FIG. 6, the sheet processing apparatus 100 rotates the winding roller 109 counterclockwise in the drawings and winds the lamination sheet S around the winding roller 109. The lamination sheet S is wound around the winding roller 109 from the side where the two overlapping sheets of the lamination sheet S are not bonded.

Figure 7:
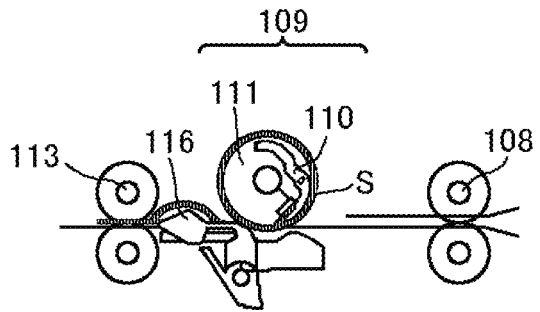
FIG. 7 is a view illustrating the main part of the sheet processing apparatus in which separation claws are inserted into a space between two sheets (plies) of the lamination sheet, subsequent to the state in FIG. 6.

As illustrated in FIG. 7, when the lamination sheet S is wound around the winding roller 109, a difference is created between the two sheets in the amount of winding of the lamination sheet S around circumference of the winding roller 109. There is a surplus of the inner ply, which becomes loose toward the bonded end. As a result, a space is created between the two sheets constructing the two-ply sheet. As inserting the separation claws 116 are inserted into the generated space from both sides of the lamination sheet S, the space between the two sheets can be reliably maintained. Such an action is performed when the lamination sheet S is conveyed a given amount from the sheet sensor C5 triggered by detection of the end of the lamination sheet S by the sensor C5.

The separation claws 116 are described further.

Figure 13:
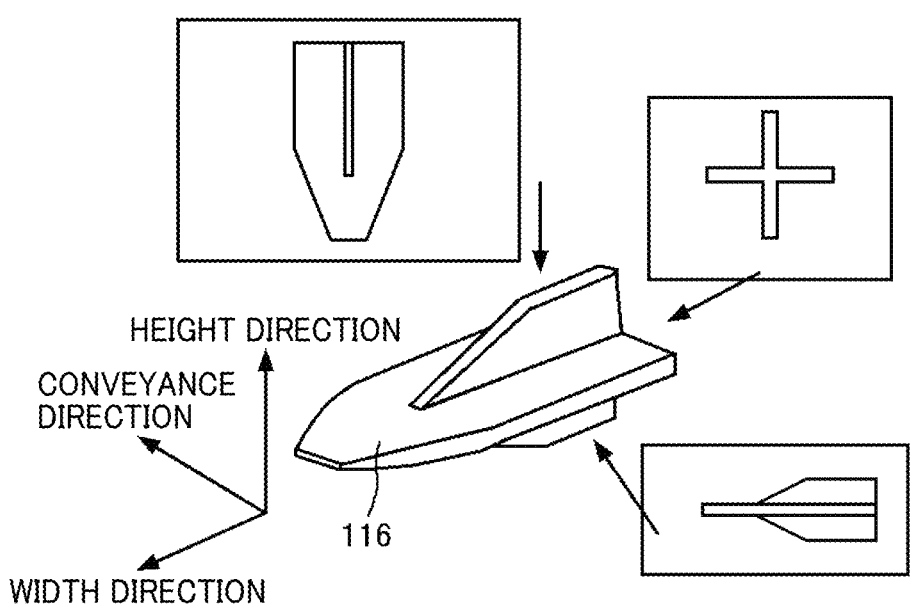
FIG. 13 is a schematic view of one of separation claws of the sheet processing apparatus illustrated in FIG. 1.
Figure 15:
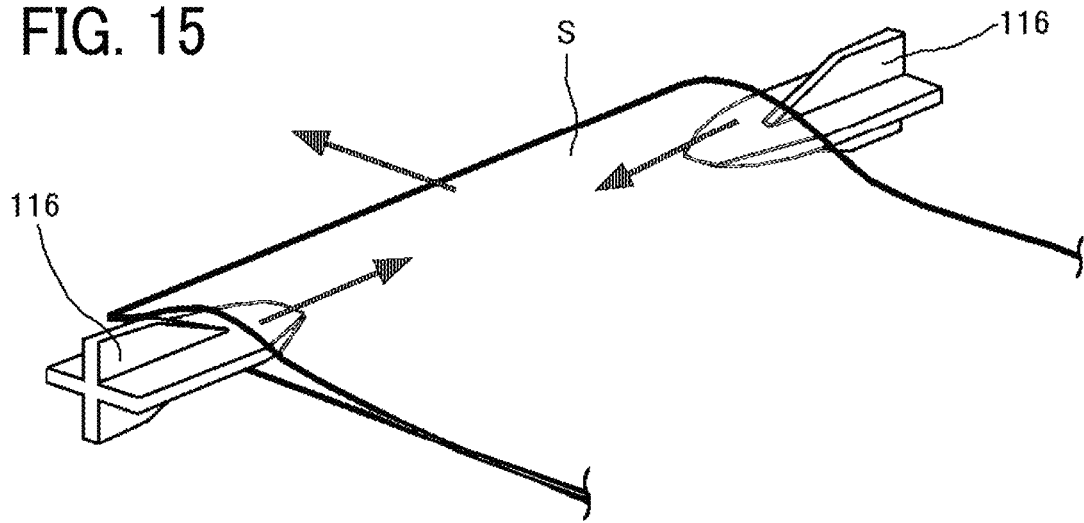
FIG. 15 is a perspective view illustrating a state in which the separation claws are inserted into a lamination sheet.

FIG. 13 is a schematic view of the separation claw 116 of the sheet processing apparatus 100. FIGS. 14A and 14B are schematic views illustrating an example of a drive configuration of the separation claw 116. Further, FIG. 15 is a perspective view illustrating a state in which the separation claw 116 is inserted in the lamination sheet S.

As illustrated in FIG. 13, when viewed from the upstream side in the conveyance direction, the height of the separation claw 116 gradually increases from the center in the width direction to the right end in FIG. 13. Further, when viewed in the height direction, the size of the separation claw 116 in the conveyance direction gradually increase from the tip to the center. When viewed in the width direction, the separation claw 116 is shaped like a cross.

Further, in the present embodiment, referring to FIGS. 14A and 14B, the two separation claws 116 are disposed facing each other and moved in the approaching direction and the moving away direction by a belt drive mechanism as illustrated in FIG. 14A, a rack and pinion mechanism illustrated in FIG. 14B, or the like.

Specifically, the belt drive mechanism illustrated in FIG. 14A includes a belt 38 stretched between a drive pulley 30a and a driven pulley 30b, and the two separation claws 116a and 116b are attached to the belt 38 so as to face each other. One separation claw 116a is coupled to the lower side of the belt 38, and the other separation claw 116b is coupled to the upper side of the belt 38.

Further, the drive pulley 30a is provided with a drive transmission gear 39, and the rotation output from a drive motor 36 is transmitted to the drive transmission gear 39 via a motor output gear 35. That is, the rotation output from the drive motor 36 is transmitted to the belt 38.

Therefore, as the drive motor 36 rotates clockwise in the drawing, the separation claws 116a and 116b can be moved close to each other, and, as the drive motor 36 rotates counterclockwise, the separation claws 116a and 116b are separated from each other.

Further, the rack and pinion mechanism illustrated in FIG. 14B includes two racks 42a and 42b meshing with one pinion 40 extend in opposite directions, and two separation claws 116a and 116b are respectively attached to the racks 42a and 42b to face each other. The pinion 40 is provided with a drive transmission gear 404, and the rotation output from a drive motor 406 is transmitted to the drive transmission gear 404 via a motor output gear 405. That is, the rotation output from the drive motor 406 is transmitted to each of the racks 42a and 42.

Therefore, as the drive motor 406 rotates clockwise in the drawing, the separation claws 116a and 116b can be moved close to each other, and, as the drive motor 406 rotates counterclockwise, the separation claws 116a and 116b are separated from each other.

As described above, in the present embodiment, the pair of separation claws 116 having the above-mentioned shape is movable in the width direction of the lamination sheet S.

Accordingly, the separation claws 116 can be smoothly inserted into the gap created in the lamination sheet S as illustrated in FIG. 15.

Figure 8:
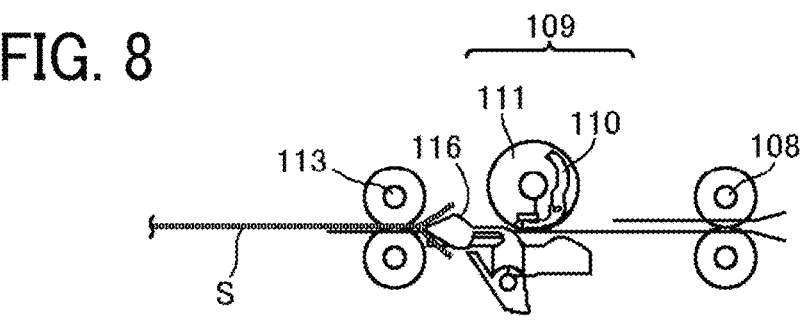
FIG. 8 is a view illustrating the main part of the sheet processing apparatus in which the winding roller rotates in a forward direction with separation claws are inserted in the lamination sheet.

A description of the operation of the sheet processing apparatus 100 is continued below. With the separation claws 116 inserted in the space in the lamination sheet S, the sheet processing apparatus 100 rotates the winding roller 109 clockwise in the drawings (see FIG. 7) so as to move the space in the lamination sheet S to the rear end of the lamination sheet S in the forward conveyance direction (direction A) as illustrated in FIG. 8. After the winding roller 109 is rotated by a predetermined amount, the sheet gripper 110 is opened, with end portion of the lamination sheet S is separated into the upper and lower sheets.

In this state, the sheet processing apparatus 100 temporarily stops the conveyance of the lamination sheet S. Then, the separation claws 116 are further moved in the sheet width direction to separate the rear end of the lamination sheet S in the entire range. Such an action is performed when the lamination sheet S is conveyed a given amount from the sheet sensor C5 triggered by detection of the end of the lamination sheet S by the sensor C5.

Figure 16:
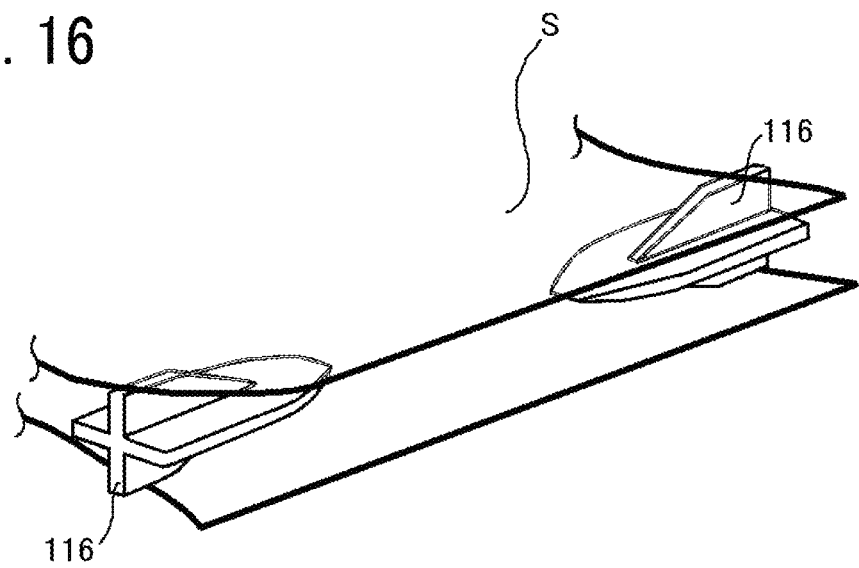
FIG. 16 is a perspective view illustrating the separation claws and the lamination sheet in the state illustrated in FIG. 8.

FIG. 16 is a perspective view illustrating a state of the separation claws 116 and the lamination sheet S in FIG. 8. Since the separation claw 116 also has the function of the bifurcating claw that guides the separated sheets of the lamination sheet S in different directions due to the above-described shape (see FIG. 13), the two separated sheets of the lamination sheet S can be kept in postures to be conveyed to different paths.

Figure 17:
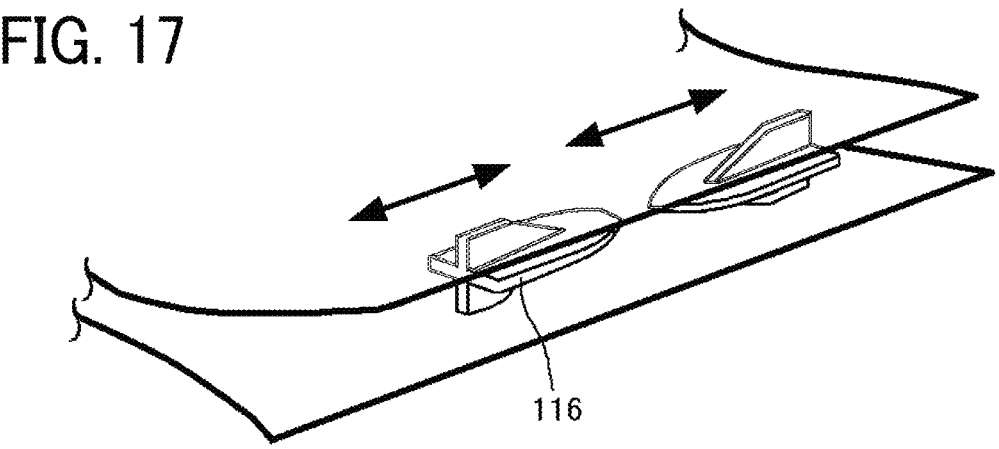
FIG. 17 is another perspective view illustrating the separation claws and the lamination sheet in the state illustrated in FIG. 8.

Further, since the separation claws 116 are movable in the width direction (see FIGS. 14A and 14B), the separation claws 116 can be positioned suitably to support the postures of the sheets of the lamination sheet S as illustrated in FIG. 17. Therefore, even when the size of the lamination sheet S and the rigidity (or retentivity meaning the propensity to retain a particular shape once applied, such as curvature of paper) change, the separated sheets of the lamination sheet S can be guided in desired branching directions. This eliminates the need for a bifurcating member (e.g., a bifurcating claw) over the entire width of the conveyance passage and a driver to drive the bifurcating member, and the cost can be reduced.

Figure 9:
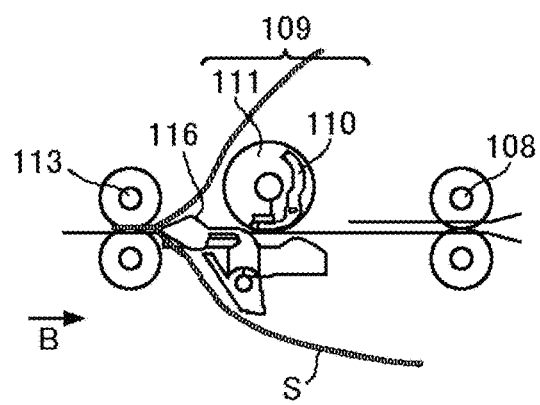
FIG. 9 is a view illustrating the sheet processing apparatus conveying the lamination sheet in reverse with ends of the two sheets separated, subsequent to the state in FIG. 8.

Next, from the state in which the rear end of the lamination sheet S is separated in the entire range, as illustrated in FIG. 9, the sheet processing apparatus 100 rotates the exit roller pair 113 counterclockwise in the drawing and conveys the lamination sheet S in the reverse conveyance direction (direction B). Then, the separation claws 116 guide the two separated sheets of the lamination sheet S in the upper and lower directions, respectively, and the sheets are fully separated.

Then, the sheet processing apparatus 100 temporarily stops the conveyance of the lamination sheet S, with the bonded portion of the lamination sheet S held (nipped) in the exit roller pair 113. Accordingly, the lamination sheet S opens wide to the bonded side as one end.

Such an action is performed when the lamination sheet S is conveyed a given amount from the sheet sensor C5 triggered by detection of the end of the lamination sheet S by the sensor C5.

Figure 18A:
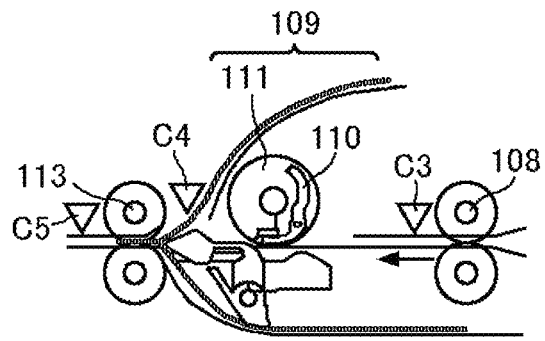
FIG. 18A illustrates guide routes of two sheets of the lamination sheet in the state illustrated in FIG. 9.
Figure 18B:
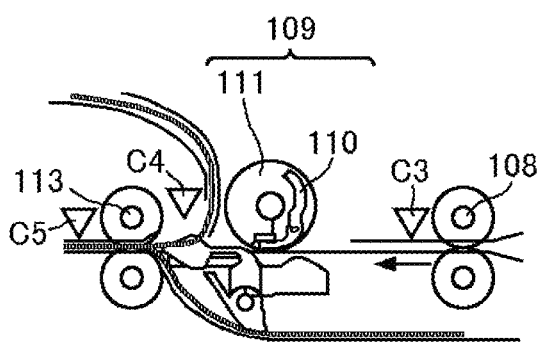
FIGS. 18B and 18C illustrate modifications of the guide routes of the two sheets of the lamination sheet.
Figure 18C:
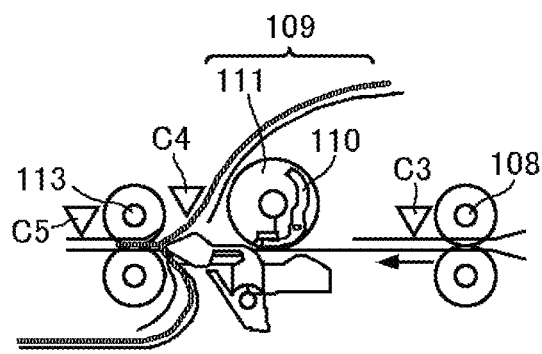

Referring to FIGS. 18A, 18B, and 18C, a description is given of modifications of the guide routes of the two separated piles (the upper and lower sheets) of the lamination sheet S. FIG. 18A illustrates the above-described routes (see FIG. 9) for guiding the upper and lower sheets in the same direction from the bonded portion of the lamination sheet S. Alternatively, the upper and lower sheets may be guided in opposite directions. For example, as illustrated in FIG. 18B, the routes may be in an inverted S-shape. Alternatively, as illustrated in FIG. 18C, the routes may be in an S-shape.

Figure 10:
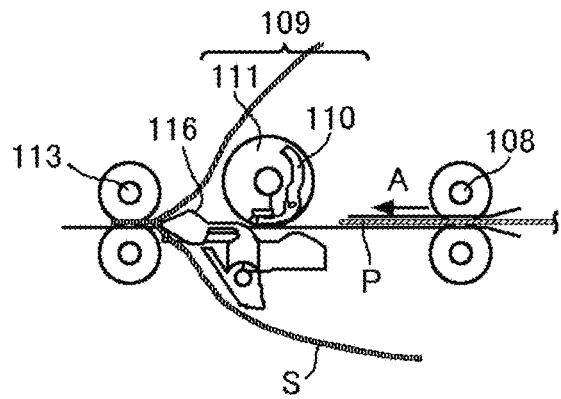
FIG. 10 is a view illustrating the main part of the sheet processing apparatus conveying an insertion sheet in the forward direction, subsequent to the state in FIG. 9.

Next, as illustrated in FIG. 10, the sheet processing apparatus 100 rotates the entrance roller pair 108 and directs the insertion sheet P conveyed from the sheet feeding tray 103 (see FIG. 1) toward the exit roller pair 113 in the forward conveyance direction in the direction A.

Figure 11:
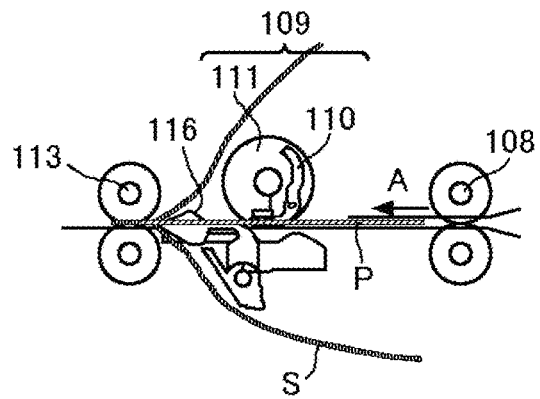
FIG. 11 is a view illustrating the main part of the sheet processing apparatus in which the insertion sheet converges to the lamination sheet, subsequent to the state in FIG. 10.

Subsequently, as illustrated in FIG. 11, the sheet processing apparatus 100 rotates the exit roller pair 113 so that the lamination sheet S and the insertion sheet P converge, and inserts the insertion sheet P into the opened lamination sheet S.

Figure 12A:
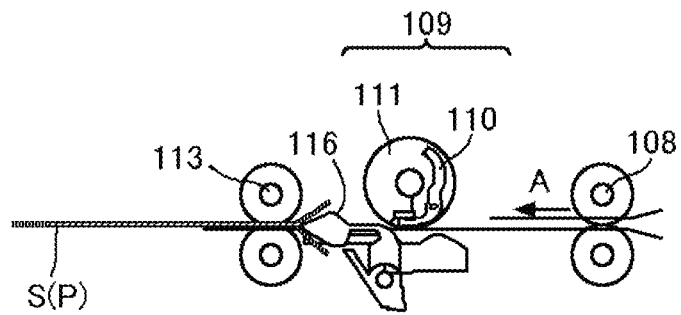
FIG. 12A is a view illustrating the main part of the sheet processing apparatus conveying the lamination sheet in the forward direction, with the insertion sheet inserted therein, subsequent to FIG. 11.

As illustrated in FIG. 12A, the exit roller pair 113 conveys the lamination sheet S, with the insertion sheet P inserted therein, in the forward conveyance direction (direction A), thereby overlaying the two sheets one on another again and closing the opening. Then, the sheet processing apparatus 100 ejects and stacks the lamination sheet S sandwiching the insertion sheet P onto the output tray 104 (FIG. 1) with the exit roller pair 113, or a roller or the like positioned downstream from the exit roller pair 113.

Figure 12B:
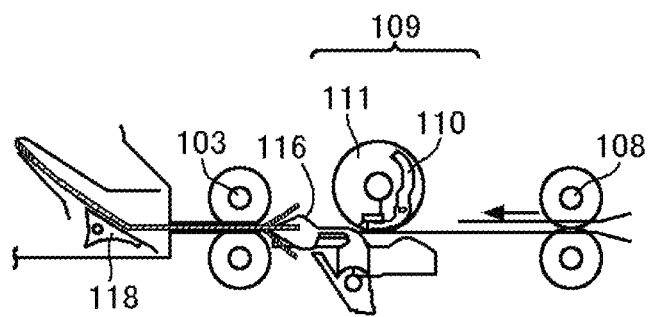
FIG. 12B is a view of an example of a main part of the sheet processing apparatus including a bifurcating claw.

As an alternative example, in the case of a sheet processing apparatus including a heat and pressure device capable of heating and pressurizing the lamination sheet S, as illustrated in FIG. 12B, the route is switched with a bifurcating claw 118 to forward the lamination sheet S to the heat and pressure device.

As described above, the sheet processing apparatus 100 according to the present embodiment can open the lamination sheet S wide and insert and sandwich the insertion sheet P therein. Therefore, for example, compared with a laminator using a vacuum device, the structure is simple, and the entire apparatus can be simple and compact.

In addition, as illustrated in FIG. 1, the sheet processing apparatus 100 according to the present embodiment can store the lamination sheets S and insertion sheet P on separate trays to be conveyed separately. Accordingly, it is not necessary to stack the lamination sheets S and the insertion sheets P in a predetermined order, for added convenience. In the present embodiment, the lamination sheets S are stacked on the sheet tray 102, and the insertion sheets P are stacked on the sheet feeding tray 103. However, where to stack the lamination sheets S and the insertion sheets P are not limited thereto. Alternatively, the insertion sheet P can be stacked on the sheet tray 102 and the lamination sheet S can be stacked on the sheet feeding tray 103.

Next, descriptions are given of a laminator, an image forming apparatus, and an image forming system including the sheet processing apparatus according to any of embodiments of the present disclosure.

Figure 19:
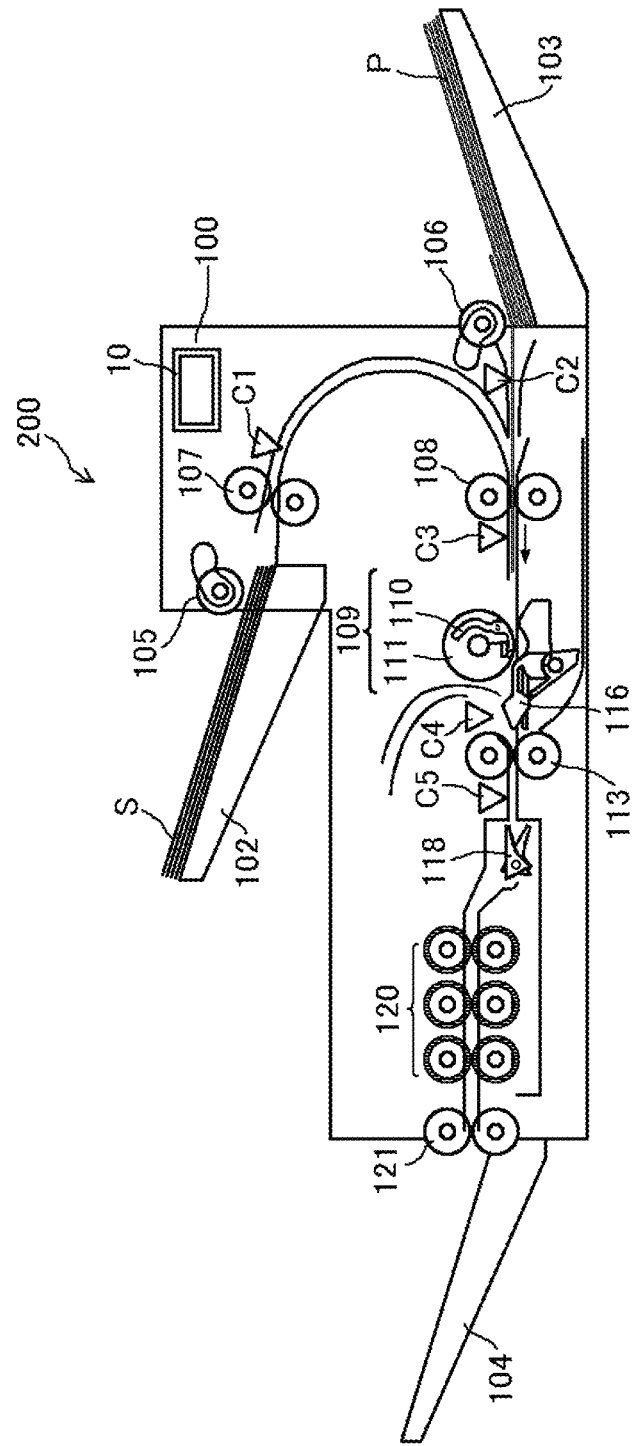
FIG. 19 is a view illustrating an example of general arrangement of a laminator according to one embodiment of the present disclosure, including the sheet processing apparatus illustrated in FIG. 1.

FIG. 19 is a view illustrating an example of general arrangement of the laminator including the sheet processing device according to one embodiment of the present disclosure. As illustrated in FIG. 19, a laminator 200 includes the sheet processing apparatus 100 described above, the bifurcating claw 118 to switch the conveyance route of the lamination sheet S, a heat and pressure rollers 120 (heat and pressure member) to heat and press the lamination sheet S, and an ejection roller 121 disposed downstream from the heat and pressure rollers 120.

The laminator 200 can perform a series of operations from feeding and separation of the lamination sheet S, insertion of the insertion sheet P, and lamination with heat and pressure on a stand-alone basis. This series of operations can be carried out automatically without human intervention, and convenience can be improved.

Figure 20:
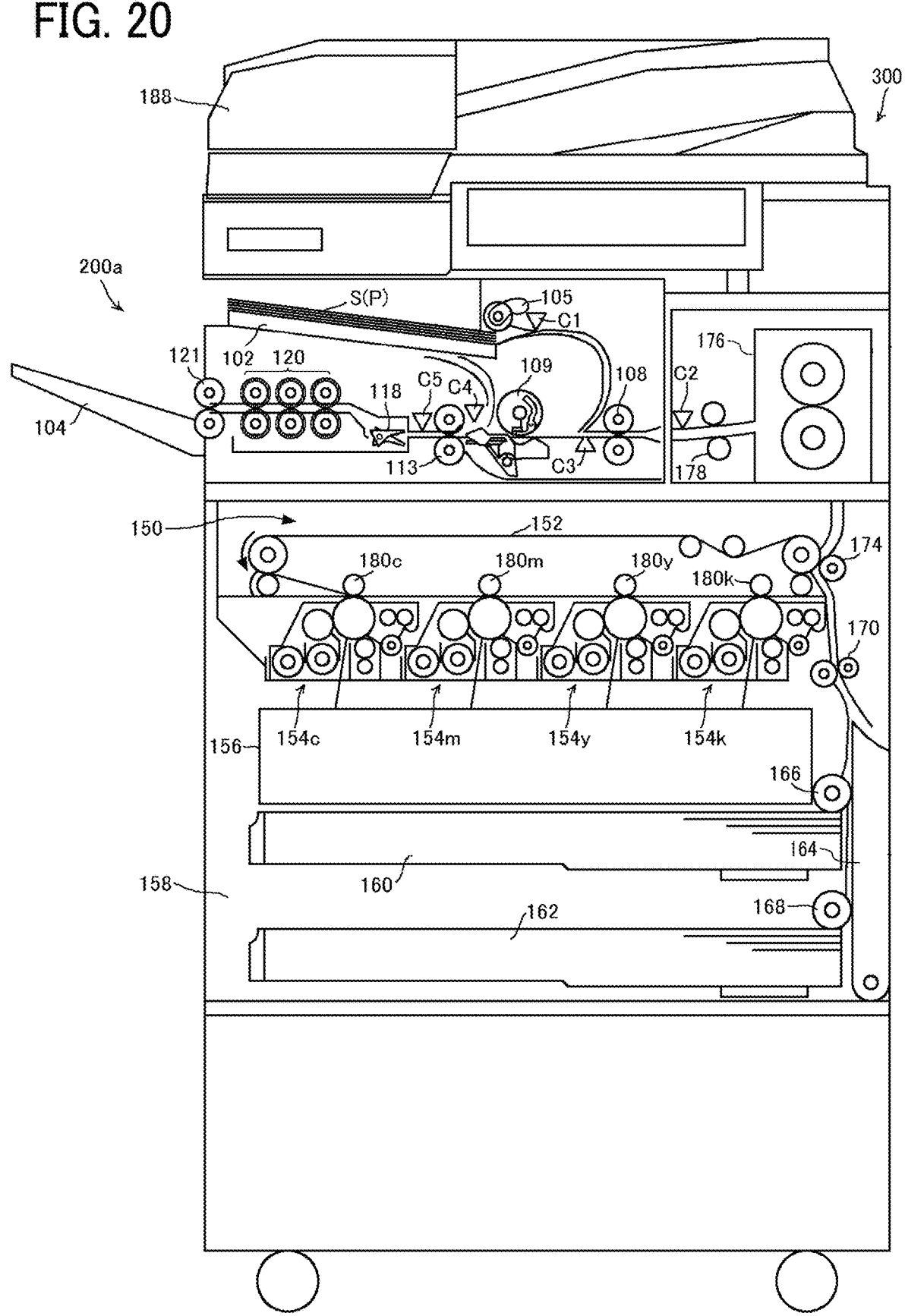
FIG. 20 is a view illustrating an example of general arrangement of an image forming apparatus according to one embodiment, including the laminator illustrated in FIG. 19.

FIG. 20 is a view illustrating an example of general arrangement of an image forming apparatus including the laminator according to one embodiment of the present disclosure. An image forming apparatus 300 illustrated in FIG. 20 includes a laminator 200a to perform the laminating process.

The laminator 200a includes the sheet tray 102 on which lamination sheets S or insertion sheets P are stacked. Additionally, the laminator 200a can receive at least one of the lamination sheets S and the insertion sheets P fed from the image forming apparatus 300. Therefore, an image can be added in-line on the lamination sheet S or the insertion sheet P by the image forming apparatus 300 (for example, a printer or a copier).

The configuration of the image forming apparatus 300 is described in detail. As illustrated in FIG. 20, an intermediate transfer device 150 is disposed in the main body of the image forming apparatus 300. The intermediate transfer device 150 includes an endless intermediate transfer belt 152 entrained around a plurality of rollers and stretched almost horizontally. The intermediate transfer belt 152 rotates counterclockwise in the drawing.

Image forming devices 154c, 154m, 154y, and 154k are arranged side by side along and below the intermediate transfer belt 152 of the intermediate transfer device 150, in that order in a direction in which the intermediate transfer belt 152 is rotated. The image forming devices 154c, 154m, 154y, and 154k form toner images of cyan, magenta, yellow, and black, respectively. Each of the image forming devices 154c, 154m, 154y, and 154k includes a drum-shaped image bearer that rotates clockwise in the drawing. Around the image bearer, a charging device, a developing device, a transfer device, and a cleaning device are disposed. Below each image forming device 154, an exposure device 156 is disposed.

Below the exposure device 156, a sheet feeder 158 is disposed. The sheet feeder 158 includes a first sheet feeding tray 160 that stores lamination sheets S and a second sheet feeding tray 162 that stores insertion sheets P. The first sheet feeding tray 160 is an example of a two-ply sheet tray on which two-ply sheets are stacked, and the second sheet feeding tray 162 is an example of an insertion sheet tray on which sheet media (insertion sheets) are stacked.

A first sheet feeding roller 166 is disposed at the upper right of the first sheet feeding tray 160 and feeds the lamination sheets S from the first sheet feeding tray 160 one by one to a sheet feeding passage 164. A second sheet feeding roller 168 is disposed at the upper right of the second sheet feeding tray 162 and feeds the insertion sheets P from the second sheet feeding tray 162 one by one to the sheet feeding passage 164.

The sheet feeding passage 164 extends from the lower side to the upper side on the right side in the main body of the image forming apparatus 300 and communicates with the laminator 200a inside the image forming apparatus 300. The sheet feeding passage 164 is provided with a conveyance roller 170, a secondary transfer device 174 disposed opposite the intermediate transfer belt 152, a fixing device 176, a sheet ejection device 178 including an ejection roller pair, and the like in order.

The first sheet feeding roller 166, the conveyance roller 170, and the sheet feeding passage 164 are examples of a two-ply sheet feeder that feeds a two-ply sheet from the first sheet feeding tray 160 (the two-ply sheet tray). The second sheet feeding roller 168, the conveyance roller 170, and the sheet feeding passage 164 are examples of a medium feeder that feeds a sheet medium from the second sheet feeding tray 162 (the medium tray). The intermediate transfer device 150, the fixing device 176, and the like are examples of an image forming device that forms an image on a two-ply sheet or a sheet medium.

Next, a description is given of operations of the image forming apparatus 300 to form an image on the lamination sheet S and then perform lamination according to the present embodiment.

To form an image on the lamination sheet S, first, an image reading device 188 reads a document image, and the exposure device 156 performs image writing. Next, the image forming devices 154c, 154m, 154y, and 154k form respective color toner images on the image bearers thereof. Then, primary transfer devices 180c, 180m, 180y, and 180k sequentially transfer the toner images onto the intermediate transfer belt 152, thereby forming a color image formed thereon.

By contrast, the image forming apparatus 300 rotates the first sheet feeding roller 166 to feed the lamination sheet S to the sheet feeding passage 164. Then, the lamination sheet S is conveyed by the conveyance roller 170 through the sheet feeding passage 164 and sent to a secondary transfer position, timed to coincide with the color image on the intermediate transfer belt 152. Then, the secondary transfer device 174 transfers the color image formed on the intermediate transfer belt 152 as described above onto the lamination sheet S.

After the image transfer, the fixing device 176 fixes the image on the lamination sheet S, and the sheet ejection device 178 sends the lamination sheet S to the laminator 200a.

Further, the image forming apparatus 300 rotates the second sheet feeding roller 168 to feed the insertion sheet P to the sheet feeding passage 164, and the sheet ejection device 178 sends the insertion sheet P to the laminator 200a.

In this way, the lamination sheet S on which the image has been formed and the insertion sheet P are sent to the laminator 200a, and a laminating process is performed. The details of the laminating process have been described above and redundant descriptions are omitted.

With the above-described configuration, the image forming apparatus 300 according to the present embodiment can perform the laminating process with the laminator 200a after image formation on the insertion sheet P. In addition, the image forming apparatus 300 can perform the laminating process after image formation on both the insertion sheet P and the lamination sheet S.

Next, descriptions are given of an image forming apparatus and an image forming system including the sheet processing apparatus, according to a modification of the above-described embodiment.

Figure 21:
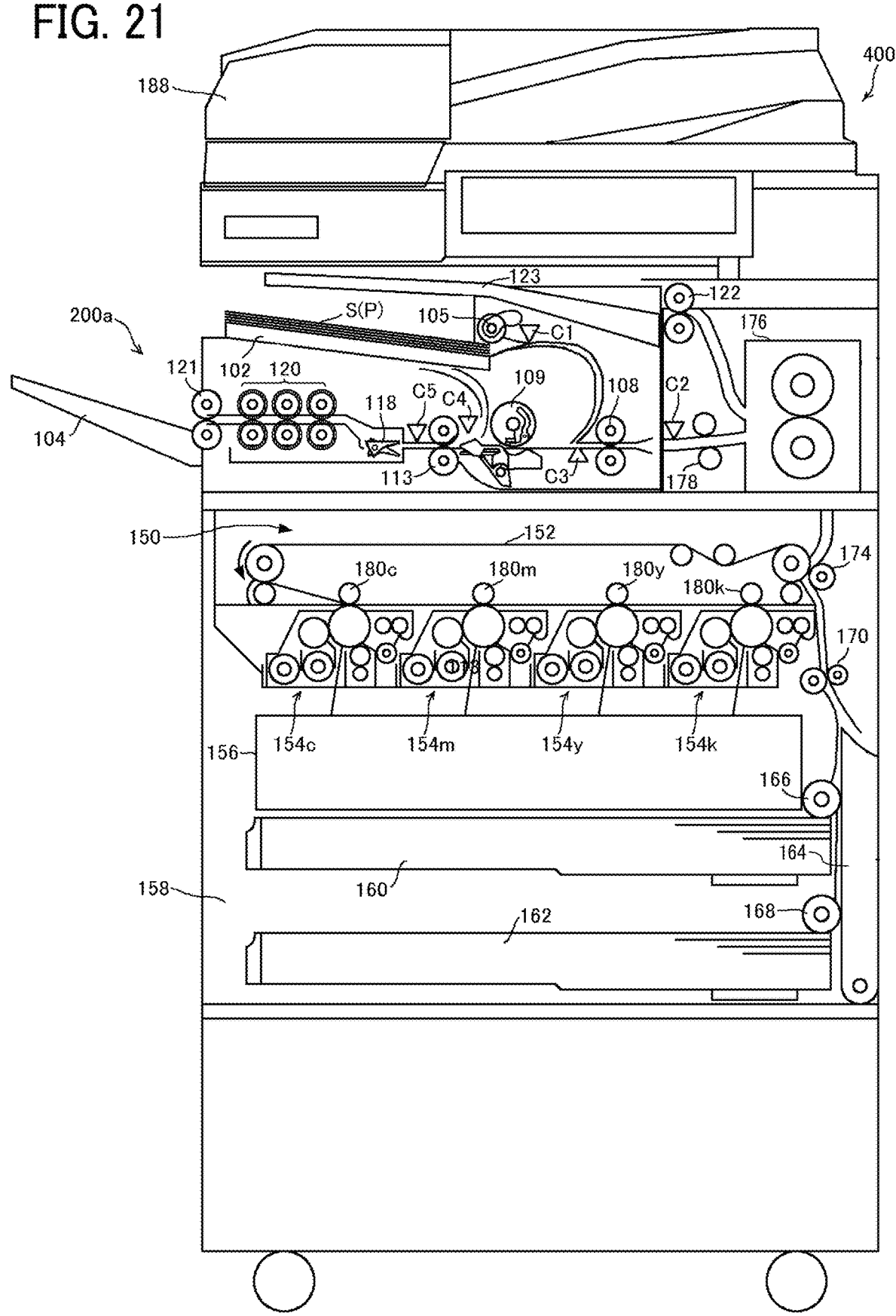
FIG. 21 is a view illustrating a modification of the configuration of the image forming apparatus including the laminator illustrated in FIG. 19.

FIG. 21 is a view illustrating a modified configuration of the image forming apparatus including the laminator according to the above-described embodiment. Differently from the image forming apparatus 300 illustrated in FIG. 20, a main body of an image forming apparatus 400 illustrated in FIG. 21 includes an ejection roller pair 122 and an output tray 123.

When the laminating process is not performed, the image forming apparatus 400 can eject the recording medium on which the image is formed using the ejection roller pair 122 of the main body to the output tray 123 of the main body.

Therefore, the image forming apparatus 400 does not slow the image output speed when the laminating process is not performed.

The laminator 200a is removably attachable to the image forming apparatus 400. That is, when the laminating process is unnecessary, the laminator 200a can be removed from the image forming apparatus 400.

In addition, in the laminator 200a thus removed, the sheet feeding tray 103 on which the insertion sheets P are stacked and the pickup roller 106 to feed the insertion sheets P from the sheet feeding tray 103 can be mounted, so that the laminator 200a is used as a stand-alone machine similar to that illustrated in FIG. 19.

The image forming apparatus 300 illustrated in FIG. 20 and the image forming apparatus 400 illustrated in FIG. 21 can include a sheet processing apparatus instead of the laminator. The image forming apparatus 400 illustrated in FIG. 21 can include a sheet processing apparatus that is removably attachable thereto.

Further, aspects of this disclosure can be embodied as an image forming system that includes an image forming apparatus and the sheet processing apparatus 100 or the laminator 200 detachably coupled to the image forming apparatus. Furthermore, aspects of this disclosure can be embodied as a system including at least one of a sheet feeder (a stacker) and a case binding device or the like. Note that, in the case where the lamination sheet S is passed through the fixing device 176, the lamination sheet S is not bonded at the fixing temperature, but is bonded by application of heat higher than the fixing temperature.

Although the image forming apparatuses 300 and 400 employ electrophotography for image formation on the lamination sheet S and the insertion sheet in the description above, the image formation method is not limited thereto, and inkjet, stencil printing, or other printing method can be used.

Figure 22A:
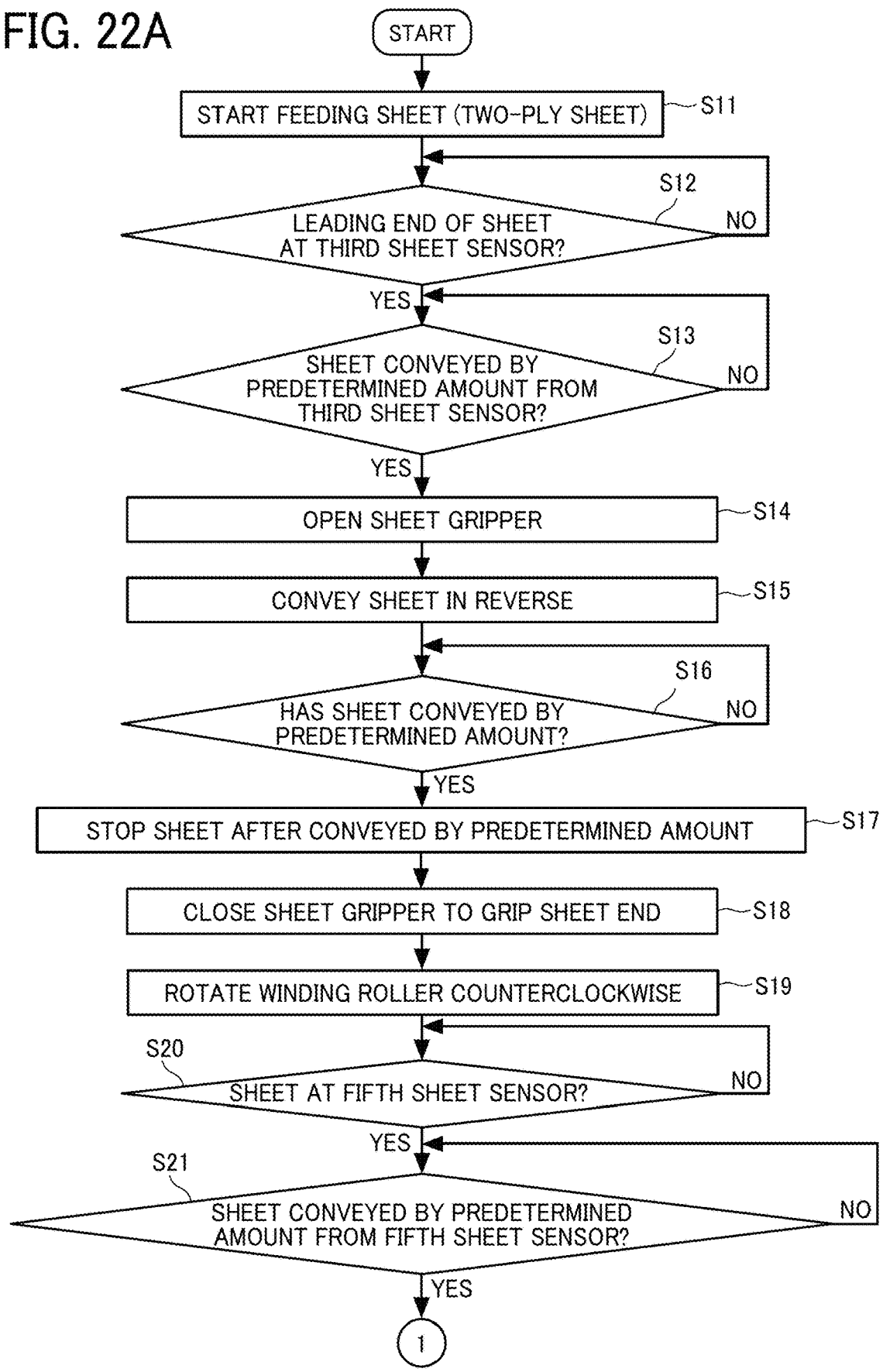
FIGS. 22 (22A, 22B, and 22C) is a flowchart illustrating processes from sheet feeding to completion of a laminating process, performed by the sheet processing apparatus illustrated in FIG. 1.
Figure 22B:
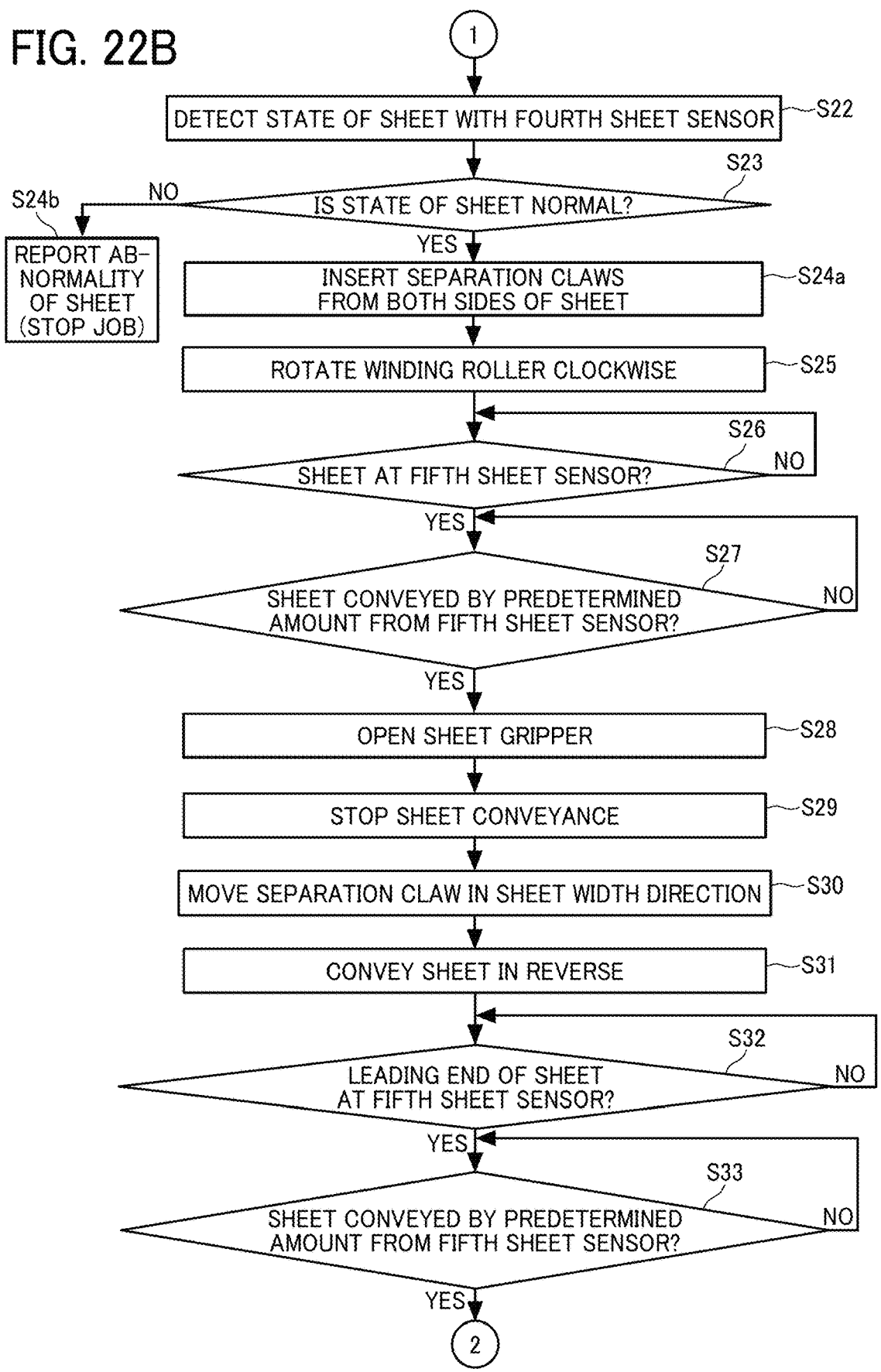

FIGS. 22 (22A, 22B, and 22C) is a flowchart illustrating a series of processes from sheet feeding to completion of the laminating process. The description of the processes proceeds while indicating the number of drawing corresponding to the step in the flowchart.

In S11, the sheet processing apparatus 100 starts feeding the lamination sheet S as a two-ply sheet (see FIG. 1). In S12, the sheet processing apparatus 100 determines whether the leading end of the lamination sheet S has arrived at the sheet sensor C3 as a third sheet sensor (see FIG. 2). In response to a determination that the lamination sheet S has been conveyed by a predetermined amount from the sheet sensor C3 as the third sheet sensor (Yes in S13), the sheet processing apparatus 100 stops (suspends) the sheet conveyance (see FIG. 3). For example, the "predetermined amount" used here and those in subsequent processes are stored in a memory by a manufacturer based on empirical data. In S14, the sheet gripper 110 is opened, and, in S15, the lamination sheet S is conveyed in the reverse conveyance direction (see FIG. 4).

In response to a determination that the lamination sheet S has been conveyed by a predetermined amount (Yes in S16), in S17, the sheet processing apparatus 100 suspends the sheet conveyance. In S18, the sheet gripper 110 is closed, to grip the end of the lamination sheet S (see FIG. 5).

In S19, the sheet processing apparatus 100 rotates the winding roller 109 counterclockwise (in reverse) and winds the lamination sheet S around the winding roller 109 (see FIG. 6). In S20, the sheet processing apparatus 100 determines whether the end of the lamination sheet S has arrived at the sheet sensor C5 as a fifth sheet sensor. In response to a determination that the lamination sheet S has been conveyed by a predetermined amount from the sheet sensor C5 (Yes in S21), the sheet processing apparatus 100 detects the state of the lamination sheet S with the abnormality detector C4 (a fourth sheet sensor) in S22.

The abnormality detector C4 detects the size of the gap between the two sheets of the lamination sheet S for the sheet processing apparatus 100 to determine whether or not the size of the gap exceeds a threshold. In S23, in response to a determination based on the detection result of the abnormality detector C4 that the state of the lamination sheet S is normal (the size of the gap is equal to or greater than the threshold), the sheet processing apparatus 100 proceeds to S24a.

On the other hand, in response to a determination in S23 that the state of the lamination sheet S is abnormal (the size of the gap is smaller than the threshold), in S24b, the sheet processing apparatus 100 reports the abnormality (e.g., displays an error message) and stops the sheet processing (a job).

In S24a, the sheet processing apparatus 100 inserts, from both sides, the separation claws 116 into the gap between the sheets of the lamination sheet S (see FIG. 7). In S25, the sheet processing apparatus 100 rotates the winding roller 109 clockwise (forward direction) with the separation claws 116 inserted from both sides of the lamination sheet S, and conveys the lamination sheet S in the forward conveyance direction.

In S26, the sheet processing apparatus 100 determines whether the end of the lamination sheet S has arrived at the sheet sensor C5 as the fifth sheet sensor. In response to a determination that the lamination sheet S has been conveyed by the predetermined amount from the sheet sensor C5 (Yes in S27), in S28, the sheet processing apparatus 100 opens the sheet gripper 110.

In S29, the sheet processing apparatus 100 temporarily stops the conveyance of the lamination sheet S and, in S30, moves the separation claws 116 further in the sheet width direction (see FIG. 8). Then, end portion of the lamination sheet S is separated into the upper and lower sheets.

In S31, the sheet processing apparatus 100 conveys the lamination sheet S in the reverse conveyance direction. In S32, the sheet processing apparatus 100 determines whether the end of the lamination sheet S has arrived at the sheet sensor C5 as the fifth sheet sensor. In response to a determination that the lamination sheet S has been conveyed by the predetermined amount from the sheet sensor C5 as the fifth sheet sensor (Yes in S33), in S34, the sheet processing apparatus 100 suspends the sheet conveyance (see FIG. 9). As a result, the separation of the lamination sheet S is completed.

Subsequently, in S35, the sheet processing apparatus 100 determines whether or not to perform image formation in-line (with an in-line image forming apparatus) on the insertion sheet P to be inserted into the lamination sheet S. In the case of in-line image formation (Yes in FIG. 35), in S36, the sheet processing apparatus 100 sends a notification of print job start to the image forming apparatus to start forming an image on the insertion sheet P. Then, the process proceeds to S37.

On the other hand, when in-line image formation is not performed (No in S35), the process proceeds to S37.

In S37, the sheet processing apparatus 100 conveys the insertion sheet P in the forward conveyance direction to be inserted in the opening of the lamination sheet S (see FIGS. 10 and 11).

In S38, the conveyance route is switched by the bifurcating claw 118 as illustrated in FIG. 12B). In S39, the lamination sheet S sandwiching the insertion sheet P is conveyed to the heat and pressure device (e.g., the fixing device 176 in FIG. 20), and heat and pressure are applied thereto, to complete the laminating process.

A description is provided of an advantageous configuration of the present disclosure. In the description above, the size of the lamination sheet S (i.e., lamination film) and the size of the insertion sheet P (e.g., a paper sheet) inserted in the lamination sheet S is not mentioned. However, depending on the combination of the size (dimensions) of the lamination sheet S and the size of the insertion sheet P, the laminating process may not be performed suitably.

For example, when the insertion sheet P is larger than the lamination sheet S, the insertion sheet is not within the laminating range, and accordingly proper lamination is not available. By contrast, when the insertion sheet P is too small with respect to the lamination sheet S, the margin becomes large and the lamination sheet S is wasted.

Therefore, a description is given below of a configuration of the sheet processing apparatus to acquire the size of the lamination sheet S (two-ply sheet) and the size of the insertion sheet P and control the sheet processing depending on the size relationship.

FIG. 23 is a block diagram illustrating a controller 50 (a main controller) of the sheet processing apparatus according to a first embodiment. The controller 50 of the sheet processing apparatus 100 includes a size acquisition unit 52 to acquire the size of the lamination sheet S and the size of the insertion sheet P, a determination unit 54 to determine an appearance (state) of the lamination sheet S in which the lamination sheet P is sandwiched, and a control unit 56 to control operations of the sheet processing apparatus 100. The controller 50 (e.g., a processor) can be a general-purpose computer including a central processing unit (CPU), a read-only memory (ROM), a random-access memory (RAM), and an input-output (I/O) interface.

The size acquisition unit 52 is connected to the control panel 10, which is the display and operation device, via an input and output (I/O) port 58. The size acquisition unit 52 acquires the size of the lamination sheet S and the size of the insertion sheet P input (set) by the user via the control panel 10.

Figures 24, 25:
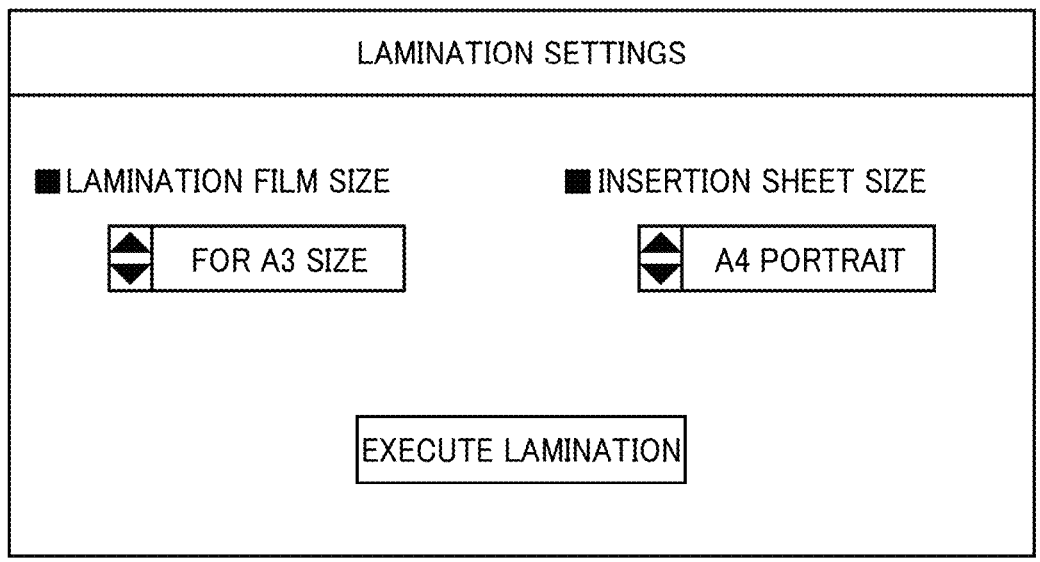
FIG. 24 is an example of an operation screen for setting a lamination sheet size and an insertion sheet size displayed on a control panel of the sheet processing apparatus illustrated in FIG. 1.
FIG. 25 is an example of a table used for determining whether lamination is feasible.

FIG. 24 is an example of an operation screen for setting the lamination sheet size and the insertion sheet size displayed on the control panel 10. The sheet processing apparatus 100 according to the present embodiment accepts selecting and inputting the size of the lamination sheet S (lamination film) and the size of the insertion sheet P performed by the user by touching the screen on the control panel 10. Further, the sheet processing apparatus 100 starts the series of sheet processing (see FIG. 22) in response to touching (pressing) of the area indicated, for example, as "execute lamination."

The image forming apparatus 300 illustrated in FIG. 20 or the image forming apparatus 400 illustrated in FIG. 21 including the laminator may use the information on the sheet size ejected from the image forming apparatus 300 or 400 as the size information of the insertion sheet.

In FIG. 23, the determination unit 54 determines whether insertion of the insertion sheet P is feasible from the relationship between the size of the lamination sheet S and the size of the insertion sheet P acquired by the size acquisition unit 52 (an inserted state of the insertion sheet P in the lamination sheet S, that is, an appearance of the lamination sheet S in which the insertion sheet P is inserted).

FIG. 25 is an example of a table used for determining whether the laminating process is feasible. This table is used to determine whether or not lamination can be performed based on the combination of the size of the lamination sheet S and the size of the insertion sheet P.

There are two sheet orientations in sheet feeding. Short edge feed (SEF) is a sheet orientation in which the short side of the sheet is perpendicular to the conveyance direction. Further, long edge feed (LEF) is an orientation in which the long side of the sheet is perpendicular to the conveyance direction.

A description is given of the table. When the size of the lamination sheet S (lamination film) and the size of the insertion sheet P are the same, the determination unit 54 determines that the laminating process is feasible (indicated by "Match").

On the other hand, when the lamination film size and the insertion sheet size are different from each other and the insertion sheet size is larger than the lamination film size, the determination unit 54 determines that the laminating process is not feasible (indicated as "No").

Further, when the insertion sheet size is smaller than the size of the lamination film and the margin of the lamination sheet S (lamination film) is relatively large, the determination unit 54 determines that the laminating process is pending (indicated as "Pending").

In FIG. 23, the determination unit 54 transmits the determination result to the control unit 56. The control unit 56 drives the conveyance roller pair 107, the winding roller 109, and the like (collectively "conveyors 1090" in FIG. 23) according to the determination result of the determination unit 54, and performs sheet processing.

Figure 26:
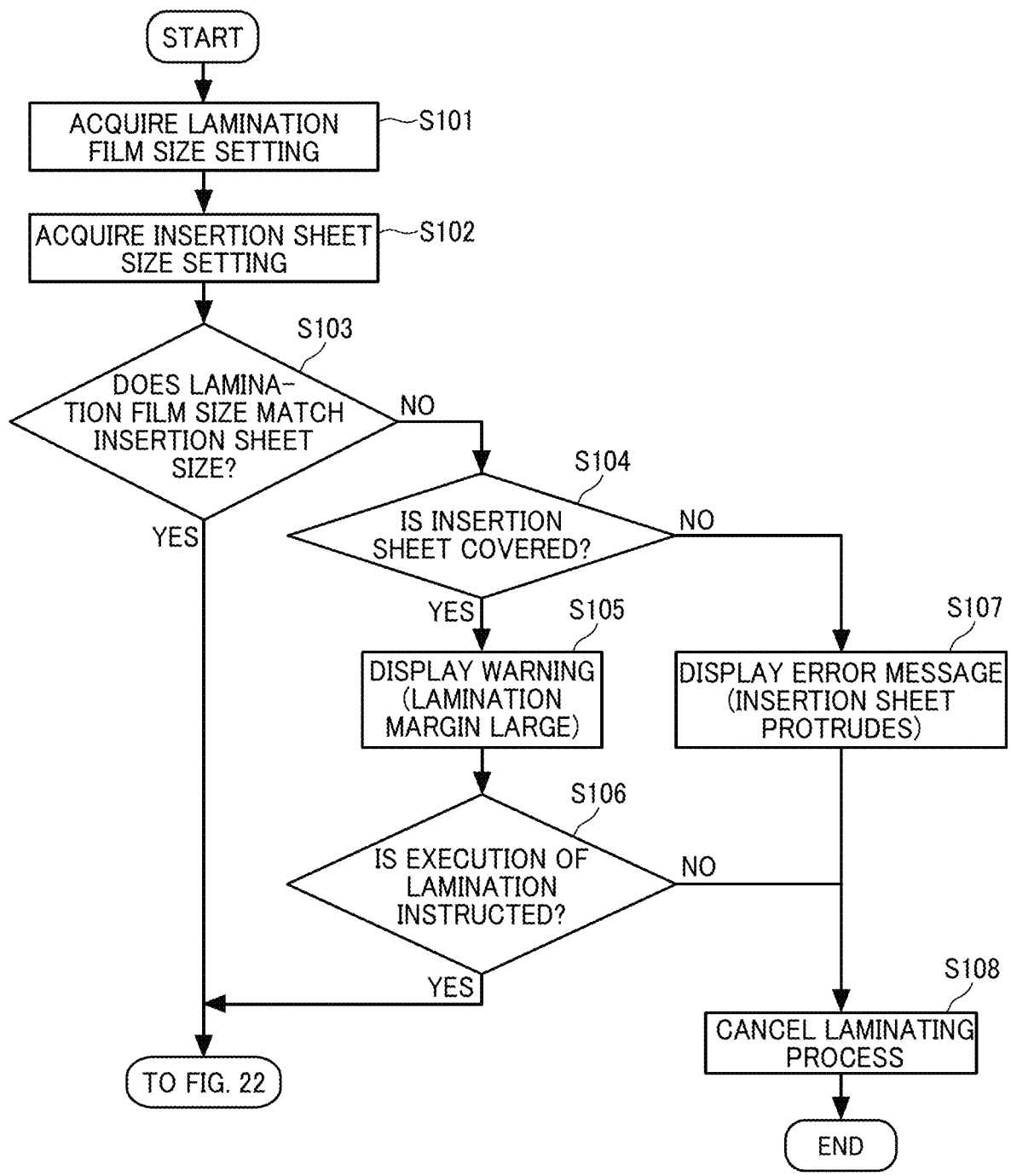
FIG. 26 is a flowchart illustrating control of sheet processing according to a first embodiment.

FIG. 26 is a flowchart illustrating the control of sheet processing performed by the controller 50 according to the first embodiment, which is described with reference to the flowchart of FIG. 22 and FIGS. 24, 25, 27, and 28.

In S101, the size acquisition unit 52 of the sheet processing apparatus 100 acquires the size setting of the lamination sheet S, and, in S102, acquires the size setting of the insertion sheet P. That is, as illustrated in FIG. 24, the size acquisition unit 52 acquires the lamination film size set value and the insertion sheet size set value input by the user on the control panel 10.

In S103, the determination unit 54 of the sheet processing apparatus 100 determines whether the size of the lamination sheet S matches the size of the insertion sheet P. In response to a determination that the sizes match ("Match" in FIG. 25), the control unit 56 controls the sheet processing apparatus 100 to perform the sheet processing operation illustrated in the flowchart of FIG. 22.

On the other hand, in response to a determination of mismatch between the lamination sheet size and the insertion sheet size (other than "Match" in FIG. 25), the controller 50 proceeds to S104, and the determination unit 54 determines whether or not the insertion sheet P is covered by the lamination sheet S (whether the insertion sheet P does not protrude from the lamination sheet S). In response to a determination that the insertion sheet P is covered, that is, does not protrude ("Pending" in FIG. 25), the controller 50 proceeds to S105, and the control unit 56 displays a warning on the control panel 10.

Figure 27:
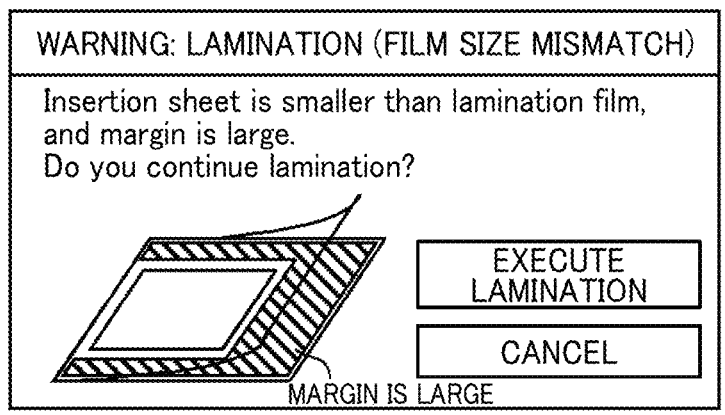
FIG. 27 is an example of a warning screen displayed on the control panel.

FIG. 27 is an example of a warning screen displayed on the control panel 10. The control panel 10 displays the warning screen to notify the user that the size of the insertion sheet P is small and the margin of the lamination sheet S is large. At the same time, the user is prompted to determine whether or not to perform the laminating process in this state.

In S106, in response to touching (pressing), by the user, of the area indicated as "execute lamination" on the control panel 10, the control unit 56 controls the sheet processing apparatus 100 to perform the sheet processing illustrated in the flowchart of FIG. 22.

By contrast, in response to touching (pressing), by the user, of the area indicated as "cancel" on the control panel 10 (No in S106), in S108, the sheet processing apparatus 100 (the control unit 56) cancels the laminating process (sheet processing).

Returning back to S104, and the remaining processes are described. In response to a determination by the determination unit 54 that the insertion sheet P protrudes, that is, is not covered ("No" in FIG. 25), in S107, the control unit 56 displays an error message on the control panel 10.

Figure 28:
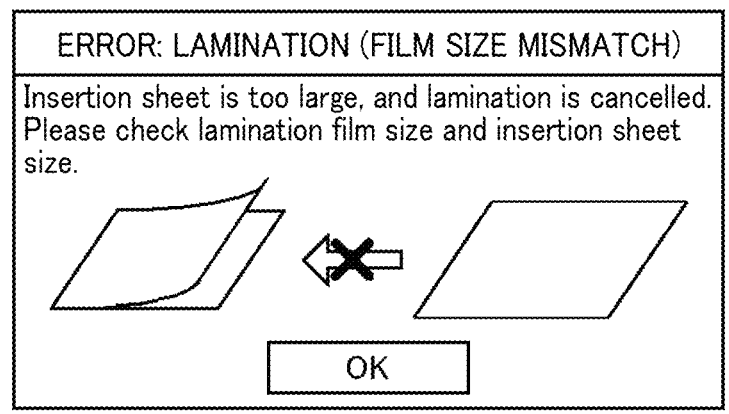
FIG. 28 is an example of an error screen displayed on the control panel.

FIG. 28 is an example of an error screen displayed on the control panel 10. The control unit 56 displays an error screen on the control panel 10 to notify the user that the laminating process is canceled because the size of the insertion sheet P is too large, and prompts the user to confirm the cancellation. Thus, the control unit 56 outputs a notification for the user with the control panel 10 serving as the notification device. In response to touching (pressing), by the user, of the area indicated as "OK" on the control panel 10, in S108, the sheet processing apparatus 100 (the control unit 56) cancels the laminating process.

In this way, the sheet processing apparatus 100 according to the present embodiment acquires the size of the lamination sheet S and the size of the insertion sheet P, and controls (executes or cancels) the sheet processing in accordance with these sizes. Therefore, lamination can be performed suitably for the sizes.

A second embodiment is described. In the previous embodiment, the user inputs the size of the lamination sheet S and the size of the insertion sheet P on the control panel 10, and the size acquisition unit 52 acquires these sizes. The sheet processing apparatus according to the present embodiment is configured to automatically acquire those sizes so that the user can omit the size setting operation.

Figure 29A:
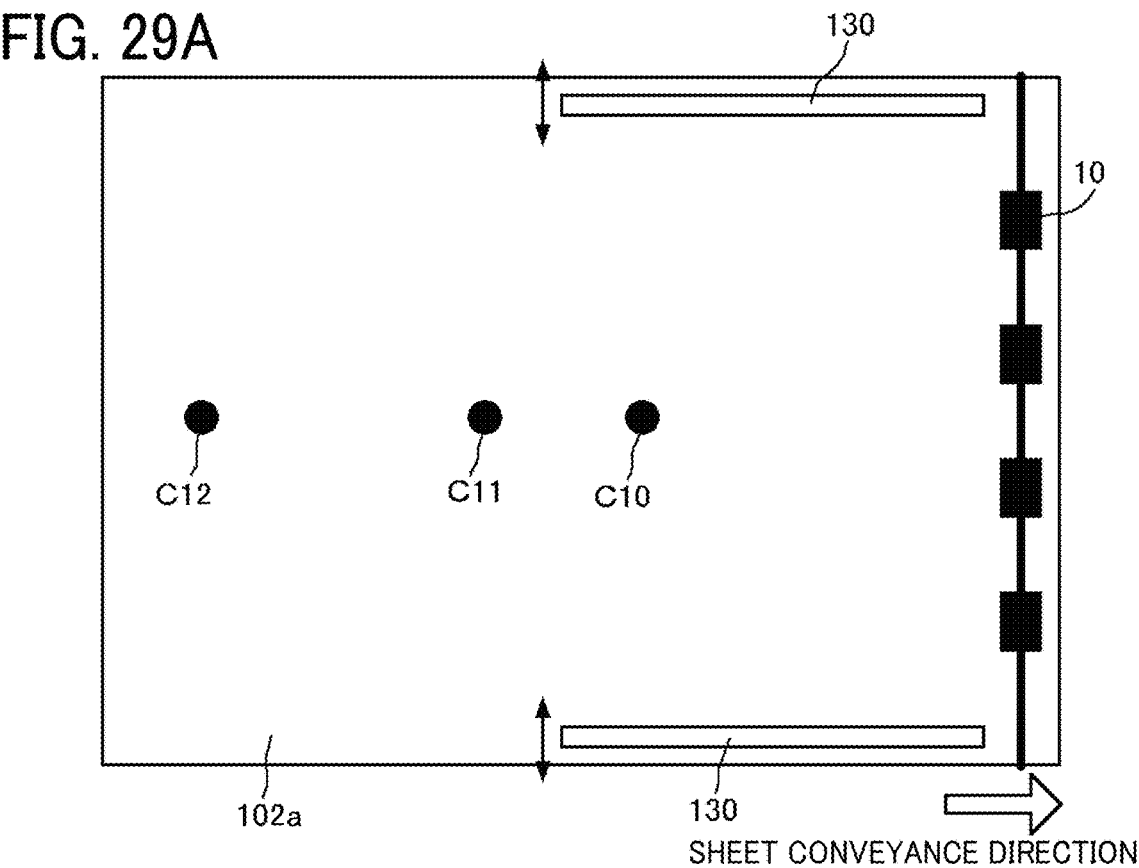
FIG. 29A is a schematic plan view of a sheet tray of a sheet processing apparatus according to a second embodiment.
Figure 29B:
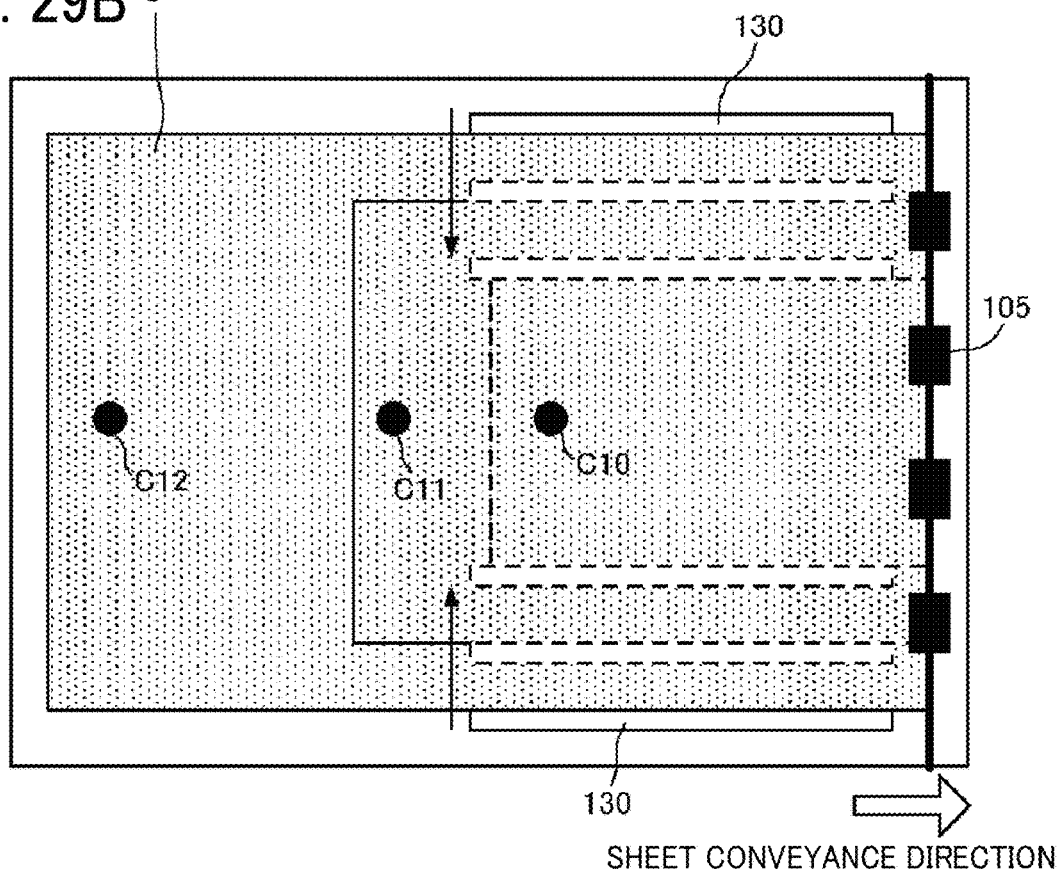
FIG. 29B is a schematic plan view illustrating a state in which a lamination sheet is placed on the sheet tray illustrated in FIG. 29A.

FIG. 29A is a schematic plan view of a sheet tray 102a (a two-ply sheet tray) according to the present embodiment as viewed from above, and FIG. 29B is a schematic plan view illustrating a state in which the lamination sheet S is loaded on the sheet tray 102a. The sheet tray 102a according to the present embodiment includes a pair of sheet guides 130 to align the lamination sheet S in the width direction (direction orthogonal to the conveyance direction).

Further, the sheet tray 102a includes length sensors C10, C11, and C12 (size sensors) disposed in a row in the conveyance direction of the lamination sheet S, to detect the lamination sheet S. As illustrated in FIG. 29B, since the detection results of the length sensors C10, C11, and C12 vary depending on the size of the lamination sheet S on the sheet tray 102a, the length of the lamination sheet S in the conveyance direction can be detected.

FIG. 30 is a schematic view illustrating the pair of sheet guides 130 and a width sensor to detect the size of the lamination sheet S in the width direction. As illustrated in FIG. 30, width sensors C13, C14, and C15 (size sensors) to detect the position of the sheet guide 130 are disposed along the moving direction of the sheet guide 130.

When the pair of sheet guides 130 is moved according to the size of the lamination sheet S on the sheet tray 102a, the detection results of the width sensors C13, C14, and C15 change, so that the size of the lamination sheet S in the width direction can be detected.

FIG. 31 is an example of a table used for determining a sheet size. The controller 50 of the sheet processing apparatus 100 can determine the size of the lamination sheet S on the sheet tray 102a based on the detection results of the length sensors C10 to C12 and the width sensors C13 to C15.

In the present embodiment, the sheet feeding tray 103 has a configuration similar to that of the sheet tray 102a, and the size of the insertion sheet P on the sheet feeding tray can be determined with the length sensors C10 to C12 and the width sensors C13 to C15.

The length sensors C10 to C12, the width sensors C13 to C15, the sheet guides 130, and the like are examples of a sheet size detector of the sheet tray 102a. Referring to FIG. 32, a size acquisition unit 52a determines (detects) the size of the lamination sheet S based on the detection results of the length sensors C10, C11, and C12 and the width sensors C13 to C15 (collectively referred to as a sheet size detectors 1300 in FIG. 32) and the table in FIG. 31. Similarly, the length sensors C10 to C12 and the width sensors C13 to C15 of the sheet feeding tray 103 (collectively presented as a medium size detector 1400 in FIG. 32) are examples of a medium size detector to detect the size of the insertion sheet P.

FIG. 32 is a block diagram illustrating a controller 50a of the sheet processing apparatus 100 according to the second embodiment. In FIG. 32, elements identical to those illustrated in FIG. 23 are given identical reference numerals, and the descriptions thereof are omitted.

As illustrated in FIG. 32, the size acquisition unit 52a is connected via the I/O port 58 to the sheet size detector 1300 and the medium size detector 1400, so as to acquire size of the lamination sheet S and the size of the insertion sheet P placed on the respective trays. Therefore, the size setting operation by the user can be omitted.

Figure 33:
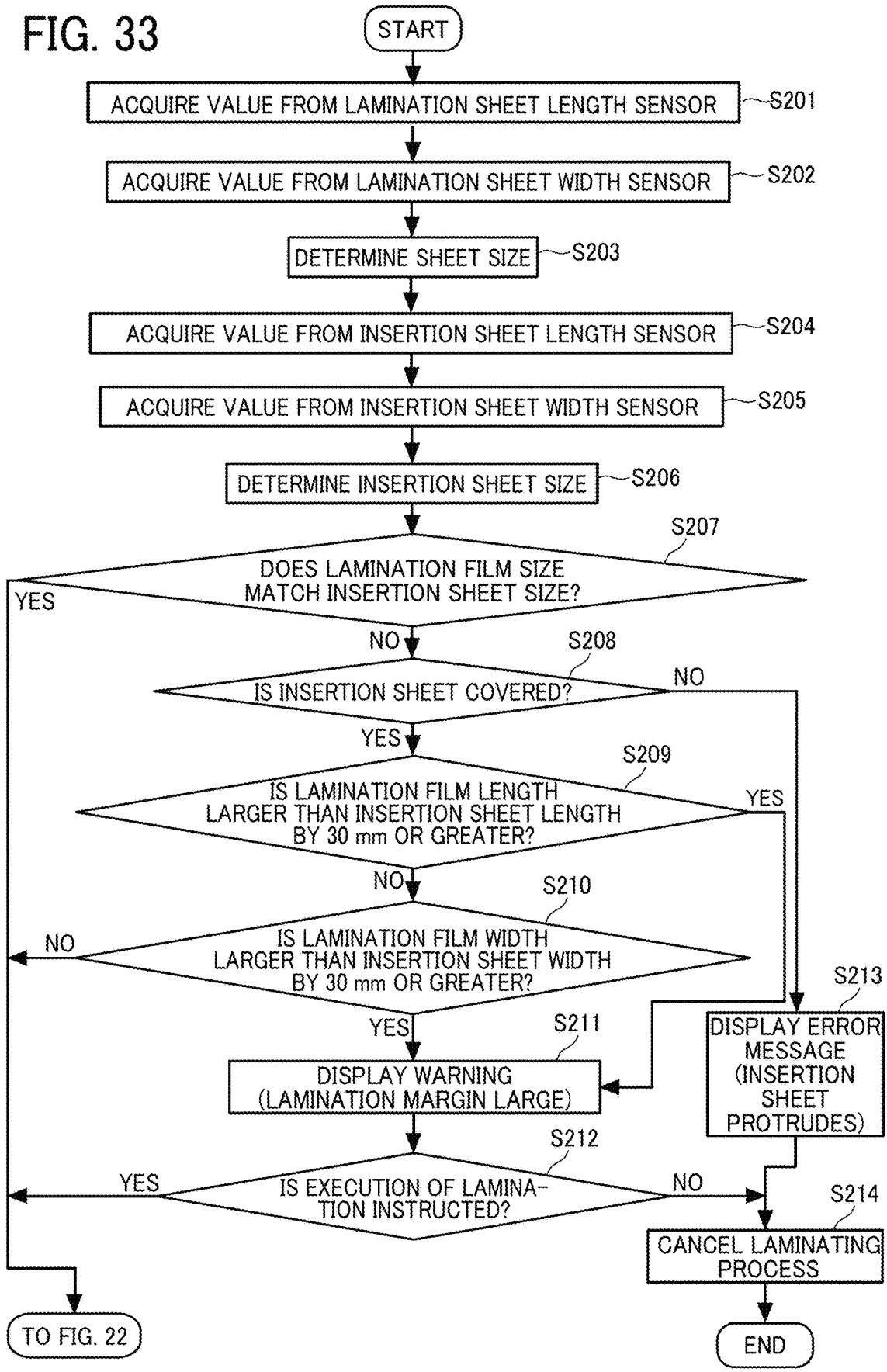
FIG. 33 is a flowchart illustrating operations of the controller 50 illustrated in FIG. 32.

FIG. 33 is a flowchart illustrating the operations of the controller 50a according to the second embodiment, which is described with reference to the flowchart and FIGS. 22, 25, 27, 28, and 31.

In S201, the controller 50a acquires a detection value from the length sensors C10 to C12 on the sheet tray 102a (lamination sheet length sensor), to detect the length of the lamination sheet S thereon. In S202, the controller 50a acquires a detection value from the width sensors C13 to C15 on the sheet tray 102a (lamination sheet width sensor), to detect the width size of the lamination sheet S.

In S203, the size acquisition unit 52a determines the size of the lamination sheet S on the sheet tray 102a (see FIG. 31).

In S204, the controller 50a acquires a detection value from the length sensors C10 to C12 (insertion sheet length sensor), to detect the length of the insertion sheet P on the sheet feeding tray 103. In S205, the controller 50a acquires a detection value from the width sensors C13 to C15 on the sheet feeding tray 103 (insertion sheet width sensor), to detect the width size of the insertion sheet P on the sheet feeding tray 103.

Then, in S206, the size acquisition unit 52a determines the size of the insertion sheet P on the sheet feeding tray 103a (see FIG. 31).

When the insertion sheet P is a medium sent from an image forming apparatus, the size information of the medium possessed by the image forming apparatus may be used in S204 to S206.

In S207, a determination unit 54a of the controller 50a determines whether the size of the lamination sheet S (lamination film) matches the size of the insertion sheet P. In response to a determination that the sizes match ("Match" in FIG. 25), the control unit 56 controls the sheet processing apparatus 100 to perform the sheet processing operation illustrated in the flowchart of FIG. 22.

On the other hand, in response to a determination of mismatch between the lamination sheet size and the insertion sheet size (other than "Match" in FIG. 25), in S208, the determination unit 54a determines whether or not the insertion sheet P is covered by the lamination sheet S (whether the insertion sheet P does not protrude from the lamination sheet S). In response to a determination that the insertion sheet P is covered, that is, does not protrude ("Pending" in FIG. 25), the controller 50a proceeds to S209.

In S209, the determination unit 54a of the controller 50a determines whether the length of the lamination sheet S is equal to or greater than a threshold (e.g., the length of the insertion sheet P plus 30 mm). In response to a determination of Yes, the controller 50a proceeds to S211, and the control unit 56 displays a warning on the control panel 10 (see FIG. 27).

By contrast, in response to a determination of No in S209, in S210, the determination unit 54a determines whether the width size of the lamination sheet S is equal to or greater than a threshold (e.g., the width of the insertion sheet P plus 30 mm). In response to a determination of Yes, in S211, the control unit 56 displays a warning on the control panel 10 (see FIG. 27).

In response to a determination of No in S210, the control unit 56 controls the sheet processing apparatus 100 to perform the sheet processing operation illustrated in the flowchart of FIG. 22.

The operation performed in S211 is described in detail. The control panel 10 displays the warning screen to notify the user that the size of the insertion sheet P is small and the margin of the lamination sheet S is large (see FIG. 27). At the same time, the user is prompted to determine whether or not to perform the laminating process in this state.

In S212, in response to touching (pressing), by the user, of the area indicated as "execute lamination" on the control panel 10, the control unit 56 controls the sheet processing apparatus 100 to perform the sheet processing operation illustrated in the flowchart of FIG. 22.

By contrast, in response to touching (pressing), by the user, of the area indicated as "cancel" on the control panel 10 (No in S212), in S214, the controller 50a (the control unit 56) cancels the laminating process.

Returning back to S208, and the remaining processes are described. In response to a determination by the determination unit 54a that the insertion sheet P protrudes, that is, is not covered ("No" in FIG. 25), in S213, the control unit 56 displays an error message on the control panel 10 as illustrated in FIG. 28.

The controller 50a displays an error screen on the control panel 10 to notify the user that the laminating process is canceled because the size of the insertion sheet P is too large, and prompts the user to confirm the cancellation. Thus, the controller 50a outputs a notification for the user with the control panel 10 serving as the notification device. In response to touching (pressing), by the user, of the area indicated as "OK" on the control panel 10, in S214, the controller 50a (the control unit 56) cancels the laminating process.

The sheet processing apparatus 100 according to the present embodiment is configured to automatically acquire the size of the lamination sheet S and the size of the insertion sheet P and can obviate the need of the size setting operation by the user.

In S209 and S210, the threshold is an example and may be changed according to the specifications of the apparatus. Further, the threshold may be changed depending on the determination result of the size of the lamination sheet S and the size of the insertion sheet P.

A third embodiment is described. In the first and second embodiments, a single insertion sheet P is inserted in a single lamination sheet S (lamination film). However, depending on the size of the lamination sheet S, a plurality of insertion sheets P can be inserted. Therefore, in the present embodiment, a description is given of a sheet processing apparatus capable of inserting either a single insertion sheet P or a plurality of insertion sheets P depending on the size setting of the lamination sheet S and the insertion sheet P.

Figures 34, 35:
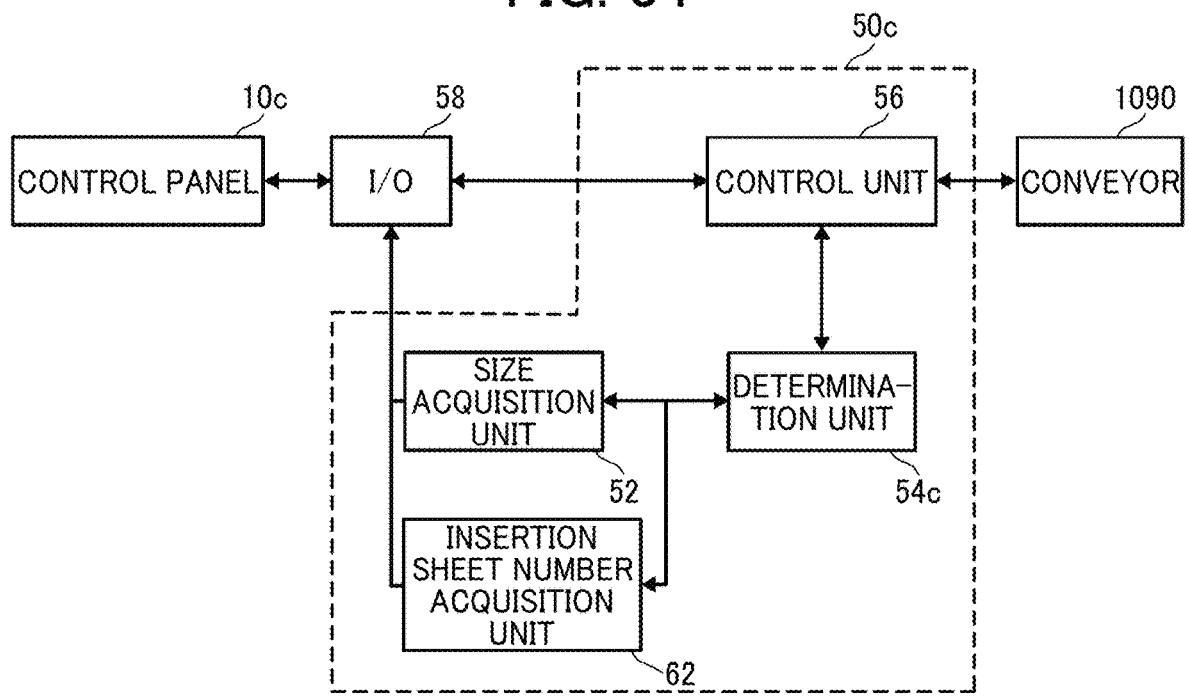
FIG. 34 is a block diagram illustrating a controller of a sheet processing apparatus according to a third embodiment.
FIG. 35 is an example of a table used for determining the number of insertion sheets insertable, in accordance with the sizes of the lamination sheet and the insertion sheet.

FIG. 34 is a block diagram illustrating a controller 50c of the sheet processing apparatus 100 according to the third embodiment. As illustrated in FIG. 34, the controller 50c includes an insertion sheet number acquisition unit 62 to acquire the number of insertion sheets P to be inserted in the lamination sheet S.

The insertion sheet number acquisition unit 62 is connected to a control panel 10c, which is a display and operation device, via the I/O port 58. The insertion sheet number acquisition unit 62 acquires the number of insertion sheets P to be inserted in the lamination sheet S, input (set) by the user via the control panel 10c.

Further, the determination unit 54c according to the present embodiment determines whether or not two or more insertion sheet P can be inserted in the lamination sheet S, based on the size of the lamination sheet S and the size of the insertion sheet P acquired by the size acquisition unit 52.

FIG. 35 is an example of a table used for determining the number of insertion sheets insertable, based on the size of the lamination sheet S and the insertion sheet P. When the size of the lamination sheet S (lamination film) and the size of the insertion sheet P are the same or similar, the determination unit 54c determines that only one insertion sheet P can be inserted. By contrast, for example, when the size of the lamination film is A3 in short edge feed (A3-SEF) and the size of the insertion sheet is A3 in long edge feed (A4-LEF), the determination unit 54c determines that two insertion sheets P can be inserted.

The control panel 10c according to the present embodiment uses the above table to change the setting screen for the number of insertion sheets P.

FIGS. 36A and 36B are examples of a setting screen for the number of insertion sheets displayed on the control panel 10c. When the size of the lamination sheet S (lamination film) matches the size of the insertion sheet P to be inserted, a single insertion sheet P can be inserted. Therefore, as illustrated in FIG. 36A, the field labelled as "insertion sheet number" is grayed out so as not to be changed.

On the other hand, when the size of the lamination sheet S (lamination film) and the size of the insertion sheet to be inserted are different and a plurality of insertion sheets P can be inserted, the field labelled as "insertion sheet number" becomes active to be changeable. In FIG. 36B, the "insertion sheet number" is set to two.

A description is given of an operation of inserting a plurality of insertion sheets P into the lamination sheet S. The series of operations of the sheet processing apparatus 100 controlled by the controller 50c includes the above-described operations illustrated in FIGS. 1 to 9, and the operations after FIG. 9 are described with reference to FIGS. 37 to 42.

Figure 37:
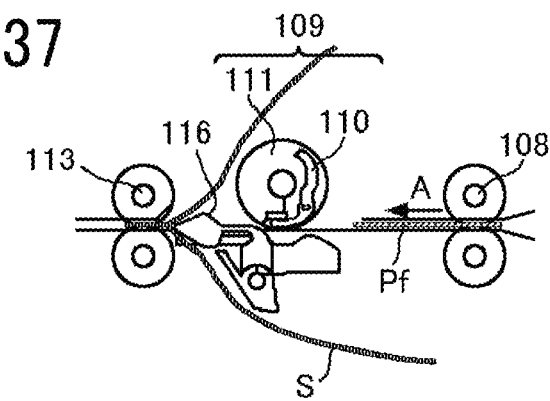
FIG. 37 is a schematic diagram illustrating the sheet processing apparatus according to the third embodiment, in which a first insertion sheet is conveyed in multi-sheet inserting.

In FIG. 9, the sheet processing apparatus 100 is in a state where the tip (bonded portion) of the lamination sheet S is gripped (nipped) by the exit roller pair 113. Subsequently, as illustrated in FIG. 37, the sheet processing apparatus 100 rotates the entrance roller pair 108 and conveys a first insertion sheet Pf from the sheet feeding tray 103 (see FIG. 1) toward the exit roller pair 113 in the forward conveyance direction (direction A).

Figure 38:
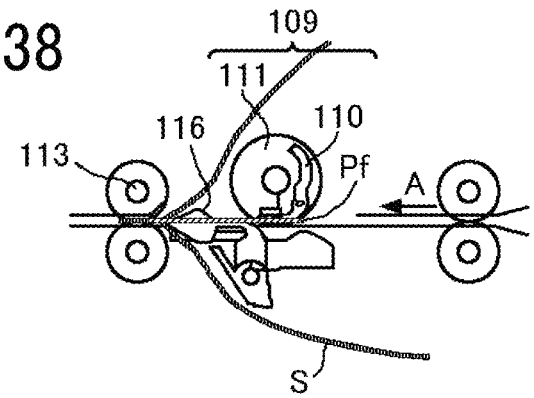
FIG. 38 is a schematic view illustrating a state in which the first insertion sheet converges the lamination sheet in the multi-sheet inserting, subsequent to the state in FIG. 37.

Subsequently, as illustrated in FIG. 38, the sheet processing apparatus 100 rotates the exit roller pair 113 so that the lamination sheet S and the first insertion sheet Pf converge, and inserts the first insertion sheet Pf into the opened lamination sheet S.

Figure 39:
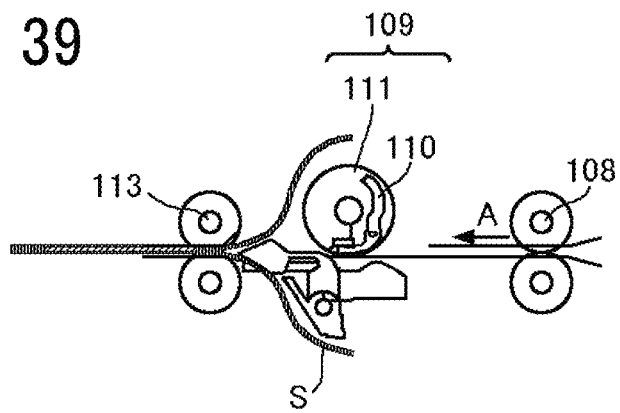
FIG. 39 is a schematic view illustrating a state in which the lamination sheet inserting the first insertion sheet is conveyed in the forward conveyance direction in the multi-sheet inserting subsequent to the state in FIG. 38.

Next, as illustrated in FIG. 39, the sheet processing apparatus 100 controls the exit roller pair 113 to convey the lamination sheet S, with the first insertion sheet Pf inserted therein, in the forward conveyance direction (direction A) and suspends the sheet conveyance after the lamination sheet S has passed the exit roller pair 113.

Figure 40:
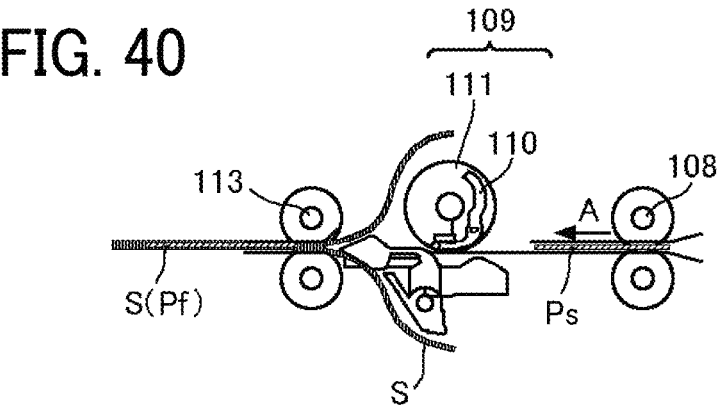
FIG. 40 is a schematic view illustrating a state in which a second insertion sheet is conveyed in the multi-sheet inserting, subsequent to the state in FIG. 39.

Subsequently, as illustrated in FIG. 40, the sheet processing apparatus 100 rotates the entrance roller pair 108 and conveys a second insertion sheet Ps from the sheet feeding tray 103 (see FIG. 1) toward the exit roller pair 113 in the forward conveyance direction (direction A).

Figure 41:
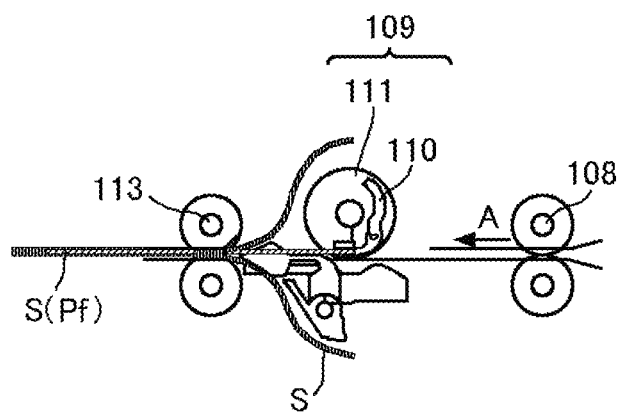
FIG. 41 is a schematic view illustrating a state in which the second insertion sheet converges the lamination sheet in the multi-sheet inserting, subsequent to the state in FIG. 40.

Subsequently, as illustrated in FIG. 41, the sheet processing apparatus 100 rotates the entrance roller pair 108 so that the lamination sheet S and the second insertion sheet Ps converge, and inserts the second insertion sheet Ps into the opened lamination sheet S.

Figure 42:
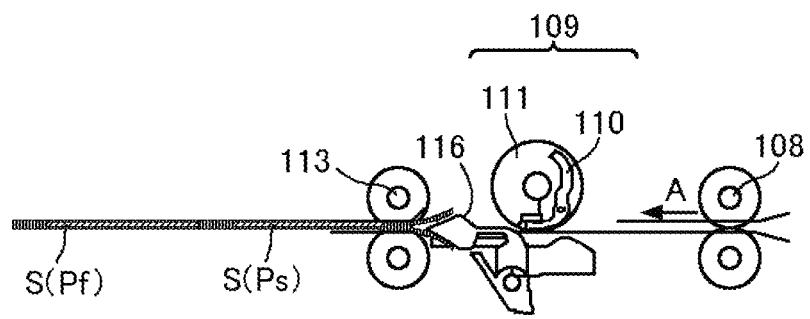
FIG. 42 is a schematic view illustrating a state in which the lamination sheet inserting the first and second insertion sheets is conveyed in the forward conveyance direction in the multi-sheet inserting, subsequent to the state in FIG. 41.

Then, as illustrated in FIG. 42, the exit roller pair 113 conveys the lamination sheet S, with the first and second insertion sheets Pf and Ps inserted therein, in the forward conveyance direction (direction A), thereby overlaying the two sheets (plies) of the lamination sheet S one on another and closing the opening. Then, the sheet processing apparatus 100 ejects and stacks the lamination sheet S sandwiching the insertion sheets Pf and Ps onto the output tray 104 (FIG. 1) with the exit roller pair 113, or a roller or the like positioned downstream from the exit roller pair 113.

Although FIGS. 37 to 42 illustrate the operation of inserting two insertion sheets Pin a single lamination sheet S, three or more insertion sheets can be inserted through a similar operation.

The series of processes for inserting two or more insertion sheets P in a single lamination sheet S, illustrated in FIGS. 9 and 37 to 42, is called multi-sheet inserting. On the other hand, the series of processes for inserting a single insertion sheet P in a single lamination sheet S, illustrated in FIGS. 9 to 12A, is called single sheet inserting.

Then, the sheet processing apparatus 100 according to the present embodiment can switch the laminating process between the single sheet inserting and the multi-sheet inserting in accordance with the size setting of the lamination sheet S and the insertion sheet P. Therefore, a wider variety of laminating process can be automatically performed.

Figure 43:
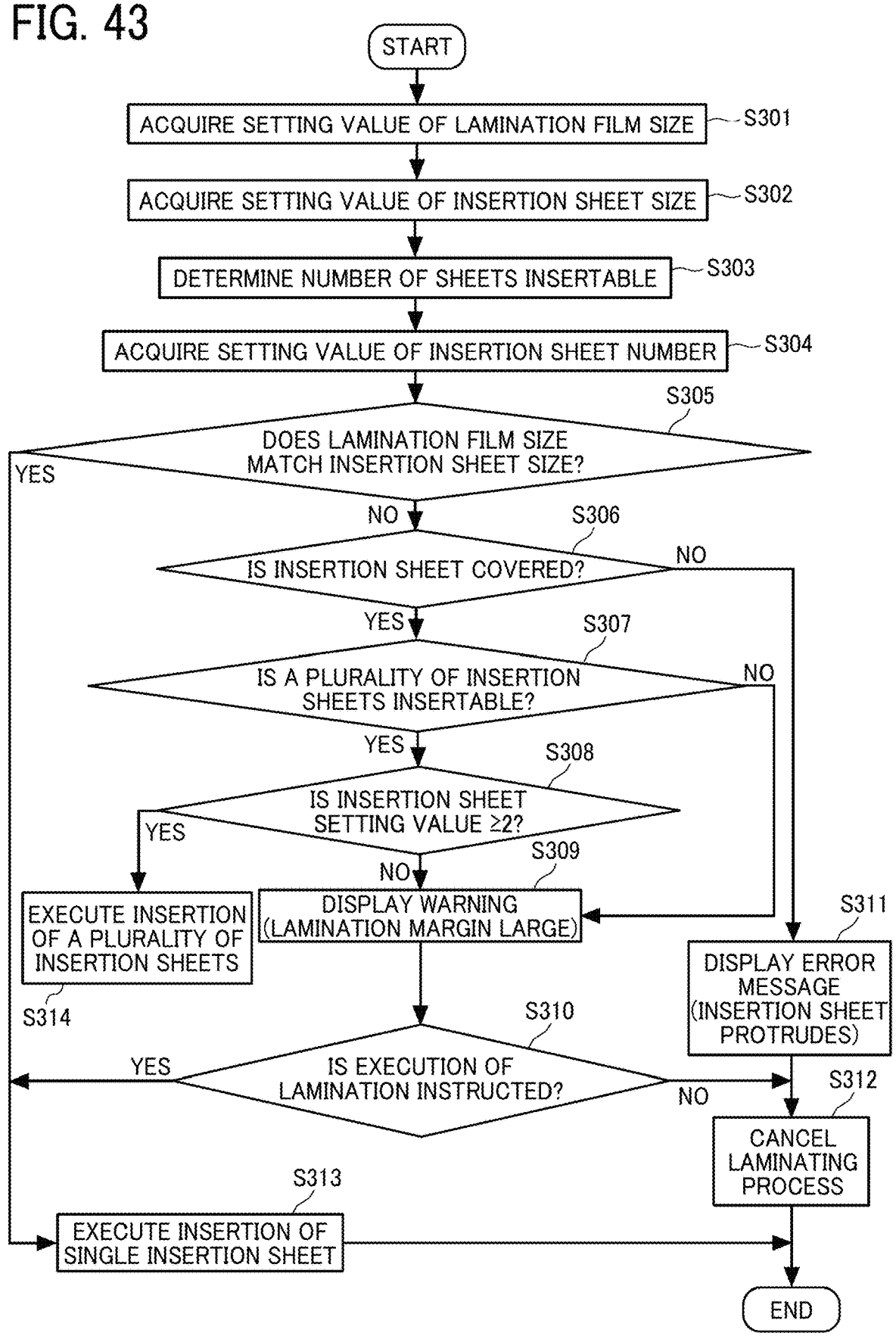
FIG. 43 is a flowchart illustrating sheet processing operation controlled by the controller illustrated in FIG. 32.

FIG. 43 is a flowchart illustrating the operation of the sheet processing apparatus 100 controlled by the controller 50c according to the third embodiment. The description is given with reference to the flowchart and the figures.

In S301, the size acquisition unit 52 of the controller 50c acquires the size of the lamination sheet S, and, in S302, acquires the size of the insertion sheet P. That is, as illustrated in FIGS. 36A and 36B, the size acquisition unit 52 acquires the lamination film size set value and the insertion sheet size set value input by the user on the control panel 10c.

Subsequently, in S303, the control panel 10c determines the insertable number of insertion sheets P based on the table of FIG. 35, and indicates the insertable number of insertion sheets P on the control panel 10c so as to be selected by the user as illustrated in FIG. 36B.

In S304, the insertion sheet number acquisition unit 62 of the controller 50c acquires the insertion sheet set value, input by the user, indicating the number of the insertion sheets P to be inserted.

In S305, the determination unit 54c of the controller 50c determines whether the size of the lamination sheet S matches the size of the insertion sheet P. Based on a determination that the sizes match ("Match" in FIG. 25), in S313, the control unit 56 controls the sheet processing apparatus 100 to perform the operation for single sheet inserting illustrated in the flowchart of FIG. 22.

On the other hand, based on a determination that the sizes do not match, in S306, and the determination unit 54c determines whether or not the insertion sheet P protrudes from the lamination sheet S. Based on a determination that the protrusion does not occur, the controller 50c proceeds to S307.

In S307, the determination unit 54c determines whether or not a plurality of insertion sheets P can be inserted with reference to the table in FIG. 35. Based on a determination of YES, the controller 50c proceeds to S308. The determination unit 54c refers to the insertion sheet set value, and determines whether or not the insertion sheet set value is two or greater.

Based on a determination that the insertion sheet set value is two or greater in S308, in S314, the control unit 56 controls the sheet processing apparatus 100 to perform the operation for multi-sheet inserting illustrated in FIGS. 9 and 37 to 42.

When the determination unit 54c determines that inserting a plurality of insertion sheets P is not feasible in S307, or determines that the insertion sheet set value is one in S308, the controller 50c proceeds to S309.

In S309, the control unit 56 displays a warning on the control panel 10c. The control panel 10c displays the warning screen to notify the user that the size of the insertion sheet P is small and the margin of the lamination sheet S is large (see FIG. 27). At the same time, the user is prompted to determine whether or not to perform the laminating process in this state.

In S310, in response to touching (pressing), by the user, of the area indicated as "execute lamination" on the control panel 10c (instruction of execution of lamination), the control unit 56 controls the sheet processing apparatus 100 to perform the series of processes for single sheet inserting illustrated in the flowchart of FIG. 22.

By contrast, in response to touching (pressing), by the user, of the area indicated as "cancel" on the control panel 10c (No in S310), in S312, the sheet processing apparatus 100 (the control unit 56) cancels the laminating process (sheet processing).

Returning to S306, and the remaining processes are described below. When the determination unit 54c determines that the insertion sheet P protrudes, that is, is not covered, in S311, the control unit 56 displays an error message on the control panel 10c (see FIG. 28).

Thus, control unit 56 notifies the user that the laminating process is canceled and prompts the user to confirm the cancellation. By contrast, in response to touching (pressing), by the user, of the area indicated as "OK" on the control panel 10, in S312, the sheet processing apparatus 100 (the control unit 56) cancels the laminating process.

Therefore, the sheet processing apparatus according to the present embodiment can insert either a single insertion sheet P or a plurality of insertion sheets P in a single lamination sheet S depending on the size setting of the lamination sheet S and the insertion sheet P.

A fourth embodiment is described below. In the above-described first to third embodiments, the sheet processing apparatus acquires the size of the lamination sheet S and the size of the insertion sheet P (and the number of the insertion sheets P to be inserted), and determines whether or not the lamination is feasible after starting the sheet processing.

In the present embodiment, a description is given below of a sheet processing apparatus capable of displaying, on a control panel, a user interface (UI) for sequentially setting the sizes of the lamination sheet S and the insertion sheet P, the orientations thereof, and the number of the insertion sheets P to be inserted, and performing laminating process according to the intension of the user.

Figure 44:
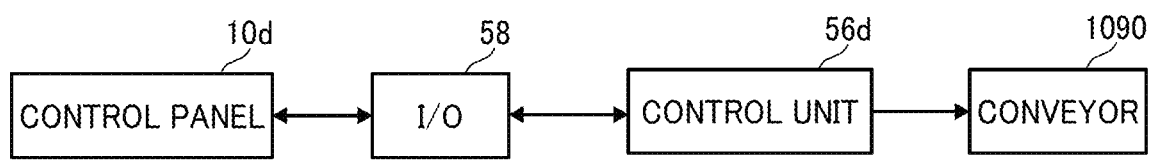
FIG. 44 is a block diagram illustrating a control configuration of a sheet processing apparatus according to a fourth embodiment.

FIG. 44 is a block diagram illustrating a control configuration of the sheet processing apparatus according to the fourth embodiment. In FIG. 44, elements identical to those illustrated in FIG. 23 are given identical reference numerals, and the descriptions thereof are omitted.

As illustrated in FIG. 44, a control panel 10d, which is a display and operation device, is connected to a control unit 56d that controls sheet processing via the I/O port 58. The control unit 56d controls the sheet processing according to instructions from the user via the control panel 10d.

Figure 45:
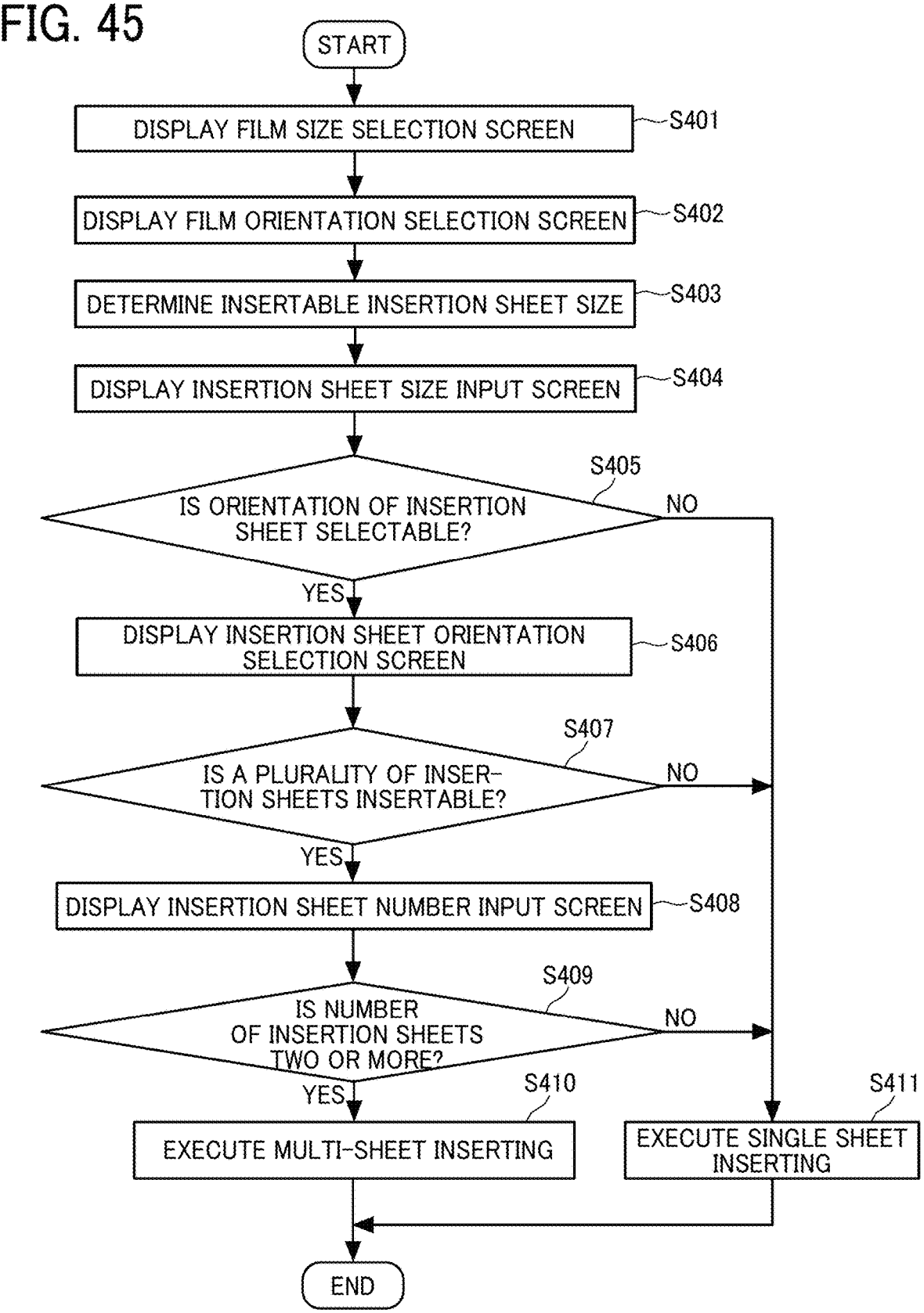
FIG. 45 is a flowchart illustrating sheet processing operation controlled by the control configuration illustrated in FIG. 44.

FIG. 45 is a flowchart illustrating the sheet processing operation according to the fourth embodiment. The description is given with reference to the flowchart and the figures.

In S401, the control panel 10d of the sheet processing apparatus 100d displays a first lamination setting screen as illustrated in FIG. 46, and prompts the user to select and set the size of the lamination sheet S (lamination film). Next, in S402, the control panel 10d displays a second lamination setting screen as illustrated in FIG. 47, and prompts the user to select and set the orientation of the lamination sheet S (lamination film).

There are two types of sheet orientations: (a) the plies of the lamination film are bonded on a long size, and (b) the plies of the lamination film are bonded on a short side. In the case of (a) the plies of the lamination film are bonded on the long size, the long side is perpendicular to the conveyance direction and the lamination film is to be fed in portrait orientation. In the case of (b) the plies of the lamination film are bonded on the short size, the short side is perpendicular to the conveyance direction and the lamination film is to be fed in landscape orientation.

Next, in S403, and the control unit 56d determines the size of the insertable insertion sheet P. That is, once the size and orientation (feeding direction) of the lamination sheet S (lamination film) are determined, the size of the insertion sheet P insertable therein is determined based on the table illustrated in FIG. 25.

Next, in S404, the control unit 56d displays insertable insertion sheet sizes on a third lamination setting screen on the control panel 10d as illustrated in FIG. 48 and prompts the user to select and set the size of the insertion sheet P.

Subsequently, in S405, the control unit 56d determines whether or not the orientation of the insertion sheet can be selected by the user. For example, when an A4 insertion sheet is inserted in the lamination film for A3, the A4 insertion sheet can be inserted in eighter the vertical (portrait) orientation and the horizontal (landscape) orientation. However, an A3 insertion sheet can be inserted only with the same orientation as the lamination film. The insertable orientation of the insertion sheet is determined based on the relation of the size and the orientation of the lamination sheet S (lamination film) and the size of the insertion sheet. The control unit 56*d* can perform such determination referring to the table illustrated in FIG. 35 for determining the insertion sheet number.

When the control unit 56*d* determines that the insertion orientation is selectable (YES), the control unit 56*d* proceeds to S406.

Figure 49:
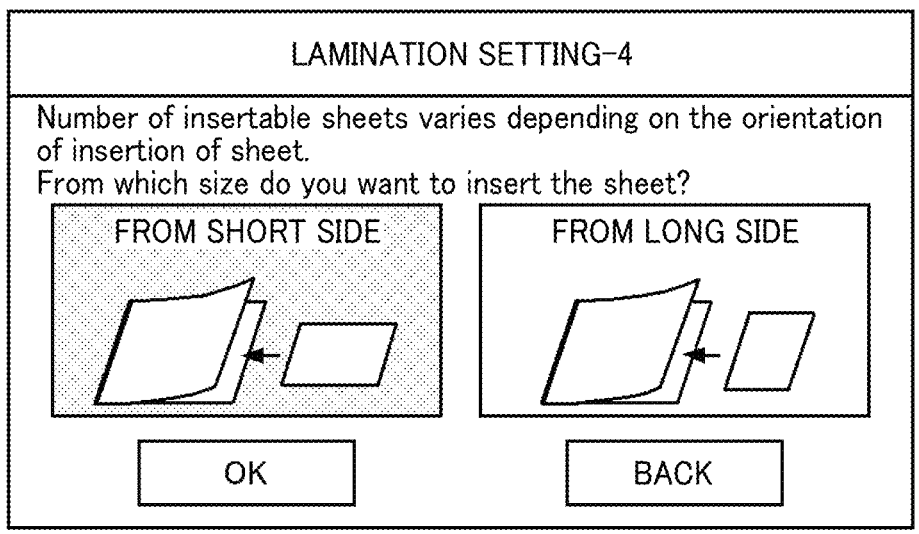
FIG. 49 is a fourth lamination setting screen displayed on the control panel according to the fourth embodiment.

Next, in S406, the control panel 10*d* displays a fourth lamination setting screen for selecting the orientation of the insertion sheet P on the control panel 10*d* as illustrated in FIG. 49, and prompts the user to select and set the orientation of the insertion sheet P.

In S407, the control unit 56*d* determines whether or not a plurality of insertion sheets P can be inserted into the lamination sheet S (lamination film). This can also be determined using the table illustrated in FIG. 35. When the control unit 56*d* determines that a plurality of insertion sheets P can be inserted (YES), the control unit 56*d* proceeds to S408.

Figure 50:
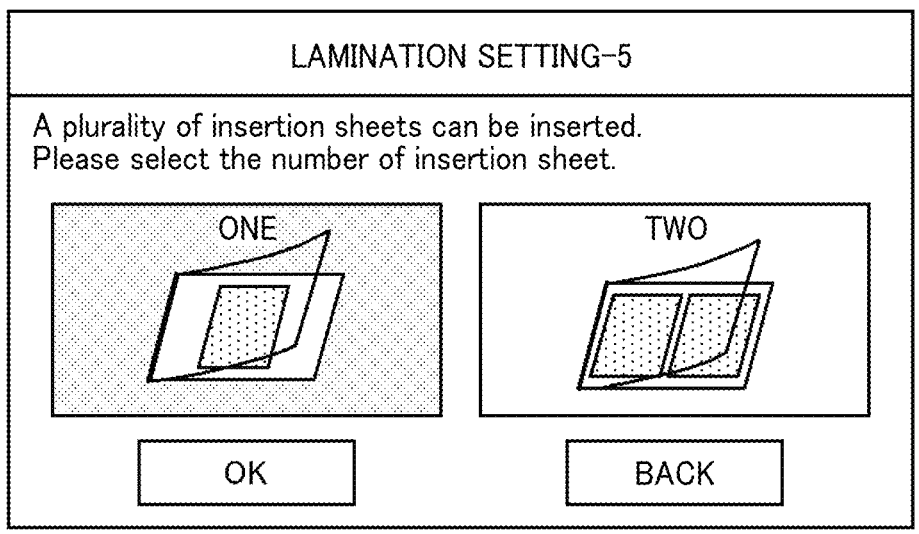
FIG. 50 is a fifth lamination setting screen displayed on the control panel according to the fourth embodiment.

In S408, the control unit 56*d* displays a fifth lamination setting screen for selecting the number of the insertion sheets P on the control panel 10*d* as illustrated in FIG. 50, and prompts the user to select and set the number of insertion sheet P.

Next, in S409, the control panel 10*d* sends the sheet processing instructions from the user to the control unit 56. When a plurality of insertion sheets P is to be inserted (Yes in S409), in S410, the control unit 56*d* controls the sheet processing apparatus 100 to perform the multi-sheet inserting, illustrated in FIGS. 9 and 37 to 42.

When a single insertion sheet P is to be inserted (No in S409), in S411, the control unit 56*d* controls the sheet processing apparatus 100 to perform the single sheet inserting, illustrated in the flowchart of FIG. 22.

Returning to S405, and the remaining processes are described below. When the control unit 56*c* determines that the orientation of the insertion sheet P is not selectable (No in S405), in S411, the control unit 56*d* of the controller 50*c* controls the sheet processing apparatus 100 to perform the single sheet inserting illustrated in the flowchart of FIG. 22.

Similarly, when a plurality of insertion sheets P is not insertable into the lamination sheet S (No in S407), the control unit 56 proceeds to S411 and controls the sheet processing apparatus 100 to perform the single sheet inserting illustrated in the flowchart of FIG. 22.

As described above, in the present embodiment, the user can input desired settings on the screen display on the control panel 10*d*. Therefore, the sheet processing apparatus 100 can notify the user that a plurality of insertion sheets can be inserted while preventing setting error by the user.

According to an aspect of the present disclosure, a sheet processing apparatus configured to insert an insertion sheet in a two-ply sheet includes a display and operation device configured to display information and receive an operation input, a size acquisition unit configured to acquire a size of the two-ply sheet and ae size of the insertion sheet input via the display and operation device, a determination unit configured to determine an appearance (state) of the two-ply sheet in which the insertion sheet is sandwiched, based on the size of the two-ply sheet and the size of the insertion sheet, and a control unit configured to control sheet processing based on a determination result generated by the determination unit.

According to this aspect, since the sheet processing can be controlled in accordance with the size of the two-ply sheet and the size of the insertion sheet inserted therein, the desired inserting can be performed.

Other embodiments of the present disclosure are described.

In laminators, a user may set an irregular size two-ply sheet or an irregular size insertion sheet. In such a case, even when the difference between the two-ply sheet size and the insertion sheet size is improper, the laminator may laminate the insertion sheet with the two-ply sheet of undesirable size. As a result, the two-ply sheet is wasted, or the appearance of the laminated product is degraded.

In view of the foregoing, in the following, descriptions are given of a laminator, an image forming apparatus, and an image forming system that can inhibit an inconvenience that lamination is performed in a state in which the difference between the two-ply sheet size and the insertion sheet size is improper.

A fifth embodiment of the present disclosure concerns a laminator including a sheet separation device to separate a two-ply sheet, in which the two sheets (plies) are overlapped and bonded together at one end (also referred to as a bonded end or first end), a lamination device, and a detection unit. The sheet separation device separates the two sheets of the two-ply sheet from a non-bonded portion of the two-ply sheet, and inserts an insertion sheet between the separated sheets. The lamination device performs a laminating process on the two-ply sheet sandwiching the insertion sheet processed by the sheet separation device. The detection unit detects a difference between a size of the two-ply sheet and a size of the insertion sheet at least before the laminating process. With this configuration, the laminator cancels the execution of the laminating process based on a determination of sheet size mismatch based on a detection result of the detection unit under a predetermined condition.

According to the above-described aspect, the laminator, the image forming apparatus, and the image forming system can inhibit an inconvenience that lamination is executed in a state in which the difference between the two-ply sheet size and the insertion sheet size is improper.

A configuration and operations of a laminator 200A are described below with reference to FIG. 51. Note that the laminator 200A can have a control configuration similar to the control configuration illustrated in FIG. 23.

The laminator 200A includes a sheet separation device 1, a lamination device 51, an output tray 13, a second output tray 55 as an ejection unit, and the like.

As illustrated in FIG. 1, the sheet separation device 1 includes a first feed tray 11, a second feed tray 12, a first feed roller 2, a second feed roller 3, a first conveyance roller pair 4, a second conveyance roller pair 5, a third conveyance roller pair 6, first to eighth sensors 41, 42, 43, 44, 45, 46, 47, and 48, a winding roller 20, a drive device 30, a separation claw 16 as a separator (see FIGS. 56A, 56B, and 61A to 61E).

The sheet separation device 1 separates a non-bonded portion of a two-ply sheet PJ, in which two sheets P1 and P2 (plies) are overlapped and bonded together at the first end of the two-ply sheet as a bonded portion A of the two-ply sheet (see FIGS. 61A to 10E), and inserts an insertion sheet PM between the two sheets P1 and P2 separated from each other.

The two-ply sheet PJ in the present embodiment is made of two sheets P1 and P2 (plies) overlapped and bonded together at one of four sides as the bonded portion A. That is, the two sheets P1 and P2 (plies) are connected on only one side of the two-ply sheet PJ by thermal welding or the like as the bonded portion A, and the two sheets are not connected on other sides of the two-ply sheet PJ. The two sheets P1 and P2 (plies) constituting the two-ply sheet PJ can be transparent lamination films (lamination sheets).

The sheet separation device 1 separates the two superposed sheets P1 and P2 of the two-ply sheet PJ (from the opposite side of the bonded portion A) while leaving bonding between the two sheets P1 and P2 at the bonded portion A, and inserts at least a single insertion sheet PM between the separated two sheets P1 and P2. The insertion sheet PM is, for example, plain paper or a photograph.

The lamination device 51 is a mechanism for performing the laminating process on the two-ply sheet PJ after the separation process and the inserting process are performed by the sheet separation device 1.

Specifically, the lamination device 51 is disposed downstream (on the left in FIG. 51) from the sheet separation device 1 in the forward conveyance direction. The laminating process is heating and pressing the two-ply sheet PJ sandwiching the insertion sheet PM between the two sheets P1 and P2 (the plies of the two-ply sheet PJ) separated by the sheet separation device 1, thereby bonding the non-bonded portion of the two-ply sheet PJ. The lamination device 51 includes a plurality of heat and pressure roller pairs, disposed along the conveyance direction, that apply heat and pressure to the two-ply sheet PJ while conveying, in the forward direction, the two-ply sheet PJ with the insertion sheet PM inserted therein. A fourth conveyance passage K6 is disposed between the third conveyance roller pair 6 and the lamination device 51.

The output tray 13 (first output tray) is for storing the two-ply sheet PJ (and the insertion sheet PM) ejected from the lamination device 51 after the laminating process.

The second output tray 55 is for storing sheets that are not laminated. The second output tray 55 also functions as an ejection unit to eject the two-ply sheet PJ or the insertion sheet PM outside of the apparatus without laminating the sheets in the case of sheet size mismatch between the two-ply sheet PJ and the insertion sheet PM, which will be described in detail later with reference to FIGS. 59A and 59B.

The laminator 200A includes a plurality of conveyance passages such as a first conveyance passage K1, a second conveyance passage K2, a third conveyance passage K3, a first branched conveyance passage K4, a second branched conveyance passage K5, and the fourth conveyance passage K6. Each of the above-described conveyance passages K1 to K6 includes a pair of conveyance guide plates facing each other to guide the conveyance of sheets such as the two-ply sheet PJ and the insertion sheet PM.

In the present embodiment, the first and second branched conveyance passages K4 and K5 branch off in different directions, with the third conveyance passage K3 interposed therebetween, between the winding roller 20 and the third conveyance roller pair 6.

The fourth conveyance passage K6 extends from the sheet separation device 1 (the third conveyance roller pair 6) to the lamination device 51. The fourth conveyance passage K6 and a conveyance passage leading to the second output tray 55 are branched in different directions on the downstream side (left side in FIG. 51) of the third conveyance roller pair 6.

Specifically, the two-ply sheet PJ is stacked on the first feed tray 11 as illustrated in FIG. 51. The first feed roller 2 feeds the uppermost two-ply sheet PJ on the first feed tray 11 to the first conveyance roller pair 4, and the first conveyance roller pair 4 conveys the two-ply sheet PJ to the first conveyance passage K1.

In this way, the first feed tray 11, the first feed roller 2, and the like function as a first feeder to feed the two-ply sheet PJ. Then, the first feeder rotates the first feed roller 2 under the control of the control unit 56 (see FIG. 23) to feed the two-ply sheet PJ from the first feed tray 11.

The insertion sheet PM is stacked on the second feed tray 12. The second feed roller 3 feeds the uppermost insertion sheet PM on the second feed tray 12 to the second conveyance passage K2.

In this way, the second feed tray 12, the second feed roller 3, and the like function as a second feeder to feed the insertion sheet PM, which is inserted between the sheets P1 and P2 separated from the non-bonded portion of the two-ply sheet PJ. Then, the second feeder rotates the second feed roller 3 under the control of the control unit 56 (see FIG. 23) to feed the insertion sheet PM from the second feed tray 12.

The control unit 56 of the laminator 200A in the present embodiment controls the second feeder (e.g., the second feed roller 3 and the second feed tray 12) to state feeding of the insertion sheet PM at a timing after the start of feeding of the two-ply sheet PJ by the first feeder (e.g., the first feed roller 2 and the first feed tray 11) and before completion of operation for separation of the non-bonded portion of the two-ply sheet PJ.

That is, the present embodiment can streamline the operation of the by the user such that the user can instruct the feeding of the two-ply sheet PJ and the feeding of the insertion sheet PM by a single operation (on the control panel 49), not separate operations. Specifically, in response to a single pressing (a single command) by the user of a button on the control panel 49, the laminator 200A automatically performs a series of the separation process of the two-ply sheet PJ (including feeding of the two-ply sheet PJ), the inserting process of inserting the insertion sheet PM into the two-ply sheet PJ, and the laminating process.

Each of the first to third conveyance roller pairs 4 to 6 and the ejection roller pair 7 includes a drive roller and a driven roller, and conveys the sheet nipped by the nip of the roller pair. The third conveyance passage K3 includes, from the upstream side, the second conveyance roller pair 5, the winding roller 20, and the third conveyance roller pair 6. The winding roller 20 and the third conveyance roller pair 6 is configured to rotate in forward and reverse directions. The third conveyance roller pair 6 can convey the sheet in the forward direction that is to the left in FIG. 51 and in the reverse direction that is to the right direction in FIG. 51. The third conveyance roller pair 6 conveys the sheet toward the lamination device 51 or the second output tray 55. Further, the ejection roller pair 7 is a conveyance roller pair to eject the laminated two-ply sheet PJ (and the insertion sheet PM) toward the output tray 13.

In addition, a switching claw 17 (a first switching member) is disposed on the downstream side (on the left side in FIG. 51) of the third conveyance roller pair 6 in the forward conveyance direction. The switching claw 17 rotates to switch the conveyance route between the route leading to the lamination device 51 and the route leading to the second output tray 55.

That is, the switching claw 17 switches the state of the laminator 200A between a first state (illustrated in FIG. 59A) in which the fourth conveyance passage K6 is open and the conveyance passage leading to the second output tray 55 is closed and a second state (illustrated in FIG. 59B) in which the fourth conveyance passage K6 is closed and the conveyance passage leading to the second output tray 55 is open.

The switching claw 17 is controlled by the control unit 56 in accordance with the mode selected by the user or in response to a detection of sheet size mismatch, so as to switch the conveyance destination (ejection destination) of the sheet.

The operation of the switching claw 17 is described in detail later with reference to FIGS. 59A and 59B and the like.

Referring to FIG. 51, each of the first to fifth sensors 41 to 45 and seventh and eight sensors 47 and 48 as sheet detection sensors is a reflective photosensor that optically detects whether the sheet is present at the position of each sensor. The first sensor 41 is disposed in the vicinity of the downstream side of the first conveyance roller pair 4. The second sensor 42 is disposed in the vicinity of the downstream side of the second feed roller 3. The third sensor 43 is disposed in the vicinity of the downstream side of the second conveyance roller pair 5. The fourth sensor 44 is disposed in the vicinity of the downstream side of the winding roller 20 (that is the left side of the winding roller 20 in FIG. 51) and the upstream side of the third conveyance roller pair 6 (that is the right side of the third conveyance roller pair 6 in FIG. 51). The fifth sensor 45 is disposed in the fourth conveyance passage K6 (on the left or downstream side of the third conveyance roller pair 6 in FIG. 51) leading from the sheet separation device 1 to the lamination device 51. Further, the seventh sensor 47 is disposed in the first branched conveyance passage K4, and the eighth sensor 48 is disposed in the second branched conveyance passage K5.

The first sensor 41 and the second sensor 42 also function as detectors to detect the size difference between the two-ply sheet PJ and the insertion sheet PM, which will be described in detail later.

Further, the sixth sensor 46 functions as an abnormality detector to detect an abnormal state in the separation process, which will be described in detail later.

With reference to FIGS. 52A, 52B, 53A, 53B, 55B to 55D, and 56A, etc., the winding roller 20 is described. The winding roller 20 includes a gripper 32 that grips a gripped portion B of the two-ply sheet PJ at a winding start position W (see FIG. 55B). The gripped portion B is an end on the non-bonded side (second end) of the two-ply sheet PJ that is opposite the bonded portion A. The winding roller 20 rotates in a predetermined direction (counterclockwise in FIG. 55B) to wind the two-ply sheet PJ around the winding roller 20 with the gripped portion B of the two-ply sheet PJ gripped by the gripper 32. The winding roller 20 can rotate about a rotation shaft 20a (see FIGS. 52A to 53B) in forward and reverse directions, driven by a drive motor controlled by the control unit 56.

Specifically, the two-ply sheet PJ is conveyed by the second conveyance roller pair 5, from the first feed tray 11, through the first conveyance passage K1 in the forward direction to the third conveyance passage K3. The two-ply sheet is conveyed, once passing by the winding start position W of the winding roller 20 to the third conveyance roller pair 6 (at which the trailing end of the two-ply sheet PJ has passed the fourth sensor 44 but not yet passed the third conveyance roller pair 6, that is, the trailing end of the two-ply sheet PJ is upstream from the third conveyance roller pair 6). Thereafter, the third conveyance roller pair 6 rotates in reverse to convey the two-ply sheet PJ in the reverse direction to the winding roller 20 (in particular, the winding start position W), and the gripper 32 grips the two-ply sheet PJ. Then, the two-ply sheet PJ is further conveyed in the gripped state, and is wound by the winding roller 20 that rotates in the counterclockwise direction in FIG. 51.

With reference to FIG. 55C', when the two-ply sheet PJ is wound around the winding roller 20, a length of a sheet wound around the winding roller 20 is proportional to a distance from the center of the winding roller 20 to the sheet. Therefore, since the sheet P1 (first sheet) is nearer to the center of the winding roller 20 than the sheet P2 (second sheet), a length of the sheet P1 wound around the winding roller 20 is shorter than a length of the sheet P2 wound around the winding roller 20. As a result, misalignment occurs in a portion of the two-ply sheet PJ in which the sheet P1 is in tight contact with the sheet P2 (in other words, the portion in which the sheet P1 sticks to the sheet P2) other than the bonded portion A and the gripped portion B. As illustrated in FIGS. 55D and 56A, the misalignment causes the upper first sheet P1 to slack and bend upward and creates a gap C between the two sheets P1 and P2 in the vicinity of the bonded portion A at the first end of the two-ply sheet PJ. As described above, the two sheets P1 and P2 are separated from each other from the state in tight contact with each other without any gap.

In the present embodiment, in order to secure a sufficient size of the gap C as described above, that is, to increase the difference between winding lengths of the sheets P1 and P2 wound around the winding roller 20, the two-ply sheet PJ is wound around at least the full circumference of the winding roller 20 (one full round or more).

In the present embodiment, winding the two-ply sheet PJ around the winding roller 20 can separate the two-ply sheet PJ without increasing the size and cost of the laminator 200A.

As illustrated in FIG. 55B', the gripper 32 in the present embodiment grips the gripped portion B of the two-ply sheet PJ without contacting the end face of the non-bonded portion (the gripped portion B side).

Specifically, the gripper 32 sandwiches and grips the gripped portion B of the two-ply sheet PJ between the gripper 32 and a receiving portion 20b of the winding roller 20 so as to keep the end face of the non-boded side of the two-ply sheet PJ free of contact with any member of the laminator 200A. The receiving portion 20b is a portion of an outer circumferential portion of the winding roller 20 and faces the gripper 32.

More specifically, the two-ply sheet PJ is gripped and sandwiched between the gripper 32 (on the outer side) and the receiving portion 20b (on the inner side) such that the end face of the non-bonded portion does not contact a given member, such as the gripper 32 itself, but is free from contact with a given member.

Compared with a structure in which the end face of the non-bonded side of the two-ply sheet contacts a given member, the above-described structure can reduce a disadvantage that the two-ply sheet PJ (particularly, the tip of the non-bonded end) is damaged. It is difficult to laminate the two-ply sheet PJ including a damaged front end face, and the configuration of the present disclosure is useful.

In the present embodiment, the bonded portion A of the two-ply sheet PJ wound around the winding roller 20 is the first end of the two-ply sheet PJ. The first end is opposite to the second end as the gripped portion B.

In the present embodiment, at least one of the gripper 32 and the receiving portion 20b is made of elastic material such as rubber.

Compared with a structure including a rigid gripper 32 and a rigid receiving portion 20b made of a metal material or a resin material, the above-described structure can increase a gripping force to grip the two-ply sheet PJ and prevent damages to the surface of the two-ply sheet PJ. In particular, the structure including the gripper 32 and the receiving portion 20b made of the elastic material easily exhibits the above-described effect.

As illustrated in FIGS. 52A to 53B, the drive device 30 moves the gripper 32 between a gripping position (illustrated in FIGS. 52A and 53A) at which the two-ply sheet PJ can be gripped and a releasing position (the position illustrated in FIGS. 52B and 53B) retracted from the gripping position.

Specifically, the drive device 30 includes an arm 31, a compression spring 33 as a biasing member, a cam 34, and a motor that rotates the cam 34 in forward or in reverse.

The arm 31 holds the gripper 32, and the arm 31 and the gripper 32 are held together by the winding roller 20 to be rotatable about a support shaft 31a. In the present embodiment, the gripper 32 is at the tip of the arm 31, and the gripper 32 and the arm 31 are integral (held as one part). Alternatively, the gripper 32 and the arm 31 may be separate members, and the gripper 32 may be disposed on the arm 31, that is, may be held by the arm 31. In any case, the arm 31 holding the gripper 32 rotates around the rotation shaft 20a together with the winding roller 20.

Figure 52A:
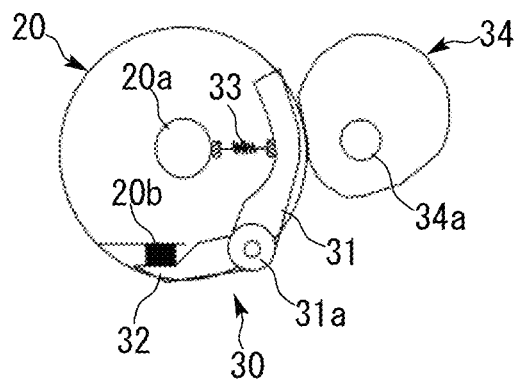
FIG. 52A is a side view illustrating a gripper that has moved to a gripping position in the laminator illustrated in FIG. 51.
Figure 52B:
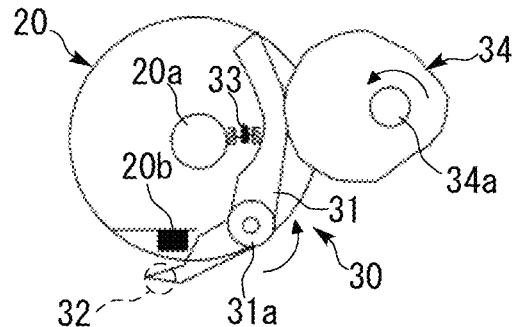
FIG. 52B is a side view illustrating the gripper that has moved to a releasing position in the laminator illustrated in FIG. 51.

The compression spring 33 functions as a biasing member that biases the arm 31 so that the gripper 32 moves from the releasing position illustrated in FIG. 52B to the gripping position illustrated in FIG. 52A. Specifically, one end of the compression spring 33 is connected to a fixed part near the rotation shaft 20a, and the other end the compression spring 33 is connected to one end of the arm 31 that is an end opposite to the other end of the arm 31 connected to the gripper 32 with respect to the support shaft 31a.

The cam 34 pushes the arm 31 against the biasing force of the compression spring 33 as the biasing member so that the gripper 32 moves from the gripping position illustrated in FIG. 52A to the releasing position illustrated in FIG. 52B. A motor controlled by the control unit 56 drives the cam 34 to rotate in forward or in reverse at a desired rotation angle. The cam 34 is held by the apparatus housing so as to be rotatable about a cam shaft 34a independently of the winding roller 20.

In the drive device 30 configured as described above, as illustrated in FIGS. 52A and 53A, in the state where the arm 31 is contactless with the cam 34, the arm 31 is biased by the compression spring 33 and presses the gripper 32 against the receiving portion 20b. This state is referred to as a closed state. In the closed state, the gripper 132 and the receiving portion 120b can grip the two-ply sheet PJ.

Figure 53A:
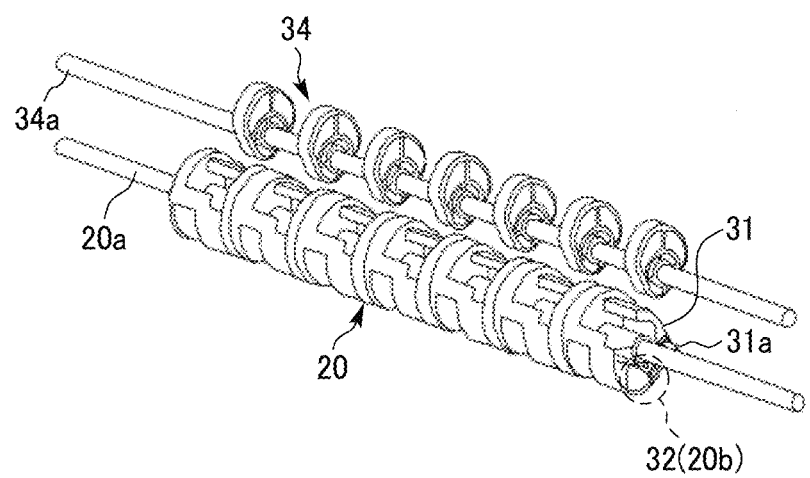
FIG. 53A is a perspective view illustrating the gripper that has moved to the gripping position in the laminator illustrated in FIG. 51.
Figure 53B:
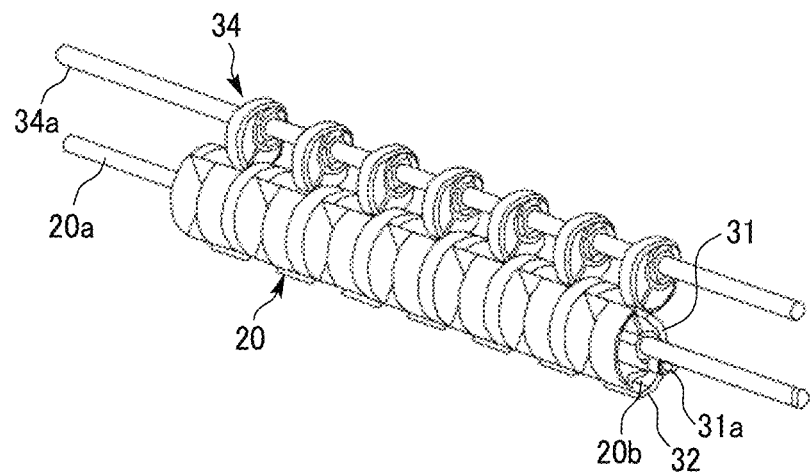
FIG. 53B is a perspective view illustrating the gripper that has moved to the releasing position in the laminator illustrated in FIG. 51.

By contrast, as illustrated in FIGS. 52B and 53B, in the state where the arm 31 is pressed by the cam 34, the arm 31 rotates counterclockwise in FIG. 52B about the support shaft 31a against the urging force of the compression spring 33 and separates the gripper 32 from the receiving portion 20b. This state is referred to as an open state. In the open state, the two-ply sheet PJ is not gripped, which is referred to as a grip release state.

In the present embodiment, as illustrated in FIGS. 53A and 53B, the winding roller 20 includes a plurality of roller portions (i.e. seven roller portions in the present embodiment) separated in the axial direction of the winding roller 20. Corresponding to the roller portions, the cam 34 includes a plurality of portions separated in the axial direction.

Setting portions separated in the axial direction to grip the two-ply sheet PJ as described above, that is, not setting entire area in the axial direction to grip the two-ply sheet PJ can share load necessary to grip the two-ply sheet PJ. The above-described configuration is useful when a necessary gripping force becomes large.

Figure 54A:
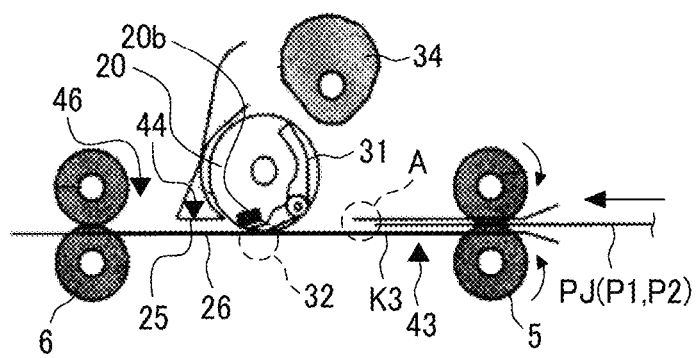
FIGS. 54A to 54D are schematic views illustrating operations of the laminator illustrated in FIG. 51.
Figure 54B:
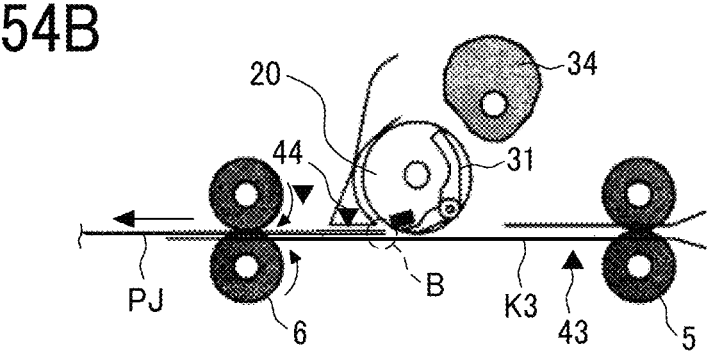
Figure 54C:
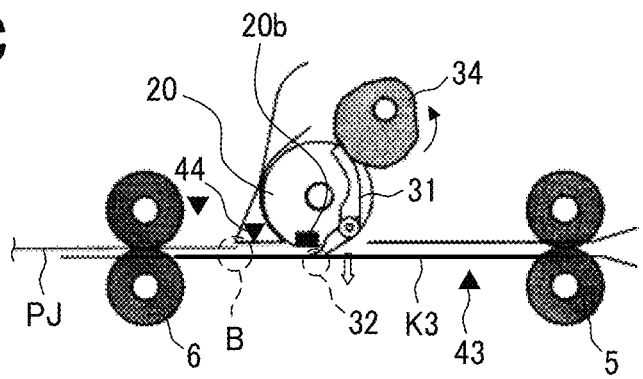
Figure 54D:
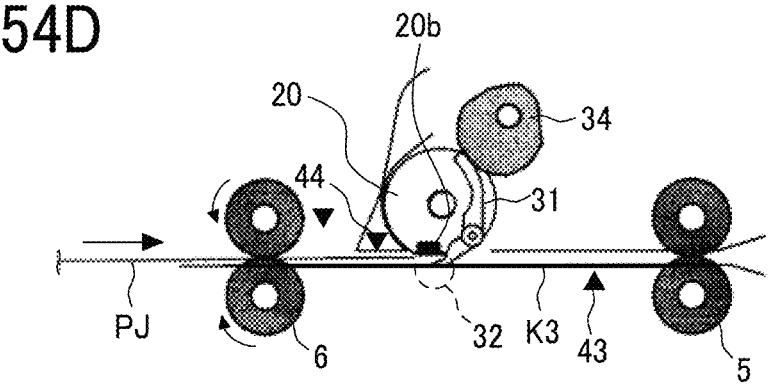

With reference to FIGS. 51, 54D, and 55A, the laminator 200A according to the present embodiment includes the fourth sensor 44 (sheet detection sensor) to detect two-ply sheet PJ conveyed between the winding roller 20 and the third conveyance roller pair 6. The fourth sensor 44 detects the front end of the two-ply sheet PJ conveyed to the winding roller 20 by the third conveyance roller pair 6. Based on the detection result generated by the fourth sensor 44, the control unit 56 controls the drive device 30.

Specifically, the fourth sensor 44 is disposed in the conveyance passage between the winding roller 20 and the third conveyance roller pair 6. In FIGS. 54D and 55A, the third conveyance roller pair 6 conveys the two-ply sheet PJ in reverse toward the position of the winding roller 20 with the gripped portion B at the front end in the reverse direction conveyance. At this time, the fourth sensor 44 detects the front end (of the gripped portion B) of the two-ply sheet PJ conveyed in reverse. In response to the detection by the fourth sensor 44 of the end of the gripped portion B, the control unit 56 adjusts a timing to stop the two-ply sheet PJ at the gripping position and a timing at which the gripper 32 grips the gripped portion B. Specifically, after a predetermined time has elapsed after the end of the two-ply sheet PJ is detected by the fourth sensor 44, the control unit 56 stops the reverse conveyance of the two-ply sheet PJ by the third conveyance roller pair 6, and rotates the cam 34 to rotate the arm 31 (the drive device 30), so as to move the gripper 32 from the releasing position illustrated in FIG. 52B to the gripping position illustrated in FIG. 52A.

With such control operation, the gripper 32 can accurately sandwich the two-ply sheet PJ with the receiving portion 20b, while keeping the end face of the two-ply sheet PJ free from contact with any member.

As described above, the third conveyance roller pair 6 conveys the two-ply sheet PJ, with the second end (the gripped portion B side) at the front end, toward the winding roller 20 (the winding start position W in particular) along the third conveyance passage K3 between the third conveyance roller pair 6 and the winding roller 20.

Further, with reference to FIGS. 56A to 56C, FIGS. 60, 61A to 61E, and FIG. 64, the separation claws 16 as separators are described. The separation claws 16 are claw-shaped members that are inserted from standby positions illustrated in FIG. 60A into the gap C between the two sheets P1 and P2 at a predetermined position of the two-ply sheet PJ. The predetermined position is experientially determined at a position at which the separation claws 16 can enter the gap C.

Specifically, the separation claws 16 are inserted into the gap C between the two sheets P1 and P2 from the standby positions in the width direction. The gap C is formed in a portion of the two-ply sheet PJ between the winding roller 20 and the third conveyance roller pair 6 in a state where the two-ply sheet PJ is wound around the winding roller 20 from the second end (the gripped portion B side) and the first end (the bonded portion A) is nipped in the third conveyance roller pair 6.

Figure 61A:
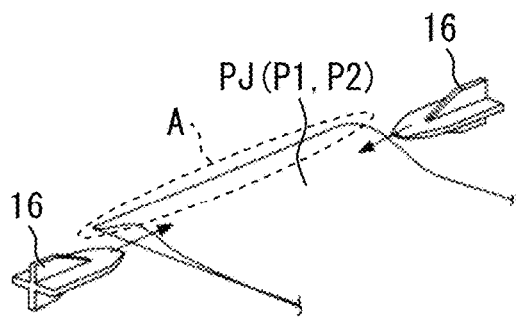

More specifically, in the present embodiment, the separation claws 16 (pair of separators) are disposed at both sides of the third conveyance passage K3 in the width direction that is perpendicular to a plane on which FIGS. 56A to 56C are drawn and the lateral direction in FIGS. 60 and 64. Further, as illustrated in FIG. 61A to 60E, the length of the separation claw 16 gradually increases in the vertical direction (the thickness direction of the two-ply sheet PJ) from the tip to the rear end in the direction of insertion of the separation claw 16 in the width direction of the sheet. The separation claws 16 is moved in the width direction of the two-ply sheet PJ by a drive device 76 (see FIG. 64) controlled by the control unit 56.

Figure 61B:
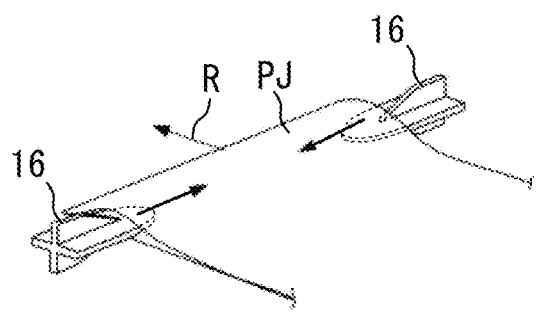

The separation claws 16 configured as described above are disposed at standby positions (see FIG. 61A) not interfere with the conveyance of the sheet such as the two-ply sheet PJ in the third conveyance passage K3. The standby positions are outside of the sheet in the width direction of the sheet. Subsequently, as illustrated in FIGS. 60 and 61B, for separating the two-ply sheet PJ (the sheets P1 and p2), the separation claws 16 enter the gap C in the two-ply sheet PJ, to secure the size of the gap C.

As illustrated in FIG. 64, the drive device 76 to move the pair of separation claws 16 in the width direction includes a motor 77, a gear pulley 78, a pulley 79, and a timing belt 80. The gear pulley 78 has a step-like ring shape including a gear that meshes with a motor gear disposed on a motor shaft of the motor 77 and a pulley that stretches and supports the timing belt 80 together with the pulley 79. Each separation claw 16 includes a fixed portion 16a fixed to the surface of the timing belt 80. The fixed portion 16a of the pair of separation claws 16 is fixed to one side (the upper side in FIG. 64) of the timing belt 80, and the fixed portion 16a of the other separation claw 16 is fixed to the other side (the lower side in FIG. 64) of the timing belt 80.

In the drive device 76 as configured described above, as the motor shaft of the motor 77 rotates in the direction indicated by arrow in FIG. 64 (i.e. clockwise in FIG. 64), the gear pulley 78 rotates counterclockwise, and the timing belt 80 rotates counterclockwise. Such rotation moves the pair of separation claws 16 from the outer side in the width direction toward the center in the width direction of the sheet (that is, the separation claws 16 approaches each other). By contrast, when the motor shaft of the motor 77 rotates in reverse to the direction indicated by the arrow in FIG. 64, the pair of separation claws 16 moves from the center side toward the outer side in the width direction of the sheet (that is, the separation claws 16 move away from each other).

After the separation claws 16 inserted into the gap C in the two-ply sheet PJ move relatively to the two-ply sheet PJ from the first end side of the two-ply sheet PJ (the bonded portion A side) to the second end side of the two-ply sheet PJ (the gripped portion B side), the separation claws 16 move in the width direction between the two sheets P1 and P2 at the second end of the two-ply sheet PJ.

Figure 61C:
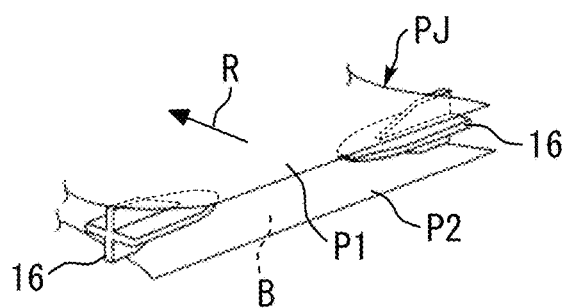
Figure 61D:
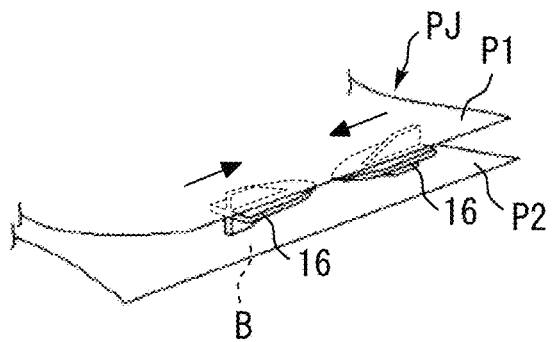

Specifically, the control unit 56 controls the drive device 76 (see FIG. 64) to move the pair of separation claws 16 as follows. As illustrated in FIGS. 61B and 61C, the separation claws 16, being in the state inserted in the width direction ends of the gap C of the two-ply sheet PJ, move relatively to the two-ply sheet PJ toward the second end side of the two-ply sheet PJ (the gripped portion B side) until the second end (the gripped portion B side) passes by the fixed portion 16a. Subsequently, as illustrated in FIG. 61D, the separation claws 16, inserted between the sheets P1 and P2, move from both ends toward the center in the sheet width direction, at the second end of the two-ply sheet PJ in the sheet conveyance direction. To enable the above-described operations of the pair of separation claws 16, the drive device 76 is configured to move the separation claws 16 from the standby positions to approach each other.

Such a mechanism that winds the two-ply sheet PJ around the winding roller 20 and inserts the separation claws 16 into the two-ply sheet PJ so as to separate the two-ply sheet PJ can be compact, as compared with a mechanism using a large-scale device such as a vacuum device to separate the two-ply sheet PJ. That is, without increasing the size of the laminator 200A, the above-described mechanism can reliably separate the two sheets P1 and P2 (plies) of the two-ply sheet PJ.

In particular, since the separation claws 16 in the present embodiment move over the substantially entire region of the two-ply sheet PJ on the second end side (the trailing end) of the two-ply sheet PJ, the separation claws 16 can fully separate (in other words, peel) the second end (opposite the bonded portion A) of the two sheets P1 and P2 constituting the two-ply sheet PJ. The above-described configuration can prevent a disadvantage that the second end of the two-ply sheet PJ opposite the bonded portion A is not fully separated and the insertion sheet PM (see FIG. 61E) cannot be inserted into the second end of the two-ply sheet PJ. Additionally, the above-described configuration facilitates a capability of the separation claws 16 to guide the two sheets P1 and P2 to the different passages, the two branched conveyance passages K4 and K5, as described below.

In the present embodiment, the separation claws 16 also function as a divider that guides the two sheets P1 and P2 separated by the separation claws 16 to the two branched conveyance passages K4 and K5 that branch off in different directions, respectively.

Specifically, as illustrated in FIG. 57C and the like, the two branched conveyance passages K4 and K5 branch off, at a position between the separation claws 16 and the winding roller 20, in different directions with the third conveyance passage K3 sandwiched between the branched conveyance passages K4 and K5. Specifically, the first branched conveyance passage K4 branches upward from the third conveyance passage K3, and the second branched conveyance passage K5 branches downward from the third conveyance passage K3.

As illustrated in FIGS. 57A to 57C, the third conveyance roller pair 6 conveys the two-ply sheet PJ to the left side in FIG. 7A after the separation claws 16 are inserted into the gap C so that the other end of the two-ply sheet PJ is released from the winding around the winding roller 20 (see FIG. 61A to FIG. 61C). Subsequently, as illustrated in FIG. 61D, the separation claws 16 are moved to a center portion of the two-ply sheet PJ and kept in the center portion, after which the third conveyance roller pair 6 again conveys the two-ply sheet PJ to the right side in FIGS. 57A to 57C. Then, the separation claws 16 guide the two sheets P1 and P2 separated by the separation claws 16 to the branched conveyance passages K4 and K5, respectively. As a result, the first sheet P1 is guided to the first branched conveyance passage K4, and the second sheet P2 is guided to the second branched conveyance passage K5. Subsequently, referring to FIGS. 58A to 58C and 61E, the separation claws 16 are moved to the standby positions, and the second conveyance roller pair 5 conveys the insertion sheet PM to one end of the third conveyance passage K3, to insert the insertion sheet PM between the separated sheets P1 and P2.

As described above, the separation claws 16 in the present embodiment functions as a separator that separates (in other words, peels) the non-bonded portion of the two sheets P1 and P2 of the two-ply sheet PJ, and also functions as a divider that guides the separated two sheets P1 and P2 to the two branched conveyance passages K4 and K5, respectively. Accordingly, the above-described configuration can reduce the size and cost of the laminator 200A compared with a configuration including both the separator and the divider. That is, the above-described configuration can reliably separate the two sheets P1 and P2 of the two-ply sheet PJ.

The seventh sensor 47 optically detects a state in which the separated first sheet P1 is normally conveyed to the first branched conveyance passage K4. Further, the eighth sensor 48 optically detects a state in which the separated second sheet P2 is normally conveyed to the second branched conveyance passage K5.

Although the separation claw 16 in the present embodiment functions both the separator and the divider, alternatively, the laminator can include a member that functions as a divider different from the separation claws 16 functioning as the separator.

With reference to FIGS. 56A to 56C, the first guide 25 is disposed between the separation claws 16 and the winding roller 20 in the third conveyance passage K3. The first guide 25 restricts an amount of slack (in other words, a deflection amount) of the first sheet P1 that is on the inner side of the sheet P2 when the two-ply sheet PJ is wound around the winding roller 20.

Specifically, FIG. 56A includes an imaginary plane 51 passing through the winding start position W of the winding roller 20 and the nip of the third conveyance roller pair 6 in the third conveyance passage K3. The first guide 25 is a conveyance guide disposed on the side of the winding roller 20 with respect to the imaginary plane 51, that is, upper side of the imaginary plane 51 in FIG. 56A. The first guide 25 is shaped like a triangular prism having a face along the circumference of the winding roller 20 and at a distance from the winding roller 20, and the plane covers a portion of the outer circumference of the winding roller 20. The first guide 25 functions as a conveyance guide to the third conveyance passage K3 and to the first branched conveyance passage K4. That is, the first guide 25 guides the sheet conveyed along the third conveyance passage K3, the sheet conveyed along the first branched conveyance passage K4, and the sheet wound around the winding roller 20.

In the third conveyance passage K3 in particular, the first guide 25 restricts the upward slack of the two-ply sheet PJ (in particular, upward slack of the first sheet P1) between the winding roller 20 and the third conveyance roller pair 6. Therefore, the gap C in the two-ply sheet PJ (in particular, upward slack of the first sheet P1) is locally formed between the first guide 25 and the third conveyance roller pair 6. Accordingly, the above-described configuration can increase the size of the gap C without increasing the winding amount of the two-ply sheet PJ around the winding roller 20, and the separation claws 16 can smoothly enter the gap C to separate the two-ply sheet PJ.

With reference to FIGS. 56A to 56C, further, the second guide 26 is disposed between the separation claws 16 and the winding roller 20 in the third conveyance passage K3. The second guide 26 guides the sheet P2 that is on the outer side of the sheet P1 when the two-ply sheet PJ is wound around the winding roller 20.

Specifically, the second guide 26 is a conveyance guide disposed on the side of the imaginary plane 51 illustrated in FIG. 56A (lower side of the imaginary plane 51) opposite to the side of the winding roller 20, in the third conveyance passage. The second guide 26 is disposed to face the lower surface of the sheet from a portion upstream from the second conveyance roller pair 5 to a portion downstream from the third conveyance roller pair 6 in the forward direction. That is, the second guide 26 guides the sheet conveyed along the third conveyance passage K3.

In particular, in the third conveyance passage K3, between the winding roller 20 and the third conveyance roller pair 6, a clearance between the first guide 25 and the second guide 26 is set to enable conveyance of a sheet of maximum thickness, to restrict the size of the space between the sheets P1 and P2 of the two-ply sheet PJ between the first guide 25 and the second guide 26. Therefore, the gap C (upward slack of the first sheet P1 in particular) in the two-ply sheet PJ is locally formed. Accordingly, the separation claws 16 can smoothly enter the gap C to separate the two-ply sheet PJ.

With reference to FIGS. 56A to 56C, the sixth sensor 46 as the abnormality detector is described. The sixth sensor 46 detects, as an abnormal state, that the gap C having a size (distance between the sheets P1 and P29 larger than a predetermined size is not formed at a position between the third conveyance roller pair 6 and the winding roller 20, before the separation claws 16 move from the standby positions (illustrated in FIGS. 60 and 61A to the separation positions illustrated in FIG. 61D). The predetermined size of the gap C is such a size that the separation claws 16 can enter the gap C and is determined based on experiments. That is, the sixth sensor 46 as the abnormality detector detects the abnormal state in which the gap C between the sheets P1 and P2 at a predetermined position is not larger than the predetermined size before the separation claws 16 are inserted into the gap C.

In other words, at a timing at which the gap C is formed between the two sheets P1 and P2 as illustrated in FIGS. 55D and 56A, the sixth sensor 46 as the abnormality detector detects, as the abnormal state, that the gap is not formed at all or the gap is not large enough.

In the present embodiment, the control unit 56 reports the occurrence of the abnormal state in response to the detection of the abnormal state by the sixth sensor 46 that is the abnormality detector. Specifically, as illustrated in FIG. 51, the laminator 200A includes a control panel 49 as an operation display device on the exterior thereof, to display various kinds of information on the laminator 200A and input various kinds of commands. In response to a determination of the occurrence of the abnormal state based on the detection result by the sixth sensor 46, that is, when the two-ply sheet PJ does not have the sufficiently large gap C, the control unit 56 controls the control panel 49 to indicate that the abnormal state is detected. For example, the indication of the abnormal state is a message such as "Insertion of insertion sheet is cancelled because of the occurrence of abnormality. Please check the direction of the two-ply sheet in the first feed tray. If the setting direction is correct and similar abnormalities are repeated, please contact a service person."

The above-described sixth sensor 46 as the abnormality detector may be a lever type sensor that comes into contact with the upper first sheet P1 of the two-ply sheet PJ when the distance of the gap C is larger than the predetermined distance, but not limited thereto.

The laminator 200A according to the present embodiment includes the first sensor 41 and the second sensor 42 to detect the size difference between the two-ply sheet PJ and the insertion sheet PM at least before execution of the laminating process.

The first sensor 41 detects the front end and the rear end of the two-ply sheet PJ passing by the position of the first sensor 41. Thus, the time (passing time) required for the two-ply sheet PJ to pass by the first sensor 41 is detected. Then, the control unit 56 obtains a size L1 of the two-ply sheet PJ in the conveyance direction from the passing time and the conveyance speed (predetermined speed) of the two-ply sheet PJ. Similarly, the second sensor 42 detects the front end and the rear end of the insertion sheet PM passing by the position of the second sensor 42. Thus, the time (passing time) required for the insertion sheet PM to pass by the second sensor 42 is detected. Then, the control unit 56 obtains a size L2 of the insertion sheet PM in the conveyance direction from the passing time and the conveyance speed (may be predetermined) of the insertion sheet PM. Then, the control unit 56 obtains the size difference (L1−L2) between the size L1 of the two-ply sheet PJ and the size L2 of the insertion sheet PM.

With this configuration, the control unit 56 according to the present embodiment cancels the execution of the laminating process based on a determination of an abnormality based on the detection results of the first and second sensors 41 and 42 under a predetermined condition.

Specifically, the control unit 56 determines, as an abnormality, sheet size mismatch based on a detection, by the first and second sensors 41 and 42 (detector), that the size L2 of the insertion sheet PM is larger than the size L1 of the two-ply sheet PJ (L1<L2).

Then, determining that an abnormality has occurred based on the detection results of the first and second sensors 41 and 42 (detector), the control unit 56 controls the switching claw 17 and the like so as to convey the two-ply sheet PJ and the insertion sheet PM not to pass through the lamination device 51 but to be ejected onto the second output tray 55 (an ejection portion) as illustrated in FIG. 59B.

Specifically, when the insertion sheet PM is smaller than the two-ply sheet PJ (L1≥L2), the control unit 56 determines that the size relation is normal, controls the switching claw 17 to guide the two-ply sheet PJ sandwiching the insertion sheet PM to the fourth conveyance passage K6 as illustrated in FIG. 59A, and controls the lamination device 51 to execute the laminating process.

By contrast, when the insertion sheet PM is larger than the two-ply sheet PJ (L1<L2), the insertion sheet PM inserted into the two-ply sheet PJ protrudes from the two-ply sheet PJ, and becomes a defective product. When such a defective product is laminated, the insertion sheet PM is not removable from the two-ply sheet PJ and cannot to be reused. There is no choice but to discard the defective product, and the two-ply sheet PJ and the insertion sheet PM are wasted. Therefore, as illustrated in FIG. 59B, the switching claw 17 guides the two-ply sheet PJ (sandwiching the insertion sheet PM) after the inserting process not to the lamination device 51 but to the second output tray 55.

This configuration can prevent an inconvenience that the laminating process is executed in a state in which the difference between the two-ply sheet size and the insertion sheet size is improper.

Note that the error of improper size difference between the two-ply sheet PJ and the insertion sheet PM occurs, for example, when the operator or user sets an irregular size two-ply sheet PJ and an irregular size insertion sheet PM different from predetermined sizes in the first and second feed trays 11 and 12, respectively.

Normally, the operator sets the size of the two-ply sheet PJ (lamination film) and the size of the insertion sheet PM, for example, on the display screen as illustrated in FIG. 65 of the control panel 49. At this time, when the size of the insertion sheet PM is larger than that of the two-ply sheet PJ, the laminator 200A displays a message that the laminating process is not feasible. However, when the operator mixes a sheet (two-ply sheet PJ or insertion sheet PM) of size different from set size on the first feed tray 11 or the second feed tray 12 and presses the execution button of the laminating process, the above-mentioned error of improper size difference may occur.

Then, in the present embodiment, in the case of an improper size difference, the laminator 200A does not perform the laminating process on such a combination of the two-ply sheet PJ and the insertion sheet PM but ejects the two-ply sheet PJ and the insertion sheet PM to the second output tray 55. Therefore, waste of the sheets can be avoided.

In the present embodiment, in response to a determination of sheet size mismatch based on the detection results of the first and second sensors 41 and 42 (detector), the control unit 56 issues such a notification.

Specifically, when the first and second sensors 41 and 42 detect an improper size difference between the two-ply sheet PJ and the insertion sheet PM, the control unit 56 indicates that on the control panel 49 (see FIG. 51). For example, the control panel 49 displays a following message.

"The size different between the two-ply sheet and the insertion sheet is abnormal. Laminating process is cancelled, and the sheet is ejected to the second output tray. Please check the size of the two-ply sheet and the size of the insertion sheet in the feed trays, and take out the two-ply sheet and the insertion sheet from the second output tray. These sheets are reusable."

Such a notification can improve the workability of the operator.

With reference to FIG. 54A to 59B, a description is given of operations of the laminator 200A. The operation described below are controlled by the control unit 56.

Figure 61E:
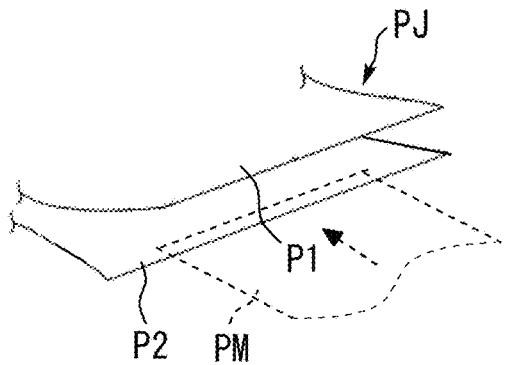

FIGS. 60 to 61E are referred in the description of operations of the separation claws 16, and the flowcharts of FIGS. 62 and 63 are referred to in the description of the control of the operations of the laminator 200A.

After the first feed roller 2 and the first conveyance roller pair 4 start feeding the two-ply sheet PJ from the first feed tray 11 in S501 in FIG. 62, as illustrated in FIG. 54A, the second conveyance roller pair 5 conveys the two-ply sheet PJ with the bonded portion A at the front end in the forward direction (from the right side to the left side in FIG. 54A) in the third conveyance passage K3.

At this time, the control unit 56 controls the drive device 30 to position the gripper 32 at the gripping position. That is, the cam 34 moves to a position at which the cam 34 does not push the arm 31. When the gripper 32 is positioned at the gripping position as described above, the gripper 32 does not interfere the sheet conveyance in the third conveyance passage K3. At that time, the separation claws 16 is at the standby positions (illustrated in FIG. 61A) at which the separation claws 16 do not interfere with the conveyance of the sheet in the third conveyance passage K3. At this time, the first sensor 41 detects the size of the two-ply sheet PJ in S501.

Subsequently, as illustrated in FIG. 54B, triggered by detection, by the third sensor 43, of the bonded portion A (the first end, which is at the front end in the forward direction) of the two-ply sheet PJ (Yes in S502), the control unit 56 controls the third conveyance roller pair 6 to convey the two-ply sheet PJ in the forward direction by a predetermined amount X1 until the gripped portion B (the second end, at the back in the forward direction) of the two-ply sheet PJ passes through the position of the winding roller 20 in S503 in FIG. 62.

In that state, the control unit 56 temporarily stops the conveyance of the two-ply sheet PJ by the third conveyance roller pair 6 as illustrated in FIG. 54C, and moves the gripper 32 from the gripping position to the releasing position in S504 of FIG. 62. That is, the cam 34 moves to a position to push the arm 31. In this state, the gripped portion B of the two-ply sheet PJ can be received between the gripper 32 and the receiving portion 20b.

Then, as illustrated in FIG. 54D, the third conveyance roller pair 6 rotates in reverse to start reverse conveyance of the two-ply sheet PJ in S505 of FIG. 62. At this time, the fourth sensor 44 detects the gripped portion B (the second end, at the front end in the reverse direction) of the two-ply sheet PJ.

Subsequently, as illustrated in FIG. 55A, triggered by detection, by the fourth sensor 44, of the gripped portion B of the two-ply sheet PJ (S506 in FIG. 62), the third conveyance roller pair 6 conveys the two-ply sheet PJ by a predetermined amount X2 until the gripped portion B of the two-ply sheet PJ reaches the winding start position W of the winding roller 20, after which the third conveyance roller pair 6 stops in S507.

In that state, as illustrated in FIG. 55B, the gripper 32 is moved from the releasing position to the gripping position in S508 of FIG. 62. That is, the cam 34 moves to a position not to push the arm 31. This state is illustrated in FIG. 55B'. That is, the end face of the second end of the two-ply sheet PJ is free from contact with any member, and the gripped portion B is gripped between the gripper 32 and the receiving portion 20b.

Next, as illustrated in FIG. 55C, the winding roller 20 rotates in reverse (counterclockwise in the drawing) while the gripper 32 grips the two-ply sheet PJ, and the third conveyance roller pair 6 again rotates in reverse together with the winding roller 20. As the winding roller 20 rotates, the gap C is formed between the two sheets P1 and P2 of the two-ply sheet PJ between the winding roller 20 and the third conveyance roller pair 6 as illustrated in FIG. 55D. While the gap C is formed, the first guide 25 and the second guide 26 limit the bending of the two-ply sheet PJ in the vicinity of the winding roller 20. Accordingly, the gap C of the two-ply sheet PJ is locally formed near the third conveyance roller pair 6.

As described above, the control unit 56 uses the timing at which the fourth sensor 44 disposed downstream from the third conveyance roller pair 6 in the reverse direction detects the gripped portion B of the two-ply sheet PJ conveyed in the reverse direction as the trigger to determine the timing to grip the gripped portion B with the gripper 32 and the receiving portion 20b grip. Accordingly, the gripped portion B of the two-ply sheet PJ can be accurately conveyed to a desired gripping position regardless of variations in sheet lengths with respect to the sheet conveyance amount X2. Such variations are errors in dimensions of same size sheets.

Further, this configuration can shorten the sheet conveyance amount X2 conveyed from the detection by the fourth sensor 44 of the front end of the two-ply sheet PJ conveyed in the reverse direction regardless of the sheet length. Therefore, the above-described configuration can reduce variations in the conveyance amount X2 and enables an accurate conveyance of the gripped portion B of the two-ply sheet PJ to the desired gripping position.

Accordingly, the fourth sensor 44 is preferably disposed near the winding roller 20.

With reference to FIG. 55C', the description has given above of the mechanism how the gap C is created in the two-ply sheet PJ between the winding roller 20 and the third conveyance roller pair 6 in accordance with winding of the two-ply sheet PJ around the winding roller 20.

The mechanism is further described below.

Since the gripper 32 grips the gripped portion B of the two-ply sheet PJ being wound around the winding roller 20, displacement between the sheets P1 and P2 is restricted. However, the sheets P1 and P2 slip each other since there is the difference in winding circumferential length around the winding roller 20 between the two sheets P1 and P2. Therefore, the conveyance amount of the sheet P1 on the inner side is smaller than the conveyance amount of the sheet P2 on the outer side. As a result, the sheet P1 on the inner side slacks between the nip of the third conveyance roller pair 6 and the winding roller 20. After the two-ply sheet PJ is wound around the winding roller 20 over a full circumference or more, the winding circumferential length differs between the inner circumference and the outer circumference by the thickness of the sheet, and the sheet slacks similarly.

Specifically, a distance from the rotation shaft 20a (i.e. the axial center) of the winding roller 20 to the outer sheet P2 is expressed as R+ΔR where R represents a distance from the rotation shaft 20a of the winding roller 20 to the inner sheet P1, and ΔR represents the thickness of the inner sheet P1. The radius of the inner sheet P1 wound around the winding roller 20 differs from the radius of the outer sheet P2 wound around the inner sheet P1 by the thickness ΔR of the inner sheet P1. Accordingly, the circumferential length of the inner sheet P1 differs from that of the outer sheet P1 by the amount expressed as 2×ΔR×π when the two-ply sheet PJ is wound the full circumference (one round) of the winding roller 20. Therefore, winding the two-ply sheet PJ around the winding roller 20 by M rounds generates the circumferential length difference expressed as 2×ΔR×π×M, which is the slack of the inner sheet P1.

Finally, the slack is accumulated between the third conveyance roller pair 6 and the winding roller 20, and the gap C corresponding to 2×ΔR×π×M is formed between the two sheets P1 and P2.

Subsequently, as illustrated in FIG. 56A, after the winding roller 20 starts winding the two-ply sheet PJ, at a timing when the conveyance amount by the third conveyance roller pair 6 reaches the predetermined amount X3, the third conveyance roller pair 6 stops conveying the two-ply sheet PJ and the winding roller 20 stops winding the two-ply sheet PJ in S509 of FIG. 62. In this state, the two-ply sheet PJ is wound around the winding roller 20 one or more rounds, and the gap C in the two-ply sheet PJ (a distance between the sheet P1 and the sheet P2) is sufficient when the two-ply sheet PJ is normally separated.

In S529 of FIG. 62, the control unit 56 determines whether the gap C formed in the two-ply sheet PJ has a distance is equal to or larger than a predetermined distance F based on the detection result generated by the sixth sensor 46.

When the control unit 56 determines that the gap C has a sufficiently distance equal to or larger than the predetermined distance F, the control unit 56 determines that subsequent separation operations of the separation claws 16 do not cause a problem and inserts the separation claws 16 into the gap C in the two-ply sheet PJ as illustrated in FIG. 56B in S510 of FIG. 62. That is, as illustrated in FIGS. 60 and 61A, the separation claws 16 are moved from the standby positions to the separation positions, respectively.

Next, as illustrated in FIG. 56C, the third conveyance roller pair 6 and the winding roller 20 start rotating in the forward direction (clockwise in the drawing) in S511 of FIG.

62 after the separation claws 16 are inserted into the gap C. That is, as illustrated in FIGS. 61A to 60C, the separation claws 16 inserted into the gap C of the two-ply sheet PJ relatively move from the one end side A (in FIG. 61A) to the other end side B (in FIGS. 61C and 61D) with respect to the two-ply sheet PJ. In the present embodiment, the above-described relative movement is caused by moving the two-ply sheet PJ itself in a direction indicated by arrow in FIGS. 61B and 61C without changing the positions of separation claws 16 in the conveyance direction.

In contrast, when the control unit 56 determines an abnormality based on the detection result by the sixth sensor 46, that is, when the gap C in the two-ply sheet PJ does not have the size equal to or larger than the predetermined distance F in S529 of FIG. 62, the control unit 56 does not move the separation claws 16 from the standby positions to the separation positions assuming that separation operation by separation claws 16 may cause various kinds of inconveniences. In S530 of FIG. 62, the control unit 56 displays, on the control panel 49 (see FIG. 51), the notification that separation of the two-ply sheet PJ and insertion of the insertion sheet PM are cancelled due to the occurrence of abnormality.

In S512 of FIG. 62, as illustrated in FIG. 57A, the control unit 56 stops forward rotation of the third conveyance roller pair 6 and forward rotation of the winding roller 20 after the third conveyance roller pair 6 conveys the two-ply sheet PJ by a predetermined amount X4 in the forward direction. At this time, the gripped portion B of the two-ply sheet PJ is positioned in the third conveyance passage K3 (that is, at the winding start position W illustrated in FIG. 55B), and the gripper 32 can release the gripped portion B. In addition, as illustrated in FIG. 61C, after the separation claws 16 are inserted into the gap C of the two-ply sheet PJ and move to the second end B of the two-ply sheet PJ relative to the two-ply sheet PJ, the separation claws 16 stop near the second end B of the two-ply sheet PJ.

In this state, the gripper 32 moves from the gripping position to the releasing position in S513 of FIG. 62. That is, the cam 34 moves to a rotational position at which the cam 34 does not push the arm 31. The gripper 32 releases the two-ply sheet PJ in this state. In the present embodiment, the cam 34 (the drive device 30) moves to release the gripping of the gripper 32. Alternatively, in a case where the pulling force exerted by the conveyance of the third conveyance roller pair 6 is larger than the gripping force of the gripper 32, the third conveyance roller pair 6 may convey the two-ply sheet and pull the two-ply sheet PJ from the gripper 32 to release the two-ply sheet PJ, without the above-described movement of the cam 34 (the drive device 30).

In S514 of FIG. 62, as illustrated in FIG. 57B, the third conveyance roller pair 6 again rotates in the forward direction to start conveyance of the two-ply sheet PJ in the forward direction. In addition, after the gripped portion B (the back end in the forward direction, the second end) of the two-ply sheet PJ passes by the branch portion between the third conveyance passage K3 and the branched conveyance passages K4 and K5, the gripper 32 moves from the releasing position to the gripping position. At this time, the fourth sensor 44 detects the gripped portion B (the back end in the forward direction, the second end) of the two-ply sheet PJ. In response to a determination that the third conveyance roller pair 6 has conveyed the two-ply sheet PJ by a predetermined amount X5 from when the fourth sensor 44 detects the back end of the two-ply sheet PJ conveyed in the forward direction (Yes in S515 of FIG. 0.62), the control unit 56 stops conveyance of the two-ply sheet PJ and moves the separation claw 16 in the width direction in S531 of FIG. 62, as illustrated in FIG. 61D. As a result, as illustrated in FIG. 57B, back ends of the two sheets P1 and P2 of the two-ply sheet PJ in the forward direction are separated and largely opened (see FIG. 61D). At this time, separation (peeling) of the two-ply sheet PJ is started.

Then, as illustrated in FIG. 57C, the third conveyance roller pair 6 rotates in reverse to start conveyance of the two-ply sheet PJ in the reverse direction in S516 of FIG. 62. At this time, since the separation claws 16 are at the switching positions (illustrated in FIG. 61D) to block the route of the two-ply sheet PJ leading to the third conveyance passage K3. Accordingly, the two sheets P1 and P2 separated from each other are guided to the two branched conveyance passages K4 and K5, respectively, as illustrated in FIG. 57C. At this time, the fifth sensor 45 (see FIG. 51) detects the bonded portion A (the first end and the back end in the reverse direction) of the two-ply sheet PJ. Subsequently, triggered by the detection by the fifth sensor 45 (see FIG. 51) of the back end (the bonded portion A) of the two-ply sheet PJ in the reverse direction (Yes in S517 of FIG. 62), the second feed roller 3 starts feeding the insertion sheet PM from the second feed tray 12 in S518. At this time, the second sensor 42 detects the size of the insertion sheet PM.

The timing for starting the feeding of the insertion sheet PM is not limited thereto, and the timing is preferably set to reduce the time required for the separation process and the inserting process.

In S519 of FIG. 62, as illustrated in FIG. 58A, in response to a detection by the fifth sensor 45 (see FIG. 51) of the back end of the two-ply sheet PJ in the reverse direction, the third conveyance roller pair 6 conveys the two-ply sheet PJ by a predetermined amount X6 and stops. At that time, the bonded portion A of the two-ply sheet PJ is in the nip of the third conveyance roller pair 6 or at a position slightly leftward from the nip. That is, the third conveyance roller pair 6 nips the first end of the two-ply sheet PJ. In this state, the separation of the two-ply sheet PJ has completed.

Further, feeding of the insertion sheet PM from the second feed tray 12 is started before the completion of separation of the two-ply sheet PJ. Therefore, as illustrated in FIG. 58A, when the separation of the two-ply sheet PJ is completed, the end (end in the forward direction and the first end) of the insertion sheet PM approaches the insertion position between the two-ply sheet PJ.

At this time, the third sensor 43 detects the front end (the first end) of the insertion sheet PM conveyed in the forward direction. In response to the detection by the third sensor 43, as illustrated in FIG. 58B, the separation claws 16 are moved to the standby positions at a timing not to interfere with the insertion sheet PM.

Subsequently, referring to FIGS. 58C and 61E, triggered by the detection by the third sensor 43 of the front end of the insertion sheet PM in the forward direction (Yes in S520 of FIG. 62), the second conveyance roller pair 5 conveys the insertion sheet PM by a predetermined amount X7, after which the third conveyance roller pair 6 resumes the conveyance of the two-ply sheet PJ in the forward direction in S521 of FIG. 62. At this time, the insertion sheet PM is accurately sandwiched at a desired position between the two sheets P1 and P2.

Thus, the control unit 56 ends the process of inserting the insertion sheet PM between the two sheets P1 and P2 of the two-ply sheet PJ in S522 of FIG. 62.

In S532 in FIG. 63, the control unit 56 determines whether the size of the two-ply sheet PJ detected in S501 is not smaller than the size of the insertion sheet PM detected in S518. Specifically, when the two-ply sheet PJ is not smaller than the insertion sheet PM, the control unit 56 determines that the size relation is normal, controls the switching claw 17 to open the fourth conveyance passage K6 as illustrated in FIG. 59A, conveys the two-ply sheet PJ sandwiching the insertion sheet PM to the lamination device 51, and executes the laminating process (S533 in FIG. 63). The two-ply sheet PJ into which the insertion sheet PM is inserted passes through the lamination device 51, and the entire region of the two-ply sheet PJ is laminated. The ejection roller pair 7 ejects the two-ply sheet PJ (sandwiching the insertion sheet PM) subjected to the above-described laminating process onto the output tray 13 outside the lamination device 51.

By contrast, when the two-ply sheet PJ is smaller than the insertion sheet PM in S532, the control unit 56 determines sheet size mismatch, controls the switching claw 17 to close the fourth conveyance passage K6 as illustrated in FIG. 59B, and ejects the two-ply sheet PJ sandwiching the insertion sheet PM to the second output tray 55 in S534 of FIG. 63. That is, the two-ply sheet PJ and the insertion sheet PM are ejected to the second output tray 55 in a reusable state without being laminated. After that, the control panel 49 displays the notification of the sheet size mismatch in S535 of FIG. 63.

A description is given of a first variation of the processes after determination of the sheet size mismatch described above.

FIG. 66 is a flowchart illustrating control operation of the laminator 200A subsequent to the processes in FIG. 62.

In the first modification, the control unit 56 determines sheet size mismatch based on a detection, by the first and second sensors 41 and 42 (detector), that the size L2 of the insertion sheet PM is larger than the size L1 of the two-ply sheet PJ, and the difference is greater than a threshold A (L1−L2>A).

When the insertion sheet PM is too small as compared with the two-ply sheet PJ, the margin is wide, degrading the appearance, although the insertion sheet PM does not protrude from the two-ply sheet PJ.

Specifically, after the inserting process in S522 of FIG. 62 is completed, the control unit 56 determines whether or not the relationship L1−L2>A is satisfied (S536 in FIG. 66). When the relationship L1−L2>A is not satisfied, the control unit 56 determines that the size relation is normal and the appearance of the laminated product is good, controls the switching claw 17 to open the fourth conveyance passage K6 as illustrated in FIG. 59A, conveys the two-ply sheet PJ sandwiching the insertion sheet PM to the lamination device 51, and executes the laminating process (S533 in FIG. 66). The ejection roller pair 7 ejects the two-ply sheet PJ subjected to the above-described laminating process onto the output tray 13 outside the lamination device 51.

By contrast, when the relationship L1−L2>A is satisfied (Yes in S536), the control unit 56 determines that sheet sizes does not match and the appearance of the laminated product is degraded, controls the switching claw 17 to close the fourth conveyance passage K6 as illustrated in FIG. 59B, and ejects the two-ply sheet PJ sandwiching the insertion sheet PM to the second output tray 55 in S534 of FIG. 66. After that, the control panel 49 displays the notification of the sheet size mismatch in S535 of FIG. 66.

Note that the determination in S536 and the determination in S532 in FIG. 63 may be combined.

In the first modification, the laminator 200A may allow the operator to change the threshold A in S536.

That is, in a case where the insertion sheet PM is smaller than the two-ply sheet PJ, the insertion sheet PM does not protrude from the two-ply sheet PJ and the laminating process is feasible. Accordingly, the laminator 200A allows the operator to arbitrarily set the allowable range of the margin. The operator can change the threshold A by operating the control panel 49.

The feasibility of the laminating process is described with reference to FIG. 67. FIG. 67 is a table illustrating the relationship between the size difference between the two-ply sheet (lamination film) and the insertion sheet and feasibility of the laminating process. In FIG. 67, the size increases in the order of "A5-SEF," "A5-LEF," "A4-SEF," "A4-LEF," and "A3-SEF." In FIG. 67, "Match" indicates that the laminating process can be performed without a size mismatch, "No" indicates that the insertion sheet PM is larger than the two-ply sheet PJ, causing a defect in the laminating process, and "Pending" indicates that the insertion sheet PM is smaller than the two-ply sheet PJ and the laminating process is feasible although a margin is large. Therefore, specifically, the threshold A is changeable so that the operator can freely set whether or not to execute the laminating process from the size combinations indicated as "Pending" in FIG. 67.

A description is given of a second modification of the processes after determination of the sheet size mismatch described above.

FIG. 68 is a flowchart illustrating control operation of the laminator 200A subsequent to the processes in FIG. 62.

In the second modification, in response to a determination that an abnormality (sheet size mismatch) has occurred based on the detection results of the first and second sensors 41 and 42 (detector), the laminator 200A stops conveying the two-ply sheet PJ and the insertion sheet PM before the two-ply sheet PJ and the insertion sheet PM reach the lamination device 51.

Specifically, after the inserting process in S522 of FIG. 62 is completed, the control unit 56 determines whether or not the insertion sheet PM is larger than the two-ply sheet PJ (S532 in FIG. 68). Determining that the insertion sheet PM is not larger than the two-ply sheet PJ, the control unit 56 determines that the size relation is normal, controls the switching claw 17 to open the fourth conveyance passage K6 as illustrated in FIG. 59A, conveys the two-ply sheet PJ sandwiching the insertion sheet PM to the lamination device 51, and executes the laminating process (S533 in FIG. 68). The ejection roller pair 7 ejects the two-ply sheet PJ subjected to the above-described laminating process onto the output tray 13 outside the lamination device 51.

By contrast, determining that the insertion sheet PM is larger than the two-ply sheet PJ (Yes in S532), the control unit 56 determines a sheet size mismatch, controls the switching claw 17 to close the fourth conveyance passage K6 as illustrated in FIG. 59B, and ejects the two-ply sheet PJ sandwiching the insertion sheet PM to the second output tray 55 (S534 of FIG. 68). After that, the control panel 49 displays the notification of the sheet size mismatch in S535 of FIG. 68.

Note that the determination in S532 and the determination in S536 in FIG. 66 may be combined.

A description is given of a third modification of the processes after determination of the sheet size mismatch described above.

FIG. 69 is a flowchart illustrating control operation of the laminator 200A subsequent to the processes in FIG. 62.

In the third modification, the laminator 200A allows the operator to change the conditions for determining a sheet size mismatch between the two-ply sheet PJ and the insertion sheet PM and the processing of the mismatch size sheets.

Specifically, after the inserting process in S522 of FIG. 62 is completed, the control unit 56 determines whether or not the size difference between the two-ply sheet PJ and the insertion sheet PM is within a setting (S538 in FIG. 69). At this time, examples of the settable condition include the condition that the two-ply sheet PJ is larger than the insertion sheet PM (L1>L2) determined in S532 of FIG. 63, the condition that the size difference therebetween is greater than the threshold A (L1−L2>A, where the threshold A is changeable) determined in S536 of FIG. 66, and the like.

When the size difference is within the setting, the control unit 56 determines that the size relation is normal, controls the switching claw 17 to open the fourth conveyance passage K6 as illustrated in FIG. 59A, conveys the two-ply sheet PJ sandwiching the insertion sheet PM to the lamination device 51, and executes the laminating process (S533 in FIG. 68). The ejection roller pair 7 ejects the two-ply sheet PJ subjected to the above-described laminating process onto the output tray 13 outside the lamination device 51.

By contrast, in S538, when the size difference is not within the setting, the control unit 56 determines a sheet size mismatch, cancels the laminating process, and processes the sheets according to the setting (S539 of FIG. 69). After that, the control panel 49 displays the notification of the sheet size mismatch in S535 of FIG. 69. Examples of the settable processing in S539 include ejecting the sheets to the second output tray 55 described with reference to FIG. 59B, stopping the sheet conveyance as in S537 of FIG. 68, and the like.

Since the laminator 200A allows the user to change the condition for stopping the laminating process, the laminator 200A enables the user to select the processing that meets the needs of the user. The above-mentioned conditions can be changed by the operation of the control panel 49 by the operator.

A fourth modification is described.

As illustrated in FIG. 70, in the laminator 200A according to the fourth modification, each of the first and second sensors 41 and 42 (detectors) to detect the size difference between the two-ply sheet PJ and the insertion sheet PM is a line sensor, such as a contact image sensor (CIS)), that detects the size in the conveyance direction and the size in the width direction of the two-ply sheet PJ and the insertion sheet PM.

As illustrated in FIG. 70, each of the first and second sensors 41 and 42 includes a plurality of photosensors disposed side by side in the width direction, which is the lateral direction in FIG. 70 and orthogonal to the sheet conveyance direction indicated by an outlined arrow in FIG. 70. The control unit 56 grasps an area where the output is on and an area where the output is off among the plurality of photosensors, thereby detecting the size of the two-ply sheet PJ and the size of the insertion sheet PM in the width direction. Then, the control unit 56 obtains the size L1 of the two-ply sheet PJ in the conveyance direction from the time required for the two-ply sheet PJ to pass by the first sensor 41 and the conveyance speed (predetermined) of the two-ply sheet PJ and obtains the size L2 of the insertion sheet PM in the conveyance direction from the time required for the insertion sheet PM to pass by at the second sensor 42 and the conveyance speed (predetermined) of the insertion sheet PM. Then, the size mismatch is determined based on the size differences between the two-ply sheet PJ and the insertion sheet PM in the conveyance direction and the width direction.

Specifically, in the case of determining the sheet size mismatch under the condition in S532 of FIG. 63 or the condition in S536 of FIG. 66, the control unit 56 determines that the sheet size mismatch when at least one of the size difference in the conveyance direction and that in the width direction is improper. With this configuration, the laminator 200A can determine abnormality more accurately.

As long as the detector to detect the size difference is capable of detecting the size of the two-ply sheet PJ and the size of the insertion sheet PM in at least one of the conveyance direction and the width direction, there is an effect of reducing inconveniences of laminating the two-ply sheet PJ in which an insertion sheet PM of mismatch size is inserted.

A fifth modification is described.

As illustrated in FIG. 71, the laminator 200A according to the fifth modification includes a retreat conveyance passage K7 for guiding the sheet to the output tray 13 (the first output tray) without passing through the lamination device 51.

In the fifth modification, in addition to the second output tray 55, the output tray 13 also serves as an ejection portion to which the two-ply sheet PJ and the insertion sheet PM are ejected without passing through the lamination device 51 in response to the determination of improper size difference (mismatch size).

Specifically, the retreat conveyance passage K7 branches from the fourth conveyance passage K6 on the upstream side of the lamination device 51, passes above the lamination device 51, and leads to a sheet outlet (provided with a second ejection roller pair 8) above the output tray 13. Further, a switching claw 18 (a second switching member) is disposed at the branch portion between the fourth conveyance passage K6 and the retreat conveyance passage K7. The switching claw 18 switches the state of the laminator 200A between a state (illustrated in FIG. 72A) in which the fourth conveyance passage K6 is open and the retreat conveyance passage K7 is closed and a state (illustrated in FIG. 72B) in which the fourth conveyance passage K6 is closed and the retreat conveyance passage K7 is open.

Then, determining that the size difference is improper based on the detection results of the first and second sensors 41 and 42 (detector), the laminator 200A does not execute at least the inserting process (of the inserting process separating process). Then, the laminator 200A does not pass the two-ply sheet PJ and the insertion sheet PM through the lamination device 51 but ejects the two-ply sheet PJ to one of the two output trays 13 and 55 (ejection portions) and ejects the insertion sheet PM to the other of the output trays 13 and 55.

Specifically, in the fifth modification, in response to a determination that the size relationship between the two-ply sheet PJ and the insertion sheet PM is normal, as illustrated in FIG. 72A, the switching claws 17 and 18 guide the two-ply sheet PJ in which the insertion sheet PM has been inserted to the fourth conveyance passage K6, and the lamination device 51 performs the laminating process.

By contrast, in response to a determination that the size relationship between the two-ply sheet PJ and the insertion sheet PM is improper, as illustrated in FIG. 72B, the switching claws 17 and 18 guide the preceding two-ply sheet PJ before the inserting process to the retreat conveyance passage K7 to be ejected onto the output tray 13 (the first output tray) without executing the laminating process, and guides the subsequent insertion sheet PM before the inserting process to the second output tray 55.

With this control operation, the two-ply sheet PJ and the insertion sheet PM are ejected separately in the case of sheet size mismatch, thus obviating the work of separating the insertion sheet PM from the two-ply sheet PJ for reuse.

In the fifth modification, the two-ply sheet PJ and the insertion sheet PM are ejected to separate trays, namely, the output trays 13 and 55, in the case of sheet size mismatch. Alternatively, as illustrated in FIG. 73, the two-ply sheet PJ and the insertion sheet PM may be ejected onto the output tray 13 (the first output tray) via the retreat conveyance passage K7.

Further, in the fifth modification, even when the insertion sheet size matches the two-ply sheet size, the laminator 200A can allow, with setting on the control panel 49 by the user, the user to eject the two-ply sheet PJ into which the insertion sheet PM has been inserted (after the separating process and the inserting process) via the retreat conveyance passage K7 to the output tray 13c without performing the laminating process. Such a setting is used when the user wants to grasp the appearance of the final product in which the insertion sheet PM is inserted into the two-ply sheet PJ without performing the laminating process. With such a setting, since the two-ply sheet PJ and the insertion sheet PM are not laminated yet, the two-ply sheet PJ and the insertion sheet PM can be reused after checking the appearance of the final product. Thus, the sheets are not wasted.

A sixth modification is described.

As illustrated in FIG. 74, an image forming apparatus 300A according to the sixth modification includes the laminator 200A, illustrated in FIG. 51, attached to the image forming apparatus main body including an image forming device 101 that forms an image on a sheet P. However, in the image forming apparatus 300A, the sheet P fed by a feed roller 197 from a feeder 112 of the image forming apparatus 300A (main body) is conveyed to the laminator 200A as the insertion sheet PM.

With reference to FIG. 74, in the image forming apparatus 300A, multiple pairs of sheet conveyance rollers disposed of a document feeder 1100 feed a document D from a document loading table in the direction indicated by an arrow in FIG. 74, and the document D passes over a document reading device 1020. The document reading device 1020 optically reads an image of the document D passing over the document reading device 1020 and generates image data.

The image data optically obtained by the document reading device 1020 is converted into electric signals and transmitted to a writing device 1030. The writing device 1030 emits laser beams onto photoconductor drums 105Y, 105M, 105C, and 105K according to the electric signals of the image data for each color, respectively, thus performing an exposure process.

On the photoconductor drums 105Y, 105M, 105C, and 105K of image forming units 104Y, 104M, 104C, and 104K, a charging process, the exposure process, and a developing process are performed to form desired images on the photoconductor drums 105Y, 105M, 105C, and 105K, respectively.

The images formed on the photoconductor drums 105Y, 105M, 105C, and 105K are transferred and superimposed onto an intermediate transfer belt 1780 to form a color image. The color image formed on the intermediate transfer belt 1780 is transferred to the surface of the sheet P (to be the insertion sheet PM) fed by the feed roller 197 from the feeder 112 (a second feeder) at a position at which the intermediate transfer belt 1780 faces a secondary transfer roller 189.

After the color image is transferred onto the surface of the sheet P (that is the insertion sheet PM), the sheet P is conveyed to a fixing device 1200. The fixing device 1200 fixes the transferred color image on the sheet P.

Thereafter, the sheet P is ejected from the main body of the image forming apparatus 300A by an ejection roller pair 131 and is fed to the laminator 200A as the insertion sheet PM. At that time, the laminator 200A has completed the process of separating the two-ply sheet PJ described with reference to FIGS. 54A to 57C the process. After the insertion sheet PM is fed in the laminator 200A, the laminator 200A performs the process of inserting the insertion sheet PM into the two-ply sheet PJ described with reference to FIGS. 58A to 58C. After the lamination device 51 performs the laminating process on the two-ply sheet PJ into which the insertion sheet PM is inserted, the second ejection roller pair 8 ejects the two-ply sheet PJ to the outside of the lamination device 51, onto the output tray 13.

As described above, a series of image formation processes (i.e. printing operations) in the image forming apparatus 300A, the sheet separation process, and the laminating process using the insertion sheet PM bearing the formed image are completed.

In the sixth modification, similarly, the control unit 56 cancels the laminating process based on a determination of sheet size mismatch based on the detection results of the first and second sensors 41 and 42.

The image forming apparatus 300A includes the control panel 49. When the control unit 56 determines that the abnormality in the separation process based on the detection result by the sixth sensor 46 (the abnormality detector), the control unit 56 displays, on the control panel 49, the message that the separation of the two-ply sheet and insertion of the insertion sheet PM are canceled due to the abnormality.

The image forming apparatus 300A according to the sixth modification is described as a color image forming apparatus, but may be a monochrome image forming apparatus. The image forming apparatus 300A according to the sixth modification employs electrophotography, but application of the present disclosure is not limited thereto. The present disclosure may be applied to other types of image forming apparatuses such as an inkjet image forming apparatus and a stencil printing machine.

A description is given of a seventh modification of the embodiment described above.

As illustrated in FIG. 75, an image forming system 500 according to the seventh modification includes the image forming apparatus 300A and the laminator 200A illustrated in FIG. 51, including the sheet separation device 1 and the lamination device 51. The laminator 200A is detachably attached to a main body (including the image forming device 101) of the image forming apparatus 300A. In the seventh modification, similarly, the sheet P fed by the feed roller 197 from the feeder 112 of the image forming apparatus 300A is conveyed to the laminator 200A as the insertion sheet PM.

In the image forming system 500 illustrated in FIG. 75, the image forming apparatus 300A performs the image formation described above with reference to FIG. 74 and ejects the sheet P (that is the insertion sheet PM bearing a desired image) by the ejection roller pair 131 to the laminator 200A. Then, similarly, the laminator 200A inserts the insertion sheet PM in the two-ply sheet PJ and performs the laminating process on the two-ply sheet PJ, and the ejection roller pair 7 ejects the two-ply sheet PJ to the outside of the laminator 200A, onto the output tray 13. In the seventh modification, similarly, the control unit 56 cancels the laminating process in response to a determination of sheet size mismatch based on the detection results of the first and second sensors 41 and 42.

When such a laminating process is not selected to be performed, in the image forming system 500, the image forming apparatus 300A ejects the sheet P bearing the image formed through the image formation process from an ejection roller pair 1320 to the outside of the image forming apparatus 300A, onto an output tray 1500.

The laminator 200A is detachably attached to the image forming apparatus 300A and can be detached from the image forming apparatus 300A when the laminator 200A is not necessary. In the image forming apparatus 300A from which the laminator 200A is detached, a mount face 149 for the laminator 200A is used as an output tray to which the sheet P bearing the image formed through the image formation process is ejected by the ejection roller pair 131 to the outside of the image forming apparatus 300A.

As described above, the laminator 200A according to the fifth embodiment includes the sheet separation device 1 and the lamination device 51. The sheet separation device 1 separates the two overlapped sheets P1 and P2 (plies) of the two-ply sheet PJ, from a non-bonded portion at the second end opposite the at the first end at which the two sheets are bonded together as the bonded portion A), and inserts an insertion sheet PM between the separated sheets P1 and P2. The lamination device 51 performs the laminating process on the two-ply sheet PJ after the separation process and the inserting process are performed by the sheet separation device 1. The laminator 200A according to the present embodiment further includes the first sensor 41 and the second sensor 42 to detect the size difference between the two-ply sheet PJ and the insertion sheet PM at least before execution of the laminating process. With this configuration, the laminator 200A cancels the execution of the laminating process in response to a determination of sheet size mismatch (abnormality) based on the detection results of the first and second sensors 41 and 42 under a predetermined condition.

This configuration can prevent an inconvenience that the laminating process is executed in a state in which the size difference between the two-ply sheet size and the insertion sheet size is improper.

In the present embodiment, at a position between the separation claws 16 (the separator) and the winding roller 20, the two branched conveyance passages K4 and K5 branch off in different directions, with the third conveyance passage K3 sandwiched between the two branched conveyance passages K4 and K5. Alternatively, the two branched conveyance passages K4 and K5 may branch off at the position of the separation claws 16 (the separator) in different directions with the third conveyance passage K3 sandwiched between the two branched conveyance passages K4 and K5.

Further, in the present embodiment, the two branched conveyance passages K4 and K5 are shaped in a substantially U shape broadening from the branch portion to the right side in FIG. 51, but the shapes of the two branched conveyance passages K4 and K5 are not limited thereto. Alternatively, for example, the two branched conveyance passages K4 and K5 can be shaped in a substantially U shape broadening from the branch portion to the left side in FIG. 51. Yet alternatively, the two branched conveyance passages K4 and K5 can be shaped in a substantially S-shape broadening from the branch portion to the different directions, that is, the right and left sides (see FIG. 71).

The laminator 200A according to the present embodiment includes the first sensor 41 and the second sensor 42 as the detector to detect the size difference between the two-ply sheet PJ and the insertion sheet PM at least before execution of the laminating process, but the detector is not limited thereto as long as the detector can detect the size difference before executing of the laminating process.

In such configurations, effects similar to those described above are also attained.

Numerous additional modifications and variations are possible in light of the above teachings. It is therefore to be understood that within the scope of the appended claims, the present disclosure may be practiced otherwise than as specifically described herein. The number, position, and shape of the components of the image forming apparatus described above are not limited to those described above.

In the present disclosure, the "end face" of the two-ply sheet is defined as a side face extending in the thickness direction and connecting the front surface and the back surface of the two-ply sheet. Accordingly, a rectangular two-ply sheet has four end faces respectively on the front, back, left, and right sides.

The embodiments of the present disclosure have been described in detail above. The above-described embodiments are examples and can be modified within the scope not departing from the gist of the present disclosure. For example, any embodiment and any modification may be combined. Any one of the above-described operations may be performed in various other ways, for example, in an order different from the one described above. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A sheet processing apparatus comprising circuitry configured to:
    acquire a size of a two-ply sheet in which two sheets are bonded together at one end and a size of an insertion sheet; and
    control a sheet processing operation based on the size of the two-ply sheet and the size of the insertion sheet, the sheet processing operation including inserting the insertion sheet in the two-ply sheet.

2. The sheet processing apparatus according to claim 1, wherein the circuitry is configured to determine an appearance of the two-ply sheet in which the insertion sheet is sandwiched based on the size of the two-ply sheet and the size of the insertion sheet.

3. The sheet processing apparatus according to claim 2, wherein the circuitry is configured to cancel the sheet processing operation based on a determination that the size of the insertion sheet is larger than the size of the two-ply sheet.

4. The sheet processing apparatus according to claim 2, further comprising a notification device configured to emit a perceptual signal to a user of the sheet processing apparatus, wherein, based on a determination that size of the insertion sheet is smaller by a threshold than the size of the two-ply sheet, the circuitry is configured to control the notification device to output a notification to the user.

5. The sheet processing apparatus according to claim 2, further comprising:
a two-ply sheet tray on which the two-ply sheet is placed; and
a sheet size detector configured to detect the size of the two-ply sheet,
wherein the circuitry is configured to acquire the size of the two-ply sheet detected by the sheet size detector.

6. The sheet processing apparatus according to claim 2, further comprising:
an insertion sheet tray on which the insertion sheet is placed; and
a sheet size detector configured to detect the size of the insertion sheet,
wherein the circuitry is configured to acquire the size of the insertion sheet detected by the sheet size detector.

7. The sheet processing apparatus according to claim 2, wherein the circuitry is configured to:
determine whether two or more insertion sheets are insertable in the two-ply sheet based on the size of the two-ply sheet and the size of the insertion sheet; and
in accordance with a determination result of whether two or more insertion sheets are insertable in the two-ply sheet, selectively perform one of single sheet inserting for inserting a single insertion sheet in a single two-ply sheet and multi-sheet inserting for inserting two or more insertion sheets in a single two-ply sheet.

8. The sheet processing apparatus according to claim 7, wherein the circuitry is configured to:
acquire a number of insertion sheets to be inserted in the two-ply sheet; and
based on a determination that two or more insertion sheets are insertable in the two-ply sheet, selectively perform one of the single sheet inserting and the multi-sheet in accordance with the number of insertion sheets to be inserted.

9. A sheet processing apparatus comprising:
a display and operation device configured to display information and receive an operation input by a user; and
circuitry configured to:
display, on the display and operation device, a setting screen for the user to set a size and an orientation of a two-ply sheet in which two sheets are bonded together at one end, a size and an orientation of an insertion sheet, and a number of insertion sheets to be inserted in the two-ply sheet; and
control a sheet processing operation according to an instruction from the display and operation device, the sheet processing operation including inserting the insertion sheet in the two-ply sheet.

10. The sheet processing apparatus according to claim 9, wherein the circuitry is configured to perform one of single sheet inserting for inserting a single insertion sheet in a single two-ply sheet and multi-sheet inserting for inserting two or more insertion sheets in a single two-ply sheet, according to the instruction from the display and operation device.

11. A laminator comprising:
the sheet processing apparatus according to claim 1; and
a heat and pressure member configured to heat and press the two-ply sheet.

12. An image forming apparatus comprising:
an image forming device configured to perform image formation on a sheet; and
the sheet processing apparatus according to claim 1.

13. An image forming apparatus comprising:
an image forming device configured to perform image formation on a sheet; and
the laminator according to claim 11.

14. An image forming system comprising:
an image forming apparatus configured to perform image formation on a sheet; and
the sheet processing apparatus according to claim 1.

15. The image forming system according to claim 14, wherein the sheet processing apparatus is removably attachable to the image forming apparatus.

16. An image forming system comprising:
an image forming apparatus configured to perform image formation on a sheet; and
the laminator according to claim 11.

17. The image forming system according to claim 16, wherein the laminator is removably attachable to the image forming apparatus.

18. A sheet processing apparatus comprising:
a display and operation device configured to display information and receive an operation input; and
circuitry configured to:
acquire a size of a two-ply sheet in which two sheets are bonded together at one end and a size of an insertion sheet, input on the display and operation device;
determine an appearance of the two-ply sheet in which the insertion sheet is sandwiched based on the size of the two-ply sheet and the size of the insertion sheet; and
control a sheet processing operation based on a determination result of the appearance of the two-ply sheet, the sheet processing operation including inserting the insertion sheet in the two-ply sheet.

* * * * *